(12) United States Patent
Isogai

(10) Patent No.: US 7,900,737 B2
(45) Date of Patent: Mar. 8, 2011

(54) WORKING VEHICLE

(75) Inventor: Takayuki Isogai, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 518 days.

(21) Appl. No.: 11/992,255

(22) PCT Filed: Feb. 27, 2006

(86) PCT No.: PCT/JP2006/303573
§ 371 (c)(1),
(2), (4) Date: Mar. 19, 2008

(87) PCT Pub. No.: WO2007/039940
PCT Pub. Date: Apr. 12, 2007

(65) Prior Publication Data
US 2009/0260912 A1    Oct. 22, 2009

(30) Foreign Application Priority Data

Oct. 4, 2005   (JP) ................................ 2005-291093

(51) Int. Cl.
*B60K 17/00* (2006.01)
(52) U.S. Cl. ........................................ 180/305; 180/53.4
(58) Field of Classification Search .................. 180/337, 180/374–380, 315, 325, 336, 305, 306, 307, 180/53.1–53.8; 74/730.1, 606 R, 15.2; 60/488; 475/160
See application file for complete search history.

(56) References Cited

U.S. PATENT DOCUMENTS

| | | | | |
|---|---|---|---|---|
| 4,242,923 A | * | 1/1981 | Nishikawa et al. | ........... 475/160 |
| 4,244,242 A | * | 1/1981 | Uno et al. | ...................... 475/160 |
| 4,304,141 A | * | 12/1981 | Tone et al. | ...................... 74/15.2 |
| 4,579,183 A | * | 4/1986 | Irikura et al. | ................ 180/53.1 |
| 4,658,662 A | * | 4/1987 | Rundle | ........................... 74/331 |
| 4,824,128 A | * | 4/1989 | Takagi et al. | ................ 180/53.1 |
| 5,511,436 A | * | 4/1996 | Hasegawa et al. | ............. 74/331 |
| 5,544,547 A | * | 8/1996 | Ishimaru | ...................... 74/730.1 |
| 5,913,950 A | * | 6/1999 | Matsufuji | .................... 74/730.1 |
| 6,164,396 A | * | 12/2000 | Matsufuji | .................... 180/6.34 |
| 6,199,380 B1 | * | 3/2001 | Ishii | ............................... 60/485 |
| 6,250,414 B1 | * | 6/2001 | Sato et al. | ..................... 180/307 |
| 6,324,842 B1 | * | 12/2001 | Ishii | ............................... 60/454 |
| 6,422,109 B1 | * | 7/2002 | Jolliff et al. | .................. 74/730.1 |
| 6,571,894 B2 | * | 6/2003 | Ishimaru et al. | ............. 180/53.4 |

(Continued)

FOREIGN PATENT DOCUMENTS

JP    2000-154869    6/2000

(Continued)

*Primary Examiner* — J. Allen Shriver, II
*Assistant Examiner* — Jacob Meyer
(74) *Attorney, Agent, or Firm* — Jordan and Hamburg LLP

(57) ABSTRACT

There is provided a power transmission device for a working vehicle, in which a drive takeoff shaft for front wheels can be easily mounted on or dismounted from a transmission case and hence the workability of assembly, maintenance, and the like can be improved but the cost of manufacturing the transmission case and the like can be easily reduced. In the power transmission device for a working vehicle provided with: an engine mounted on a running vehicle body having front wheels and rear wheels; a hydrostatic continuously variable transmission for variably transmitting power from the engine; and the transmission case for transmitting a transmission output from the hydrostatic continuously variable transmission, the drive takeoff shaft for front wheels for transmitting a driving force to the front wheels and the hydrostatic continuously variable transmission are arranged on a center plate disposed on the front side of the transmission case.

6 Claims, 30 Drawing Sheets

U.S. PATENT DOCUMENTS

| | | | |
|---|---|---|---|
| 6,758,301 B2* | 7/2004 | Shiba et al. | 180/383 |
| 6,802,183 B2* | 10/2004 | Ishimaru et al. | 60/488 |
| 6,830,116 B2* | 12/2004 | Ishimaru et al. | 180/53.4 |
| 6,964,310 B2* | 11/2005 | Hasegawa | 180/24.09 |
| 6,986,295 B2* | 1/2006 | Kajino et al. | 74/329 |
| 6,991,042 B2* | 1/2006 | Ochi et al. | 172/439 |
| 7,047,839 B2* | 5/2006 | Ishii et al. | 74/606 R |
| 7,140,457 B2* | 11/2006 | Ishimaru et al. | 180/53.4 |
| 7,150,693 B2* | 12/2006 | Ishimaru et al. | 475/206 |
| 7,225,704 B2* | 6/2007 | Ishii et al. | 74/606 R |
| 7,275,372 B2* | 10/2007 | Ishimaru et al. | 60/488 |
| 7,337,870 B2* | 3/2008 | Izukura et al. | 180/307 |
| 7,370,714 B2* | 5/2008 | Yasuda et al. | 180/53.4 |
| 7,422,077 B2* | 9/2008 | Ishimaru et al. | 180/53.4 |
| 7,484,580 B2* | 2/2009 | Yamaguchi et al. | 180/53.6 |
| 7,516,685 B2* | 4/2009 | Ebihara et al. | 74/665 G |
| 7,617,892 B2* | 11/2009 | Nishimoto et al. | 180/53.4 |
| 7,621,353 B2* | 11/2009 | Ishii et al. | 180/6.2 |
| 7,637,332 B2* | 12/2009 | Ishimaru et al. | 180/53.4 |
| 7,694,765 B2* | 4/2010 | Kitagawara et al. | 180/65.6 |
| 7,726,425 B2* | 6/2010 | Ishii et al. | 180/53.4 |
| 2002/0166712 A1* | 11/2002 | Ishimaru et al. | 180/337 |
| 2003/0188913 A1* | 10/2003 | Ishimaru et al. | 180/337 |
| 2004/0262054 A1* | 12/2004 | Ishimaru et al. | 180/53.4 |
| 2005/0126843 A1* | 6/2005 | Irikura | 180/305 |
| 2006/0054377 A1* | 3/2006 | Izukura et al. | 180/307 |
| 2006/0196709 A1* | 9/2006 | Ishimaru et al. | 180/53.4 |

FOREIGN PATENT DOCUMENTS

| | | |
|---|---|---|
| JP | 2002-127768 | 5/2002 |
| JP | 2004-050954 | 2/2004 |

\* cited by examiner

WORKING VEHICLE

TECHNICAL FIELD

The present invention relates to a tractor used for a farm work or a working vehicle used for a civil engineering work and, in more detail, to a working vehicle having a power transmission device for transmitting a driving power to running wheels and a vehicle speed holding mechanism (cruise control mechanism) for holding a shift pedal at a specified depressed position to hold the vehicle speed of a running vehicle body at a constant speed.

BACKGROUND ART

Generally, the above-mentioned working vehicle such as a tractor and a wheel loader is conventionally constructed as follows: that is, when the working vehicle transmits driving power to left and right running wheels, the working vehicle outputs the driving power to the left and right running wheels via such a transmission mechanism of a transmission case that has power transmitted thereto from an engine mounted on a running vehicle body in the working vehicle. In this case, the conventional working vehicle employs a construction such that: a clutch housing and the transmission case are disposed on the running vehicle body; a continuously variable transmission and a transmission gear mechanism are disposed in the transmission case; and power from the engine is inputted to the continuously variable transmission; and the power is transmitted to the running wheels via the transmission gear mechanism from the continuously variable transmission (see, for example, patent document 1).

Some of the other conventional working vehicles employ a construction such that: a transmission case is disposed in a running vehicle body; a hydrostatic continuously variable transmission and a transmission gear mechanism are disposed in the transmission case; and power from an engine is inputted to the hydrostatic continuously variable transmission and is transmitted to running wheels via the transmission gear mechanism from the hydrostatic continuously variable transmission (see, for example, patent document 2).

[Patent document 1] Japanese Unexamined Patent Publication No. 2000-154869
[Patent document 2] Japanese Unexamined Patent Publication No. 2004-50954

DISCLOSURE OF THE INVENTION

Problems to be Solved by the Invention

In the above-mentioned conventional technology, when such a drive takeoff shaft for front wheels that transmits a driving force to the front wheels as running wheels, as described in patent document 1, is disposed in the nearly same place as the transmission gear mechanism in the transmission case, the transmission gear mechanism and the drive takeoff shaft for the front wheels need to be mounted in the transmission case nearly at the same time, so the drive takeoff shaft for the front wheels cannot be easily mounted in or dismounted from the transmission case. Thus, there is presented a problem that the workability of assembly and maintenance cannot be improved. Moreover, when a bearing body mounted with the drive takeoff shaft for the front wheels and the transmission case, as described in patent document 2, are constructed separately from each other, the drive takeoff shaft for the front wheels can be easily mounted in or dismounted from the transmission case, but the bearing body needs to be made separately from the transmission case. Hence, this construction presents a problem that the cost of manufacturing cannot be easily reduced.

The object of the present invention is to provide a working vehicle that can easily mount or dismount the drive takeoff shaft for front wheels in or from the transmission case and hence can improve the workability of assembly and maintenance and can easily reduce the cost of manufacturing the transmission case and the like.

Means for Solving the Problems

To achieve the object, the invention is a working vehicle including: an engine mounted on a running vehicle body having front wheels and rear wheels; a hydrostatic continuously variable transmission for variably transmitting power from the engine; and a transmission case for transmitting a transmission output from the hydrostatic continuously variable transmission, and characterized in that a drive takeoff shaft for the front wheels, which transmits a driving force to the front wheels, and the hydrostatic continuously variable transmission are arranged on a center plate disposed on a front side of the transmission case.

The invention is the working vehicle characterized in that the drive takeoff shaft for the front wheels is arranged on one side of the hydrostatic continuously variable transmission.

The invention is the working vehicle characterized in that a nearly cylindrical shaft cover is fitted on such a transmission shaft for the front wheels that is connected to the drive takeoff shaft for the front wheels, one end of the shaft cover being retained by a cover insertion hole formed in a bottom portion of a clutch housing disposed on a front side of the center plate.

The invention is the working vehicle characterized in that a universal coupling for connecting the drive takeoff shaft for the front wheels to the transmission shaft for the front wheels is arranged in the clutch housing.

The invention is the working vehicle characterized in that one brake pedal is connected to left and right brakes for braking the left and right rear wheels respectively via one brake operating shaft, the brake operating shaft being arranged in a bottom portion of the clutch housing below the hydrostatic continuously variable transmission and the universal coupling.

The invention is the working vehicle characterized by including: a shift pedal connected to a transmission operating part of the hydrostatic continuously variable transmission via a transmission mechanism; and a vehicle speed holding mechanism for holding the shift pedal at a depressed position, and characterized in that the vehicle speed holding mechanism is provided with an engaging part and an engaged arm having a plurality of engaged claws to be engaged with or disengaged from the engaging part and is constructed in such a way that: the engaging part is connected to a manual operating lever for holding a vehicle speed; the engaged arm is connected to the shift pedal; and the engaging part can be held engaged with the engaged claws by a biasing force of an initial position return spring for returning the shift pedal to an initial position from the depressed position to thereby bring a vehicle speed nearly to zero.

The invention is the working vehicle characterized by including: brake operating means for braking the rear wheels; and brake system releasing means for forcibly releasing the vehicle speed holding mechanism by a braking operation of the brake operating means, and characterized in that a drive system releasing operation of releasing the vehicle speed holding mechanism by the shift pedal and a brake system releasing operation of releasing the vehicle speed holding mechanism by the brake system releasing means can be performed independently of each other.

The invention is the working vehicle characterized in that the vehicle speed holding mechanism includes an engaged arm having a plurality of engaged claws for holding the shift pedal at a depressed position and an engaging part to be engaged with or disengaged from the engaged claws and has an engaging link connected to the manual operating lever for holding a vehicle speed, the engaging part being arranged on the engaging link, the engaging link being connected to a brake pedal as the brake operating means via a release arm as the brake system releasing means for forcibly releasing the engaging part from the engaged claws.

The invention is the working vehicle characterized by including a shift pedal connected to a transmission operating part of the continuously variable transmission via a transmission link mechanism, and characterized in that by only one spring means, the transmission operating part is returned to a neutral position from a transmission output position and the shift pedal is returned to an initial position from a depressed position.

The invention is the working vehicle characterized by including stroke stopping means for restricting a transmission operation of the transmission operating part, and characterized in that a range of the transmission operation of the transmission operating part, restricted by the stroke stopping means, can be adjusted in association with an adjusting operation of holding a neutral position of the spring means for holding the transmission operating means at a neutral position.

Effect of the Invention

According to the invention, in the working vehicle including: an engine mounted on a running vehicle body having front wheels and rear wheels; a hydrostatic continuously variable transmission for variably transmitting power from the engine; and a transmission case for transmitting a transmission output from the hydrostatic continuously variable transmission, a drive takeoff shaft for the front wheels that transmits a driving force to the front wheels and the hydrostatic continuously variable transmission are arranged on a center plate disposed on the front side of the transmission case. Thus, in a state where the hydrostatic continuously variable transmission and the drive takeoff shaft for the front wheels are arranged on the center plate, the center plate can be mounted on the transmission case, and the hydrostatic continuously variable transmission and the drive takeoff shaft for the front wheels can be easily mounted on or dismounted from the transmission case. Hence, the workability of assembling and maintaining the transmission case and the drive takeoff shaft for the front wheels can be improved. Further, the bearing and the like for journaling the drive takeoff shaft for the front wheels can be easily formed by the use of the center plate. Hence, the cost of manufacturing the transmission case and the like can be easily reduced.

According to the invention, the drive takeoff shaft for the front wheels is arranged on one side of the hydrostatic continuously variable transmission. Thus, as compared with a structure in which the drive takeoff shaft for the front wheels is arranged below the hydrostatic continuously variable transmission, the size in a vertical direction of the center plate can be contracted by a size in the vertical direction required to arrange the drive takeoff shaft for the front wheels. Hence, the transmission case can be formed in a compact size in the vertical direction.

According to the invention, a nearly cylindrical shaft cover is fitted on the transmission shaft for the front wheels, which is connected to the drive takeoff shaft for the front wheels, and one end side of the shaft cover is retained by a cover insertion hole formed in a bottom portion of a clutch housing disposed on the front side of the center plate. Thus, without exposing the transmission shaft for the front wheels to the outside, the transmission shaft for the front wheels can be easily connected to, for example, the front axle case or the like that can be rolled.

According to the invention, a universal coupling for connecting the drive takeoff shaft for the front wheels to the transmission shaft for the front wheels is arranged in the clutch housing. Thus, it is possible to easily prevent straw or the like from winding around the universal coupling.

According to the invention, one brake pedal is connected to right and left brakes for braking the right and left rear wheels respectively via one brake operating shaft, and the brake operating shaft is arranged in a bottom portion of the clutch housing below the hydrostatic continuously variable transmission and the universal coupling. Thus, a brake operating shaft bearing part of the brake operating shaft can be easily formed by the use of the bottom portion of the clutch housing. On the other hand, the bottom portion of the clutch housing can be formed in high rigidity by forming the brake operating shaft bearing part. Further, the universal coupling is arranged on one side of the hydrostatic continuously variable transmission. Thus, as compared with a structure in which the universal coupling is arranged below the hydrostatic continuously variable transmission, the brake operating shaft can be formed in large height from the ground level.

According to the invention, the working vehicle includes: a shift pedal connected to a transmission operating part of the hydrostatic continuously variable transmission via a transmission mechanism; and a vehicle speed holding mechanism for holding the shift pedal at a depressed position. The vehicle speed holding mechanism is provided with an engaging part and an engaged arm having a plurality of engaged claws to be engaged with or disengaged from the engaging part and is constructed in such a way that: the engaging part is connected to a manual operating lever for holding a vehicle speed; the engaged arm is connected to the shift pedal; and the engaging part can be held engaged with the engaged claws by a biasing force of an initial position return spring for returning the shift pedal to an initial position from the depressed position to thereby bring a vehicle speed nearly to zero. Thus, the engagement of the engaging part with the engaged claws can be continued by the use of the force of returning the shift pedal to the initial position from the depressed position (the force of returning the transmission output of the hydrostatic continuously variable transmission to zero). In other words, the operating force applied when the operator presses (pulls) the manual operating lever by his single hand is smaller than the depressing force applied when the operator depresses the shift pedal by his/her foot. Thus, the force of the initial position return spring can be set larger than the operating force applied to the manual operating lever by the operator and hence the engagement of the engaging part with the engaged claws cannot be easily released by the operation of the manual operating lever. For this reason, it is possible to easily prevent the engagement of the engaging part with the engaged claws from being released by the operating error of the manual operating lever and hence to improve drivability and the like. In this regard, even if the force of the initial position return spring is set larger than the force of operating the manual operating lever, the operator can easily depress the shift pedal by his/her foot and also can easily return the transmission operating part of the hydrostatic continuously variable transmission to a position where output is brought to zero.

According to the invention, the working vehicle is provided with: brake operating means for braking the rear wheels; and brake system releasing means for forcibly releasing the vehicle speed holding mechanism by a braking operation of the brake operating means, and is constructed in such a way that a drive system releasing operation of releasing the vehicle speed holding mechanism by the shift pedal and a brake system releasing operation of releasing the vehicle speed holding mechanism by the brake system releasing means can be performed independently of each other. Thus, two release means for the drive system and the brake system can be formed independently of each other and hence the vehicle speed holding mechanism can be forcibly released by at least one of the two independent release means for the drive system and the brake system. Hence, even if a malfunction occurs in any one of the two release means, the other release means can release the vehicle speed holding mechanism. Hence, the reliability of a vehicle speed holding function and the reliability of the function of releasing the vehicle speed holding function can be improved.

According to the invention, the vehicle speed holding mechanism includes an engaged arm having a plurality of engaged claws for holding the shift pedal at a depressed position and an engaging part to be engaged with or disengaged from the engaged claws and has an engaging link connected to the manual operating lever for holding a vehicle speed, the engaging part being arranged on the engaging link, the engaging link being connected to a brake pedal as the brake operating means via a release arm as the brake system releasing means for forcibly releasing the engaging part from the engaged claws. Thus, the brake system releasing means for forcibly disengaging the engaging part from the engaged claws can be easily constructed of the release arm. Hence, the reliability of a vehicle speed holding function and the reliability of the function of releasing the vehicle speed holding function can be improved.

According to the invention, the working vehicle is provided with a shift pedal connected to a transmission operating part of the hydrostatic continuously variable transmission via a transmission link mechanism and is constructed in such a way that by only one spring means, the transmission operating part is returned to a neutral position from a transmission output position and the shift pedal is returned to an initial position from a depressed position. Thus, the structure of holding the transmission operating part at the neutral position and the structure of holding the shift pedal at the initial position can be easily constructed by the use of the spring means. Hence, the workability of assembly and the workability of maintenance can be improved.

According to the invention, the working vehicle is provided with stroke stopping means for restricting a transmission operation of the transmission operating part and is constructed in such a way that a range of the transmission operation of the transmission operating part, restricted by the stroke stopping means, can be adjusted in association with an adjusting operation of holding a neutral position of the spring means for holding the transmission operating part at a neutral position. Thus, the range of restricting the transmission operation of the transmission operating part can be adjusted only by the adjusting operation of holding the transmission operating part at the neutral position and hence. Hence, the workability of maintenance and the like can be improved.

BRIEF DESCRIPTION OF THE DRAWINGS

FIG. 9 is an illustration of the side of a forward pedal, a rearward pedal, a transmission link mechanism, and the like.
FIG. 10 is an illustration of the side of the forward pedal, the rearward pedal, and the like.
FIG. 13 is an illustration of the plan of the forward pedal, the rearward pedal, and the like.
FIG. 15 is a side view illustrating the motions of a cruise lever and the like.
FIG. 16 is a side view illustrating the motions of the brake pedal, a parking brake lever, and the like.
FIG. 19 is an illustration of the plan of the brake pedal, the parking brake lever, and the like.
FIG. 21 is an illustration of the front of the brake pedal, the parking brake lever, and the like.

Figure 1:
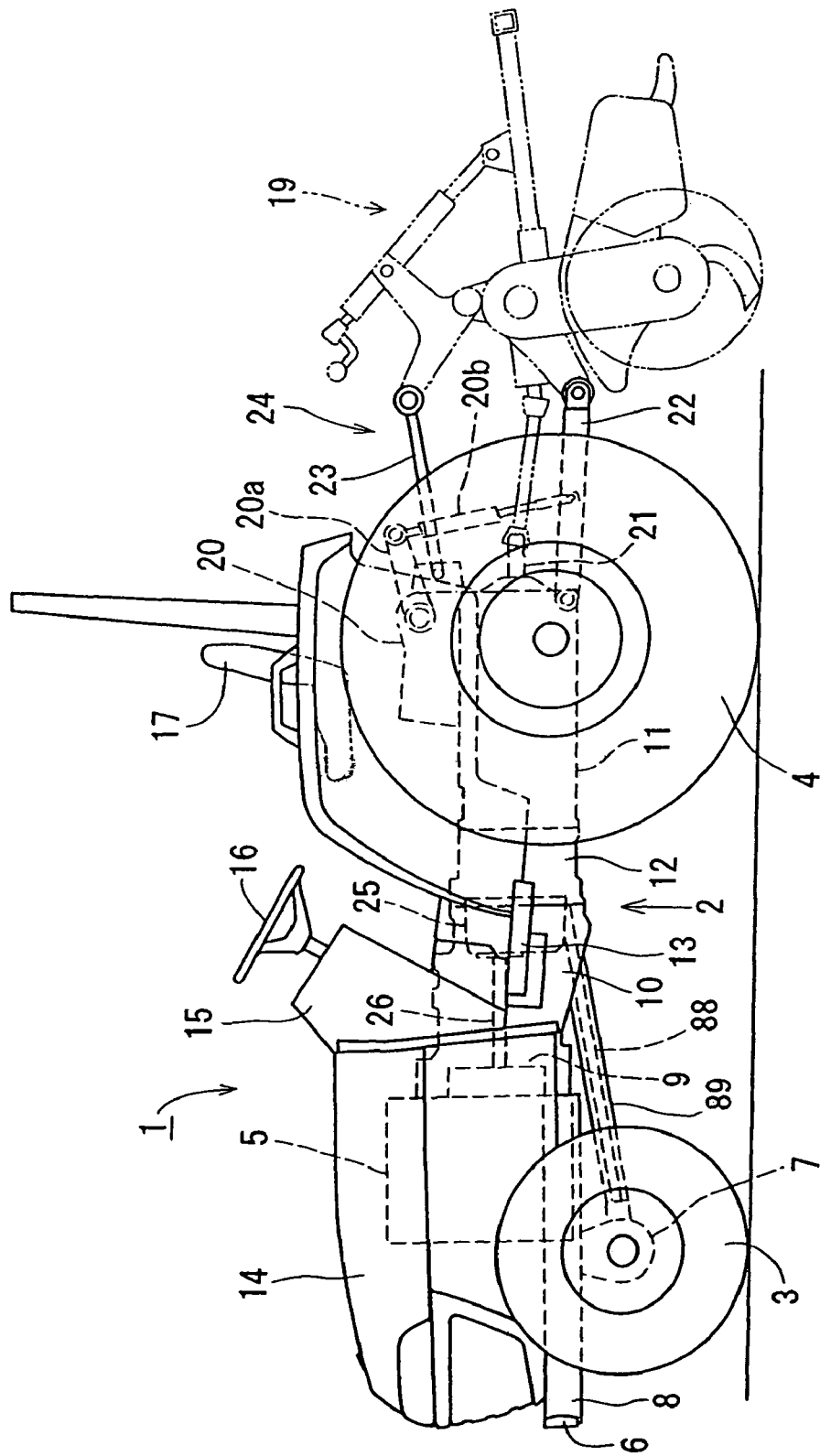
FIG. 1 is a general side view of a tractor.

BRIEF DESCRIPTION OF REFERENCE NUMERALS 2 running vehicle body
3 front wheel
4 rear wheel
5 engine
10 clutch housing
11 transmission case
12 transmission front case (center plate)
25 hydrostatic continuously variable transmission
32 brake mechanism
33 brake pedal
35 trunnion arm (transmission operating part)

36 forward pedal (shift pedal)
37 rearward pedal (shift pedal)
38 cruise lever (manual operating lever)
85 drive takeoff shaft for front wheels
88 transmission shaft for front wheels
89 shaft cover
250 first universal coupling
258 cover insertion hole
262 brake operating shaft
300 transmission link mechanism
339 neutral holding spring (spring means)
340 neutral adjusting part (stroke stopping means)
361 vehicle speed holding mechanism
372 engaged claw
363 engaging part
364 engaging link
365 engaged arm
413 releasing arm (brake system releasing means)

BEST MODE FOR CARRYING OUT THE INVENTION

Figure 2:
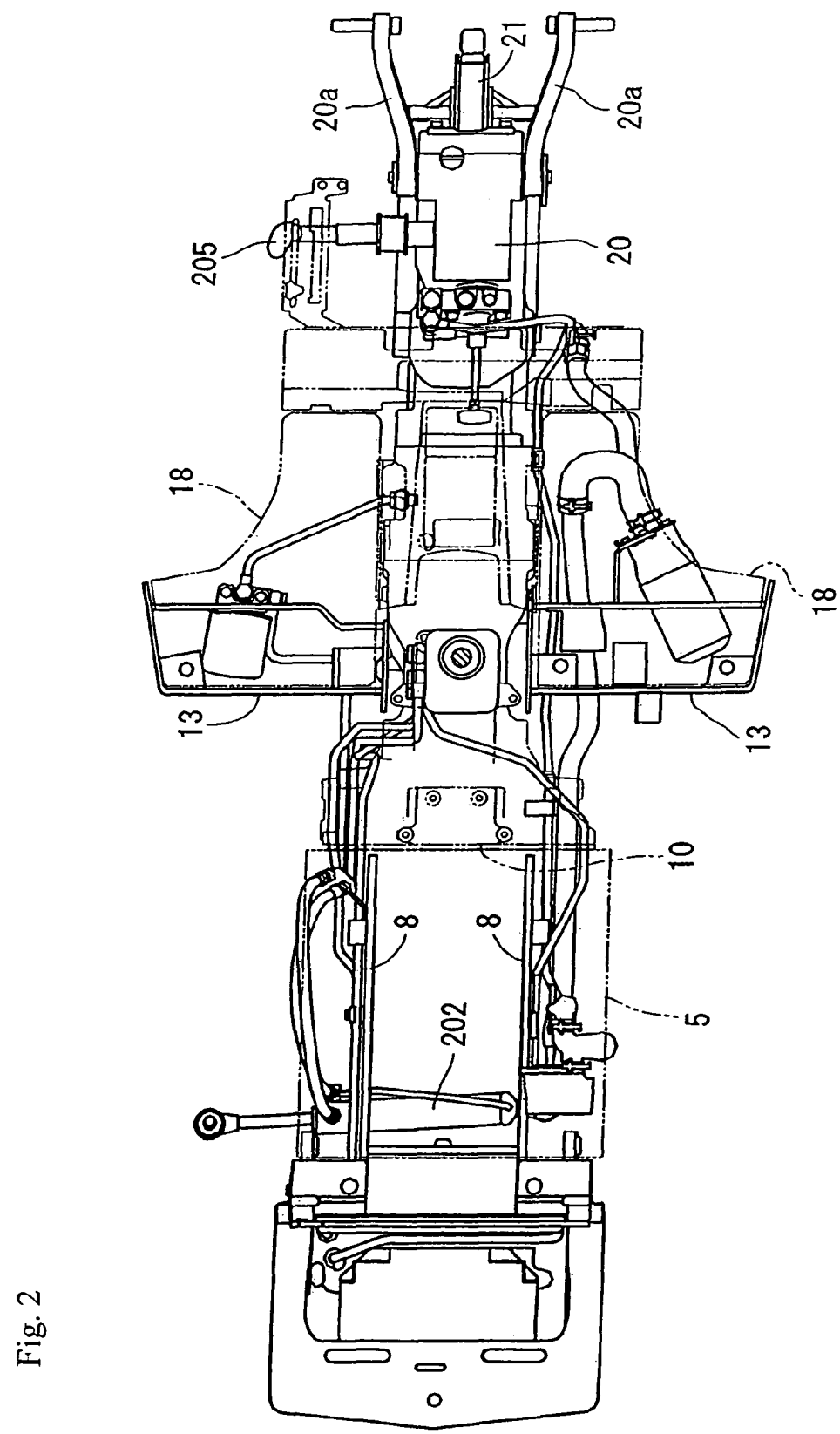
FIG. 2 is a plan view of a running vehicle body of the tractor.
Figure 3:
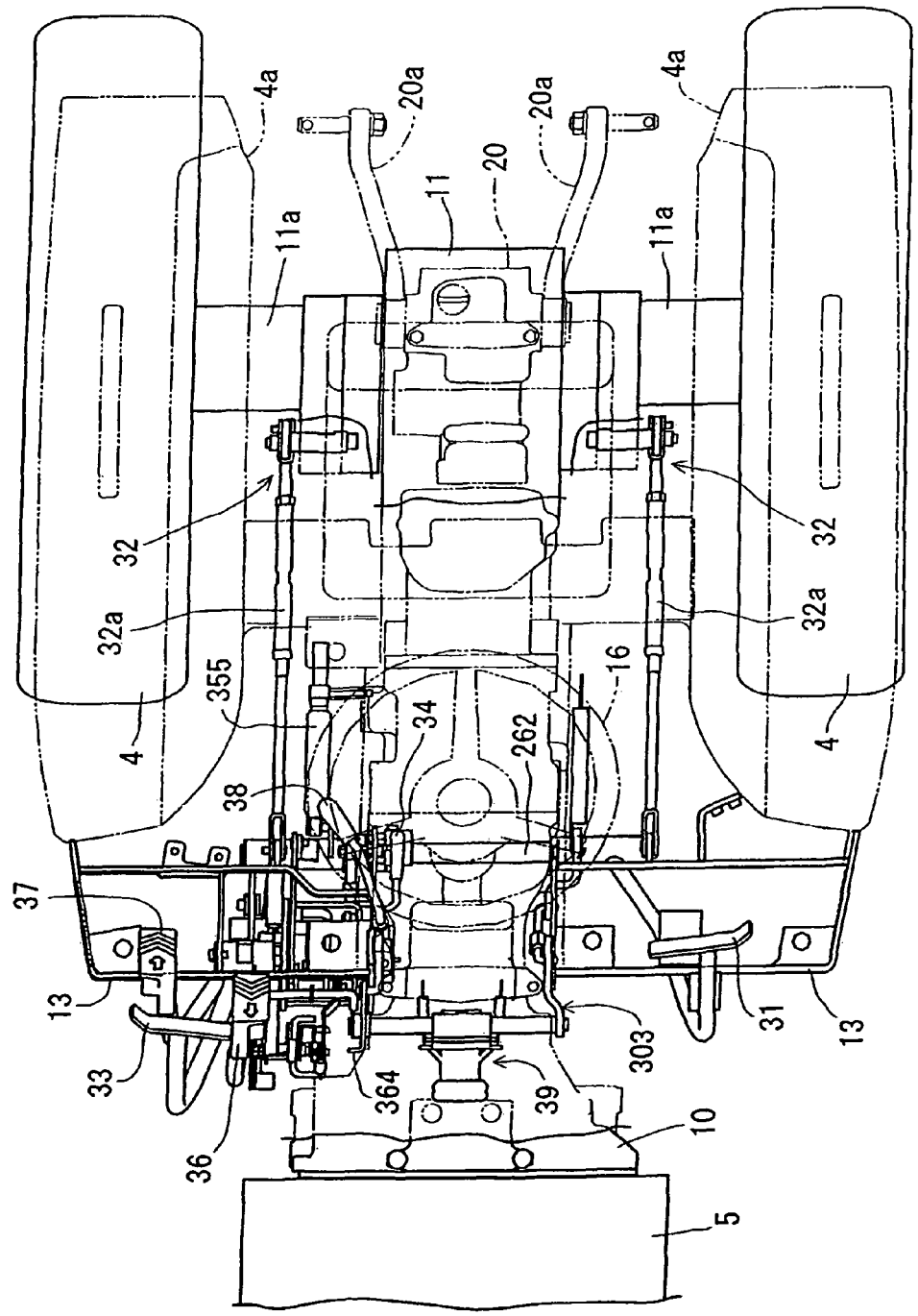
FIG. 3 is an enlarged plan view of a rear half portion of the running vehicle body.
Figure 4:
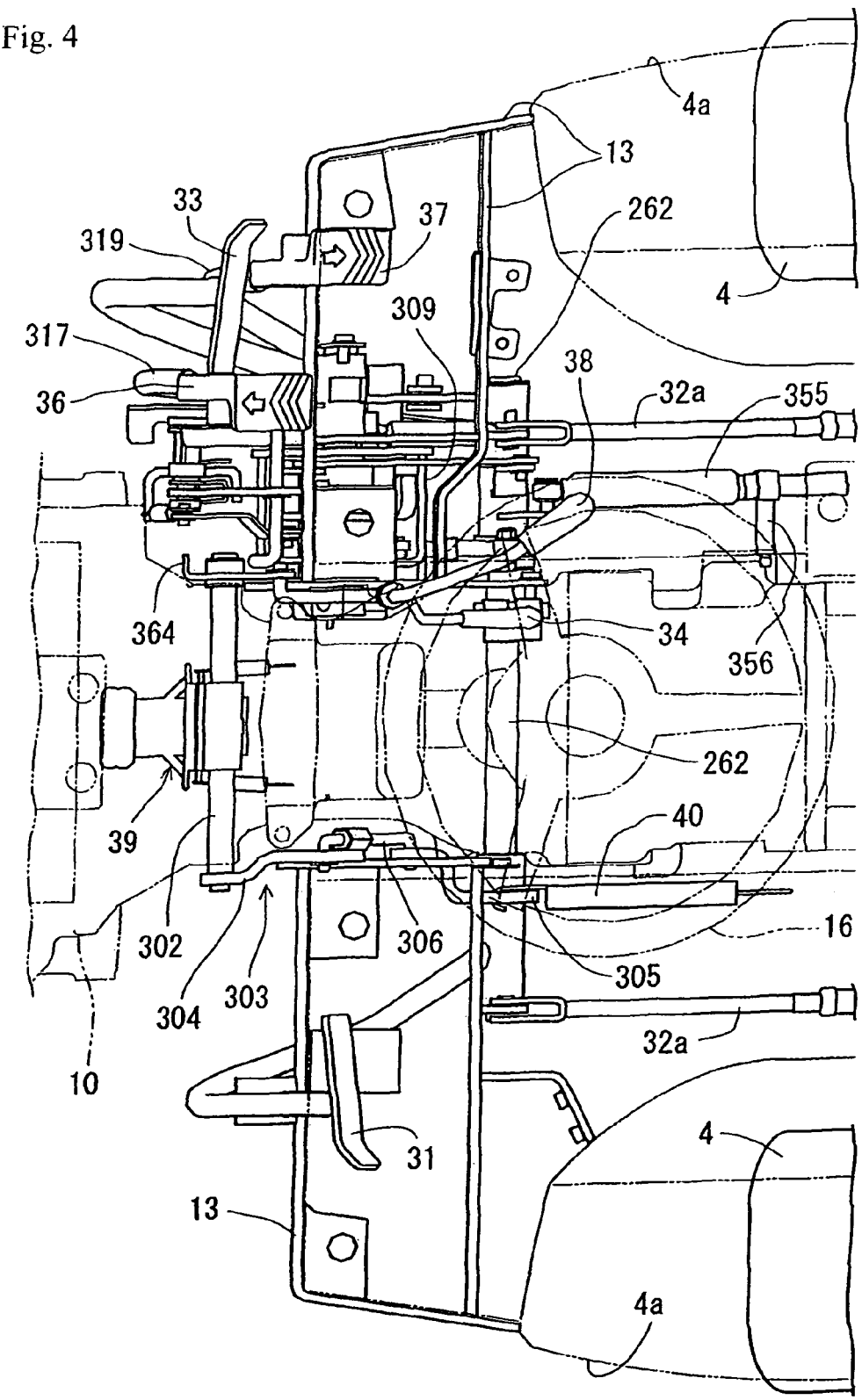
FIG. 4 is an enlarged plan view of a peripheral portion of a step frame of the running vehicle body.
Figure 5:
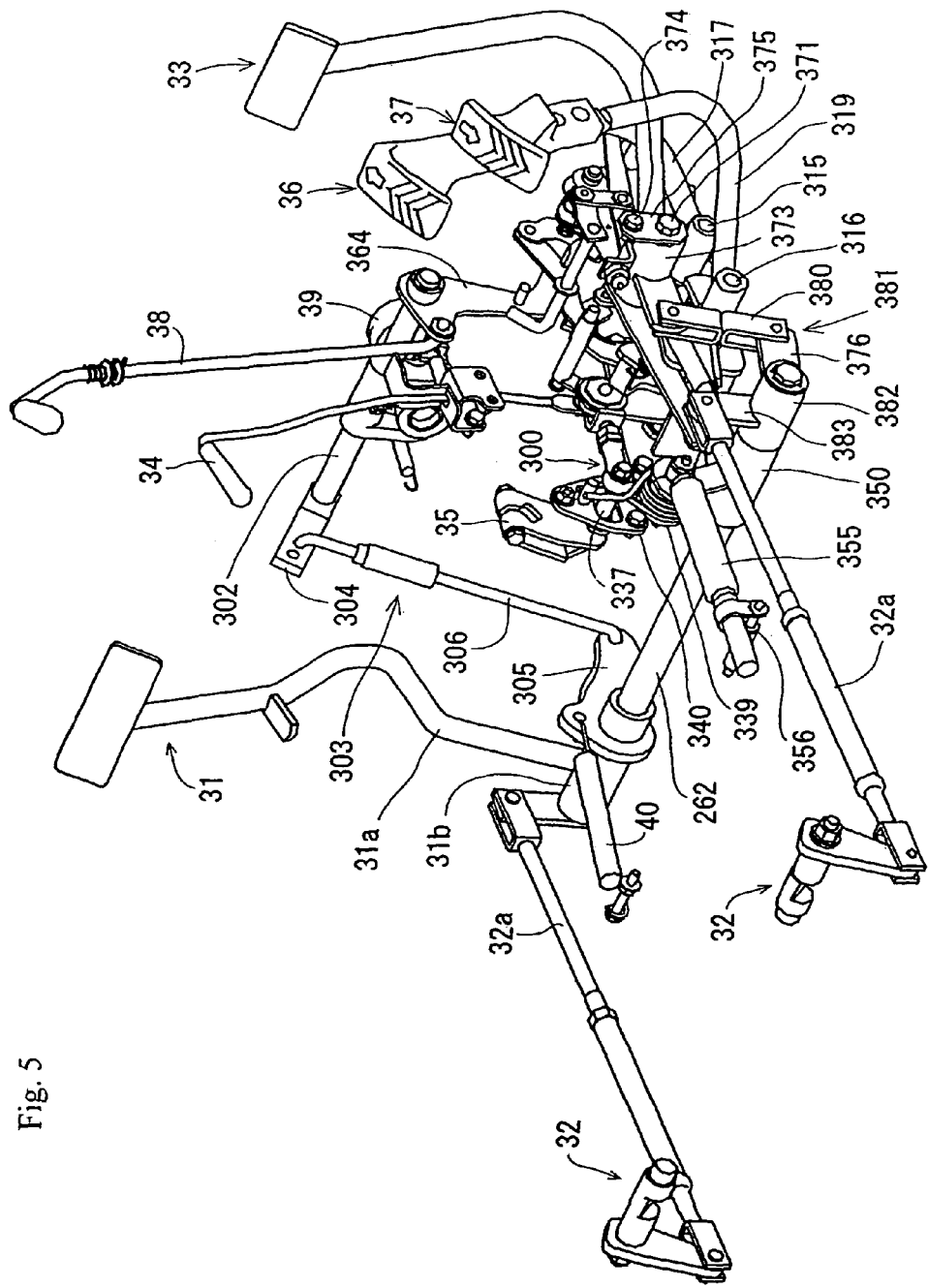
FIG. 5 is a perspective view of pedals and other parts operated by an operator.
Figure 6:
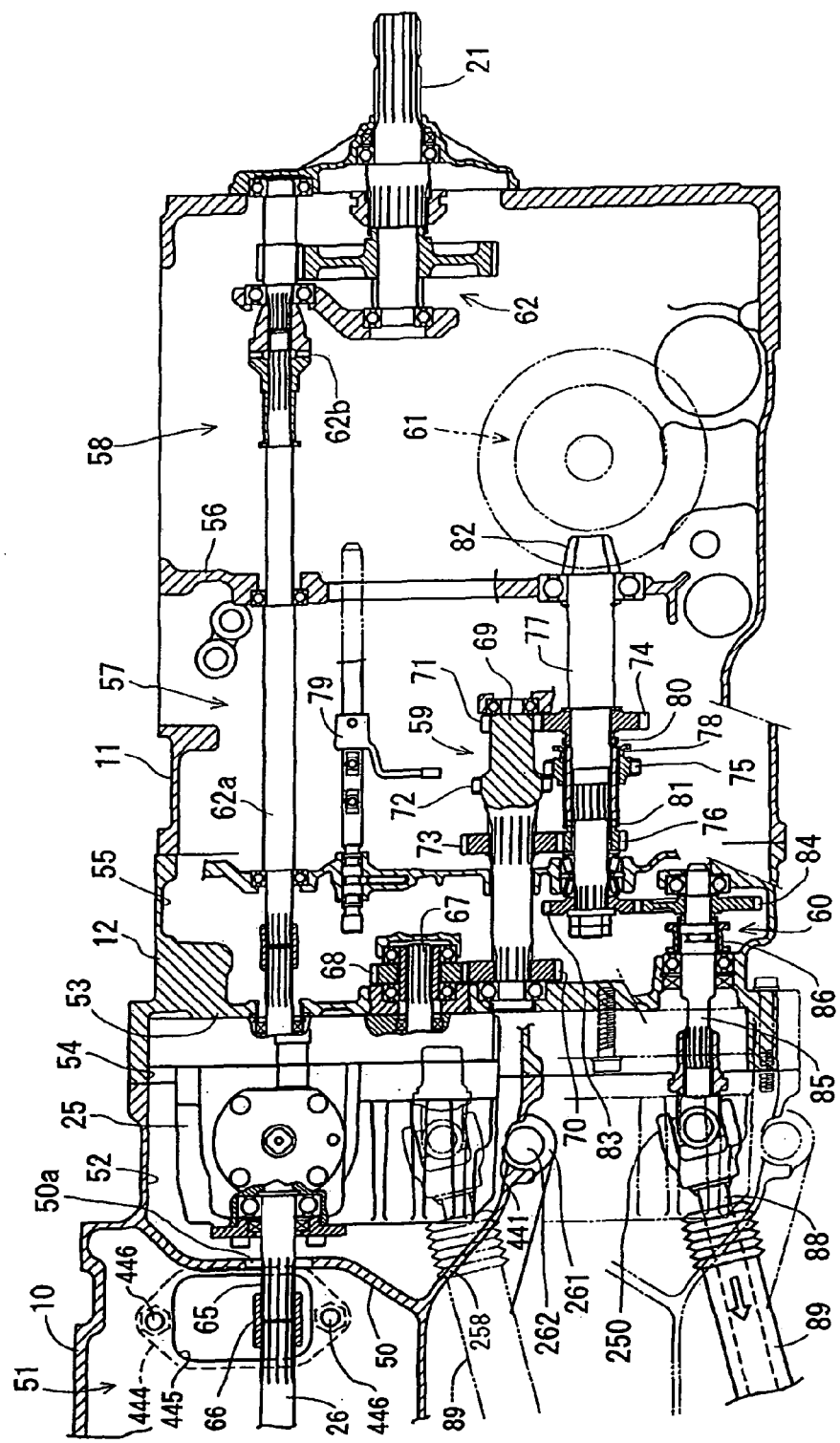
FIG. 6 is a sectional side view of a transmission case and a transmission front case.
Figure 7:
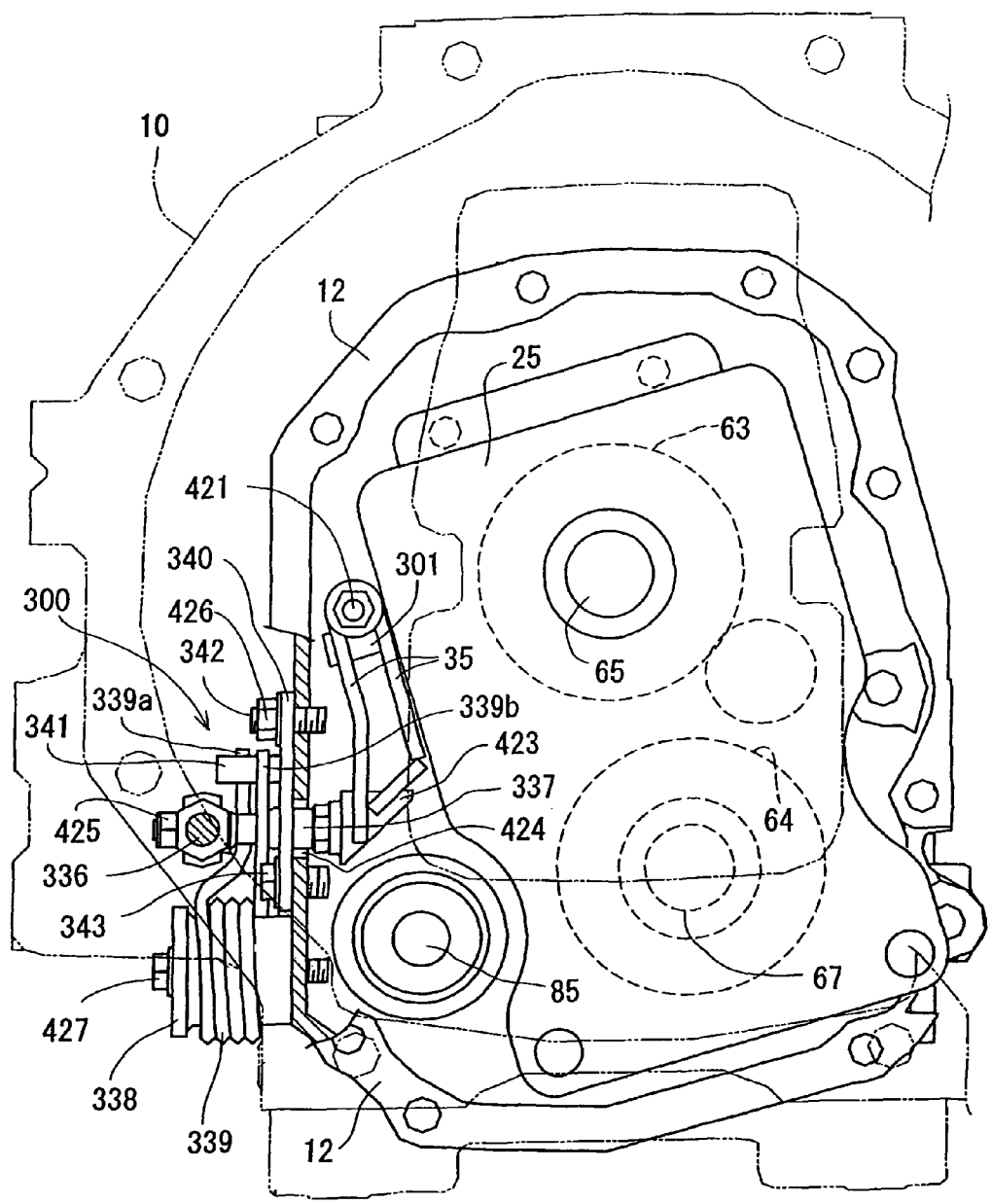
FIG. 7 is an illustration of the front side of the transmission front case.
Figure 8:
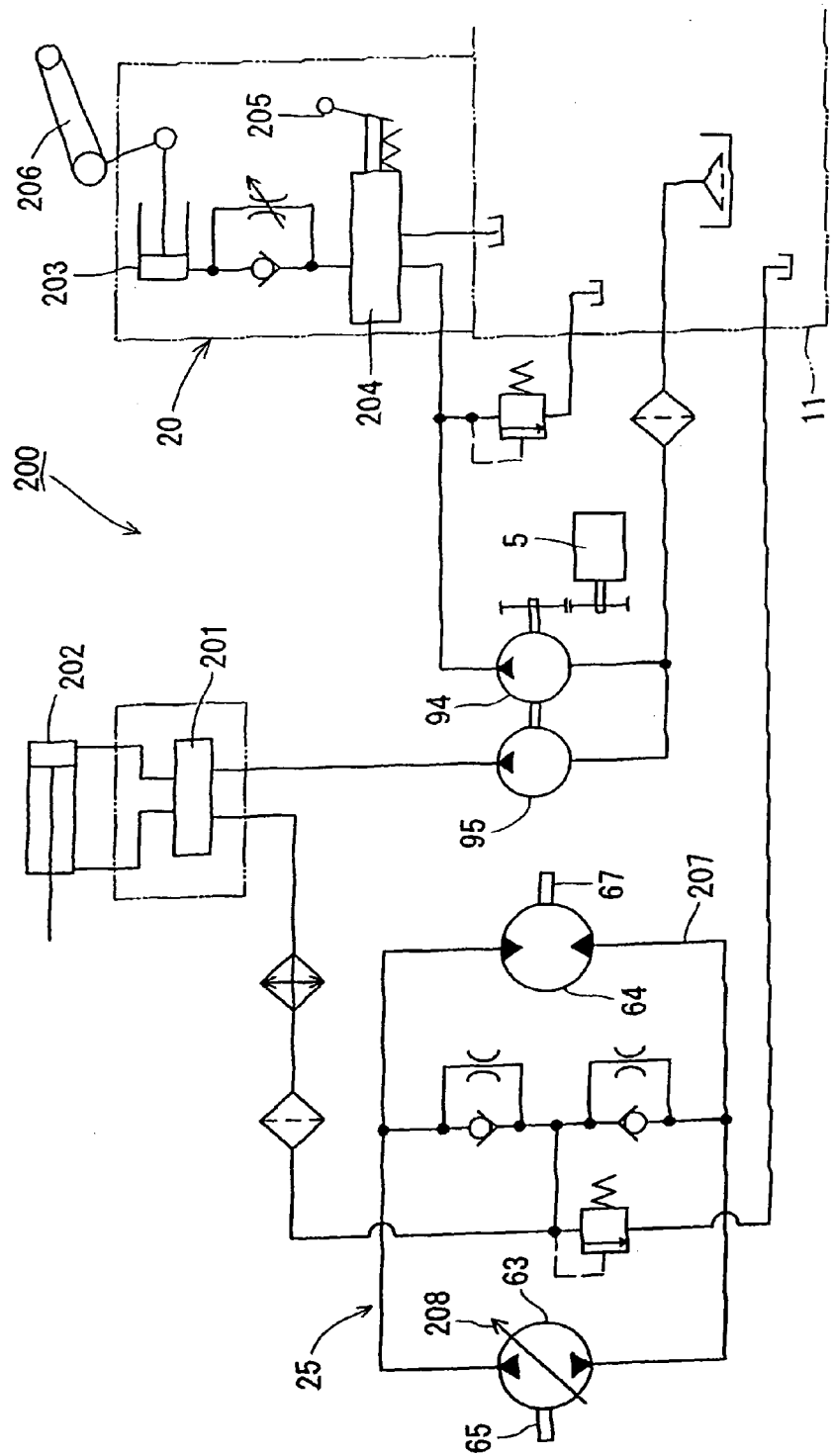
FIG. 8 is a hydraulic circuit diagram.

The embodiments of the present invention will be described below with reference to the drawings in which the present invention is applied to a farm work tractor as a working vehicle. FIG. 1 is a general side view of a tractor. FIG. 2 is a plan view of a running vehicle body of the tractor. FIG. 3 is an enlarged plan view of a rear half portion of the running vehicle body. FIG. 4 is an enlarged plan view of a peripheral portion of a step frame of the running vehicle body. FIG. 5 is a perspective view of pedals and other parts operated by an operator. FIG. 6 is a sectional side view of a transmission case and a transmission front case. FIG. 7 is an illustration of the front of the transmission front case. FIG. 8 is a hydraulic circuit diagram.

As shown in FIG. 1 and FIG. 2, a tractor 1 is constructed in the following manner: that is, the tractor 1 supports a running vehicle body 2 by a pair of left and right front wheels 3 and a pair of left and right rear wheels 4 and drives the pair of rear wheels 4 and the pair of front wheels 3 by an engine 5 mounted on the front portion of the running vehicle body 2, thereby running forward and rearward. The running vehicle body 2 includes: an engine frame 8 having a front bumper 6 and a front axle case 7; a clutch housing 10 having a main clutch 9 for connecting or disconnecting power outputted from the engine 5; a transmission case 11 for changing the revolution of the engine 5 as appropriate and transmitting the revolution to the pair of rear wheels 4 and the pair of front wheels 3; a transmission front case 12 for connecting the transmission case 11 to the clutch housing 10; and a pair of left and right step frames 13 that are removably mounted on the clutch housing 10 so as to protrude outward from the outside surface of the clutch housing 10.

Here, the rear end side of the engine frame 8 is connected to the left and right outside surfaces of the engine 5. The front side of the clutch housing 10 is connected to the rear side of the engine 5. The front side of the transmission case 11 is connected to the rear side of the clutch housing 10 via the transmission front case 12.

The engine 5 is covered with a bonnet 14. A steering column 15 is erected on the top surface of the clutch housing 10. A steering wheel 16 that can steer the vehicle by moving the pair of front wheels 3 to the left and right sides is arranged on the top surface side of the steering column 15. A steering seat 17 is arranged on the top surface of the transmission case 11. Flat floor plates 18 are fixed to the top surfaces of the pair of left and right step frames 13, respectively. Both of the front wheels 3 are mounted on the engine frame 8 via the front axle case 7. Moreover, as shown in FIG. 3, both of the rear wheels 4 are mounted on the transmission case 11 via a rear axle case 11a that is removably mounted on the transmission case 11 so as to protrude outward from the outside surface of the transmission case 11. Here, the top surface sides of both of the rear wheels 4 are covered with left and right rear fenders 4a.

A hydraulic lifting mechanism 20 for lifting a working machine 19 such as a cultivator, connected to the rear of the running vehicle body 2, is removably mounted on the top surface of the transmission case 11. Further, a power takeoff (PTO) shaft 21 for transmitting a driving force to the working machine 19 is mounted on the rear side of the transmission case 11 so as to protrude rearward. The working machine 19 is connected to the rear portion of the transmission case 11 via a three-point link mechanism 24 including a pair of left and right lower links 22 and one top link 23. A pair of left and right lift arms 20a of the lifting mechanism 20 for the working machine 19 are connected to the left and right lower links 22 via lift links 20b, and when the lifting mechanism 20 for the working machine 19 is operated, the working machine 19 is lifted.

A hydrostatic continuously variable transmission 25, which will be later described, is arranged on the front side of the transmission front case 12. The hydrostatic continuously variable transmission 25 is disposed in the back of the clutch housing 10. The revolution of the engine 5 is transmitted to the hydrostatic continuously variable transmission 25 via a main drive shaft 26 protruding rearward from the main clutch 9, and output from the hydrostatic continuously variable transmission 25 is variably transmitted as appropriate by an auxiliary transmission gear mechanism 59, which will be later described, and is transmitted to both of the rear wheels 4 and both of the front wheels 3. On the other hand, the revolution of the engine 5 from the main drive shaft 26 is transmitted to a speed reduction gear mechanism 62 for PTO output, which will be later described, via a PTO transmission shaft 62a and a PTO clutch 62b and is reduced as appropriate by the speed reduction gear mechanism 62 for PTO output and is transmitted to the PTO shaft 21.

Next, the structure of a steering part operated by the operator seated on the steering seat 17 will be described with reference to FIG. 4 and FIG. 5. A clutch pedal 31 for disengaging the main clutch 9 is arranged on the left of the steering column 15 protruding upward from the floor plate 18 forward of the steering seat 17. A clutch disengaging mechanism 39 for disengaging the main clutch 9 and a clutch engaging spring 40 for holding the clutch pedal 31 at an initial position are connected to the clutch pedal 31, and the clutch pedal 31 is held at the initial position by the clutch engaging spring 40. Moreover, a clutch operating shaft 302 is turnably journaled by the clutch housing 10, and a release fork and the like of the clutch disengaging mechanism 39 in the clutch housing 10 are arranged on the clutch operating shaft 302. Further, a boss part 31b at the base end of a pedal arm 31a of the clutch pedal 31 is turnably fitted on a brake operating shaft 262, which will be described later, and the clutch pedal 31 is connected to the clutch operating shaft 302 via a clutch operating link mechanism 303 (see FIG. 5). When the clutch pedal 31 is depressed, the main clutch 9 is disengaged. Here, the clutch operating link mechanism 303 includes: a first clutch link 305 fixed to the boss part 31b; a second clutch link 304 fixed to the clutch operating shaft 302; and a clutch rod 306 connected to the links 304 and 305.

On the other hand, a single brake pedal 33 for operating a brake mechanism 32 for braking the left and right rear wheels 4 and a parking brake lever 34 are arranged on the right of the steering column 15. The brake mechanism 32 for braking the left and right rear wheels 4 is connected to the brake pedal 33 via left and right brake rods 32a, and when the brake pedal 33 is operated, the brake mechanism 32 is activated to brake the left and right rear wheels 4. Moreover, when the parking brake lever 34 is operated, the brake pedal 33 is held set at a depressed position, and even if the operator separates his/her foot from the brake pedal 33, the rear wheels 4 are continuously braked. Here, a brake operating shaft bearing portion 261 is integrally molded on the bottom portion of the clutch housing 10. The brake operating shaft 262 is turnably journaled by the brake operating shaft bearing portion 261 (see FIG. 6). The left and right brake rods 32a are connected to the brake pedal 33 via the brake operating shaft 262 (see FIG. 5).

Further, a forward pedal 36 and a rearward pedal 37 that operate a trunnion arm 35 for the transmission operation of the continuously variable transmission 25 and a cruise lever 38 that holds the forward pedal 36 at a depressed position are arranged on the right of the steering column 15. The trunnion arm 35 is connected to the forward pedal 36 and the rearward pedal 37 via a transmission link mechanism 300, and when the forward pedal 36 or the rearward pedal 37 is depressed by the foot, the continuously variable transmission 25 performs a forward transmission operation or a rearward transmission operation.

The structures of the clutch housing 10, the transmission front case 12, and the transmission case 11 will be described with reference to FIG. 6 and FIG. 7. The interior of the clutch housing 10 is partitioned by a housing inside wall 50 in such a way as to be partitioned into front and rear portions, whereby a housing front chamber 51 and a housing rear chamber 52 are formed in the clutch housing 10. The interior of the transmission front case 12 is partitioned by a front wall 53 in such a way as to be partitioned into front and rear portions, whereby a front case front chamber 54 and a front case rear chamber 55 are formed in the transmission front case 12. The interior of the transmission case 11 is partitioned by a transmission inside wall 56 in such a way as to be partitioned into front and rear portions, whereby a transmission front chamber 57 and a transmission rear chamber 58 are formed in the transmission case 11.

The continuously variable transmission 25 arranged on the front side of the front wall 53 is disposed in a closed space formed by the housing rear chamber 52 and the front case front chamber 54. The auxiliary transmission gear mechanism 59 and the front wheel drive mechanism 60 are disposed in a closed space formed by the front case rear chamber 55 and the transmission front chamber 57. A differential gear mechanism 61 for the rear wheels 4 and the speed reduction gear mechanism 62 for PTO output are disposed in the transmission rear chamber 58.

Next, the main transmission structure of the continuously variable transmission 25 will be described. The continuously variable transmission 25 includes: a hydraulic pump 63 for transmission; and a hydraulic motor 64 for transmission operated by the hydraulic pump 63 (see FIG. 7). A front end of a transmission input shaft 65 of the continuously variable transmission 25 is protruded into the housing front chamber 51 via a through hole 50a formed in the housing inside wall 50. A rear end of the main drive shaft 26 is coupled to the front end of the transmission input shaft 65 via a coupling 66. A main transmission output shaft 67 of the continuously variable transmission 25 is protruded into the front case rear chamber 55. A main transmission output gear 68 is fitted on the main transmission output shaft 67. A counter input gear 70 is fitted on the counter shaft 69 of the auxiliary transmission gear mechanism 59. The counter input gear 70 is engaged with the main transmission output gear 68. A continuously transmission output from the main transmission output shaft 67 is transmitted to the counter shaft 69 via the main transmission output gear 68 and the counter input gear 70.

Next, the auxiliary transmission gear mechanism 59 will be described. A first-speed (low speed) counter gear 71 for auxiliary transmission and a second-speed (middle speed) counter gear 72 for auxiliary transmission are integrally formed on the counter shaft 69. Moreover, a third-speed (high speed) counter gear 73 for auxiliary transmission is fitted on the counter shaft 69. Further, there are provided a first-speed output gear 74 for auxiliary transmission that is engaged with the first-speed counter gear 71, a second-speed output gear 75 for auxiliary transmission that is engaged with the second-speed counter gear 72, and a third-speed output gear 76 for auxiliary transmission that is engaged with the third-speed counter gear 73. The first-speed output gear 74 and the third-speed output gear 76 are rotatably fitted on an auxiliary transmission output shaft 77 of the auxiliary transmission gear mechanism 59. An auxiliary transmission slider 78 capable of sliding in the axial direction of the auxiliary transmission output shaft 77 and rotating integrally with the auxiliary transmission output shaft 77 is fitted on the auxiliary transmission output shaft 77. The second-speed output gear 75 is formed integrally with the auxiliary transmission slider 78.

Hence, when the auxiliary transmission slider 78 is moved by the operation of an auxiliary transmission shifter 79, the second-speed output gear 75 is engaged with the second-speed counter gear 72. On the other hand, the auxiliary transmission slider 78 is selectively coupled to the first-speed output gear 74 or the third-speed output gear 76 via a clutch claw 80 for the first speed or a clutch claw 81 for the third speed. In other words, the revolution of the auxiliary transmission output shaft 77 is changed in three steps via any one of the first-speed output gear 74, the second-speed output gear 75, and the third-speed output gear 76.

On the other hand, the rear end side of the auxiliary transmission output shaft 77 is protruded into the transmission rear chamber 58. Moreover, a pinion gear 82 for transmitting a rotational force to a differential gear mechanism 61 for the rear wheels 4 is integrally formed on the rear end side of the auxiliary transmission output shaft 77. Power from the auxiliary transmission output shaft 77 is transmitted to the left and right rear wheels 4 via the pinion gear 82 and the differential gear mechanism 61.

Next, a front wheel drive mechanism 60 will be described. An output shaft 85 for the front wheels 3 of the front wheel drive mechanism 60 is connected to the front end side of the auxiliary transmission output shaft 77 via front wheel drive gears 83, 84. The front wheel drive gear 84 and an output clutch 86 for the front wheels 3 are arranged on the rear end side of the output shaft 85 for the front wheels 3 that is protruded into the front case rear chamber 55, the front wheel drive gear 84 being fitted on the output shaft 85 for the front wheels 3, the output clutch 86 for the front wheels 3 engaging the front wheel drive gear 84 with the output shaft 85 for the front wheels 3 in such a way as to be disengaged therefrom. Further, the middle portion of the output shaft 85 for the front wheels 3 is supported by the front wall 53 via a ball bearing. The front end side of the output shaft 85 for the front wheels 3 is protruded into the front case front chamber 54.

Further, the rear end of a transmission shaft 88 for the front wheels 3 is coupled to the front end of the output shaft 85 for the front wheels 3 via a universal coupling 250. The front end side of the transmission shaft 88 for the front wheels 3 is extended forward of the running vehicle body 2 and a driving force is transmitted to the front wheels 3 from the front end side of the transmission shaft 88 for the front wheels 3 via the front axle case 7. A shaft cover 89 made of a synthetic resin pipe is fitted on the transmission shaft 88 for the front wheels 3 and hence the transmission shaft 88 for the front wheels 3 is protected by the shaft cover 89.

As shown in FIG. 7, a drive takeoff shaft 85 for the front wheels 3 is interposed between the continuously variable transmission 25 and the transmission link mechanism 300. In other words, the hydrostatic continuously variable transmission 25 is fixed to the transmission front case 12 on the slant to the right side of the running vehicle body 2 when viewed from the front, so a space for disposing the drive takeoff shaft 85 for the front wheels 3 can be easily secured in the transmission front case 12 between the right side of the continuously variable transmission 25 and the transmission link mechanism 300.

Further, the transmission link mechanism 300 arranged on the right side of the running vehicle body 2 in the direction of travel and the bottom end side of the trunnion arm 35 arranged on the right side of the hydrostatic continuously variable transmission 25 can be arranged close and opposite to each other across the right wall of the clutch housing 10. In addition, the right side of the hydrostatic continuously variable transmission 25 and the top end side of the trunnion arm 35 can be arranged close to each other, so that a trunnion shaft 301 for supporting the trunnion arm 35 to the hydrostatic continuously variable transmission 25 can be formed in a short length. Here, the trunnion shaft 301 is formed of base material of a bar shaped like a hexagonal column by cutting and is combined with the case of the hydrostatic continuously variable transmission 25 from outside the clutch housing 10, and the trunnion arm 35 is removably fixed to the tip end of the trunnion shaft 301 formed into a square column.

FIG. 8 shows a hydraulic circuit 200 of the tractor 1 of this embodiment and the hydraulic circuit 200 includes a hydraulic pump 94 for a working machine and a charging hydraulic pump 95 that are operated by the rotational force of the engine 5. The charging hydraulic pump 95 is connected to a double-acting steering hydraulic cylinder 202 for power steering by the steering wheel 16 via a steering control valve 201 for power steering. Further, the hydraulic pump 94 for a working machine is connected to a hydraulic pressure switching valve 204 for lifting that supplies working oil to a single-acting hydraulic cylinder 203 for lifting in the lifting mechanism 20 for a working machine.

Hence, when the operator operates a position lever 205 to switch the hydraulic pressure switching valve 204 for lifting to operate the hydraulic cylinder 203 for lifting to thereby turn a lift arm 20a, the working machine 19 is lifted up or down via a lower link 22.

As shown in FIG. 8, the variable displacement type hydraulic pump 63 for transmission of the hydrostatic continuously variable transmission 25 and the fixed displacement type hydraulic motor 64 for transmission, operated by high-pressure working oil discharged from the hydraulic pump 63, have their suction sides and discharge sides connected to each other via a closed loop oil passage 207. When the angle of a swash plate 208 of the hydraulic pump 63 for transmission driven via the transmission input shaft 65 is regulated, the number of revolutions of the main transmission output shaft 67 driven via the hydraulic motor 64 for transmission is changed. Here, the above-mentioned hydraulic circuit 200, as shown in FIG. 8, includes relief valves, a flow control valve, check valves, an oil cooler, oil filters, and the like.

Next, the embodiment of the present invention will be described with reference to FIG. 25 to FIG. 30. The continuously variable transmission 25 is disposed in the housing rear chamber 52 and the front case front chamber 54, and the continuously variable transmission 25 is removably fixed to the front wall 53 of the transmission front case 12 with plural bolts 230. Further, the through hole 53a for PTO transmission that connects the front case front chamber 54 to the front case rear chamber 55 is formed in the front wall 53 of the transmission front case 12. A PTO drive shaft 231 is protruded into the front case rear chamber 55 disposed rearward from the rear side of the continuously variable transmission 25 via the through hole 53a. In the front case rear chamber 55, the rear end side of the PTO drive shaft 231 is coupled to the front end side of the PTO transmission shaft 62a via the coupling 232 in such a way as to be removed in the axial direction.

Hence, when the continuously variable transmission 25 is removed forward of the vehicle body (in the direction of travel) from the front wall 53, the rear end side of the PTO transmission drive shaft 231 is removed from the coupling 232 with the coupling 232 left on the front end side of the PTO transmission shaft 62a, and the PTO drive shaft 231 is separated from the PTO transmission shaft 62a. Here, the front end portion of the PTO transmission shaft 62a is rotatably journaled by a partition wall 233 in the front case rear chamber 55 via a ball bearing 234.

On the other hand, as shown in FIG. 25, FIG. 26, FIG. 29, and FIG. 30, a bearing wall portion 245 is integrally formed in the front case rear chamber 55 and the rear end portion of the above-mentioned drive takeoff shaft 85 for the front wheels 3 is rotatably journaled by the bearing wall portion 245 via a ball bearing 246. Further, the middle portion of the drive takeoff shaft 85 for the front wheels 3 is rotatably journaled by the front wall 53 via a ball bearing 247. In other words, the large diameter gear 84 for driving four wheels and the output clutch 86 for the front wheel 3 are arranged on the drive takeoff shaft 85 for the front wheels 3 between the ball bearings 245 and 246, and the front end side of the drive takeoff shaft 85 for the front wheels 3 is protruded into the front case front chamber 54.

Hence, when an operating lever (not shown) for switching between two wheel drive and four wheel drive is operated to move the output clutch 86 for the front wheels 3 from a two-wheel-drive switching position (state shown in FIG. 13) determined via detent balls 248 to a four-wheel-drive switching position in which the output clutch 86 for the front wheels 3 is engaged with a four-wheel-drive clutch claw 249 formed on the large diameter gear 84 for driving four wheels, the drive takeoff shaft 85 for the front wheels 3 is connected to the auxiliary transmission output shaft 77 via a small diameter gear 83 for driving four wheels, the large diameter gear 84 for driving four wheels, and the output clutch 86 for the front wheels 3.

Figure 26:
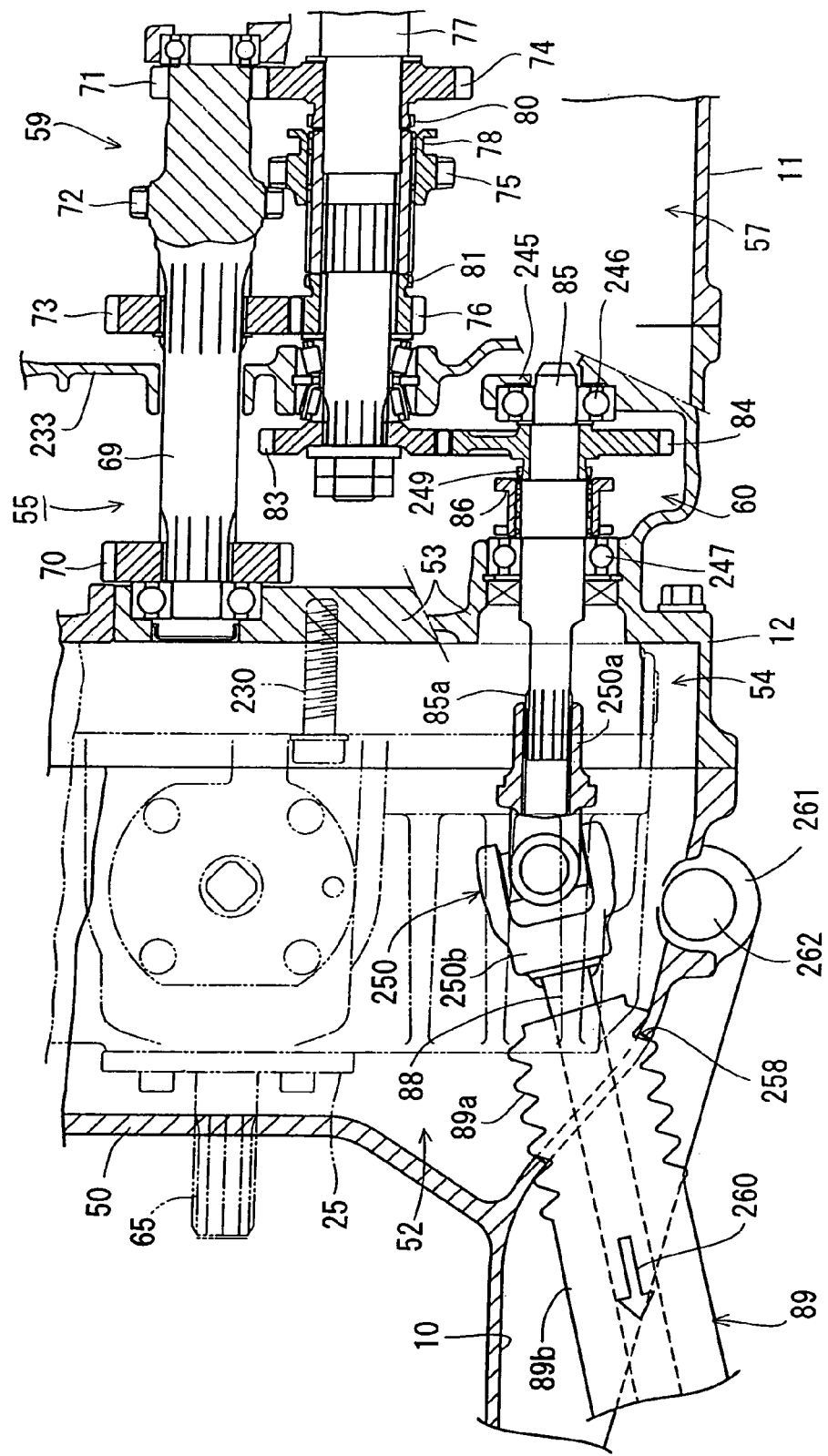
FIG. 26 is an illustration, on an enlarged scale, of a portion in FIG. 9.
Figure 27:
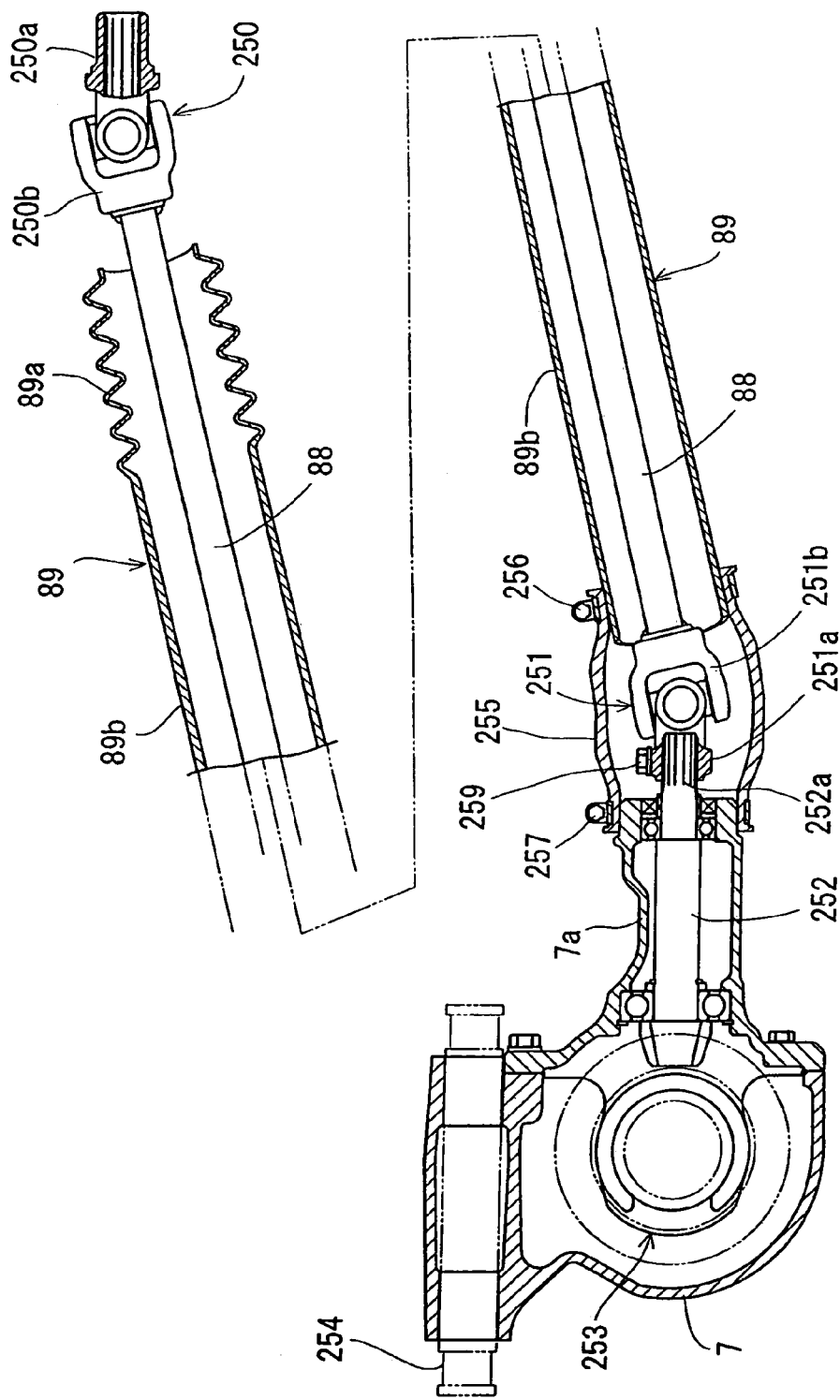
FIG. 27 is a sectional side view showing the structure of mounting a shaft cover.
Figure 28:
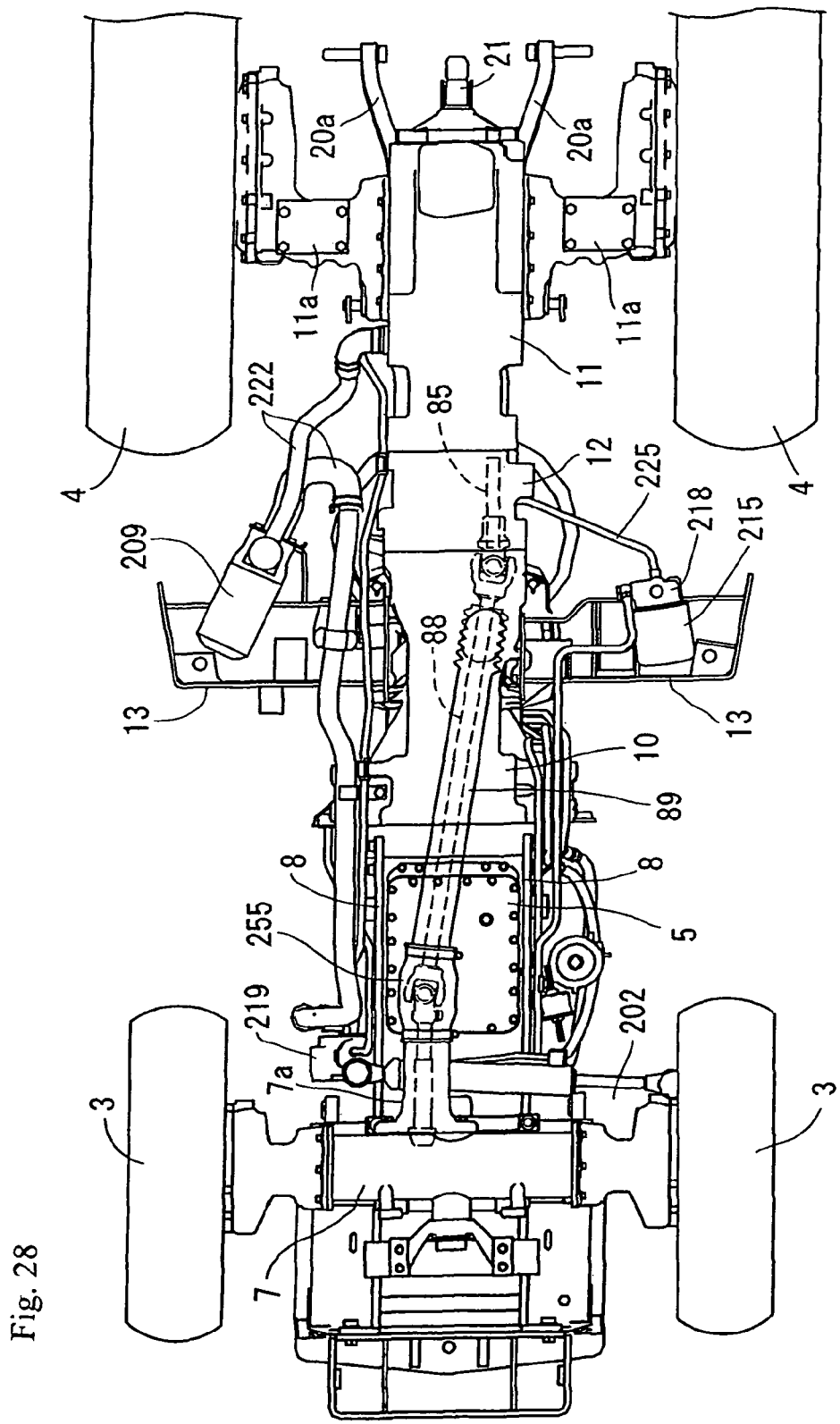
FIG. 28 is a bottom view of a running vehicle body.
Figure 29:
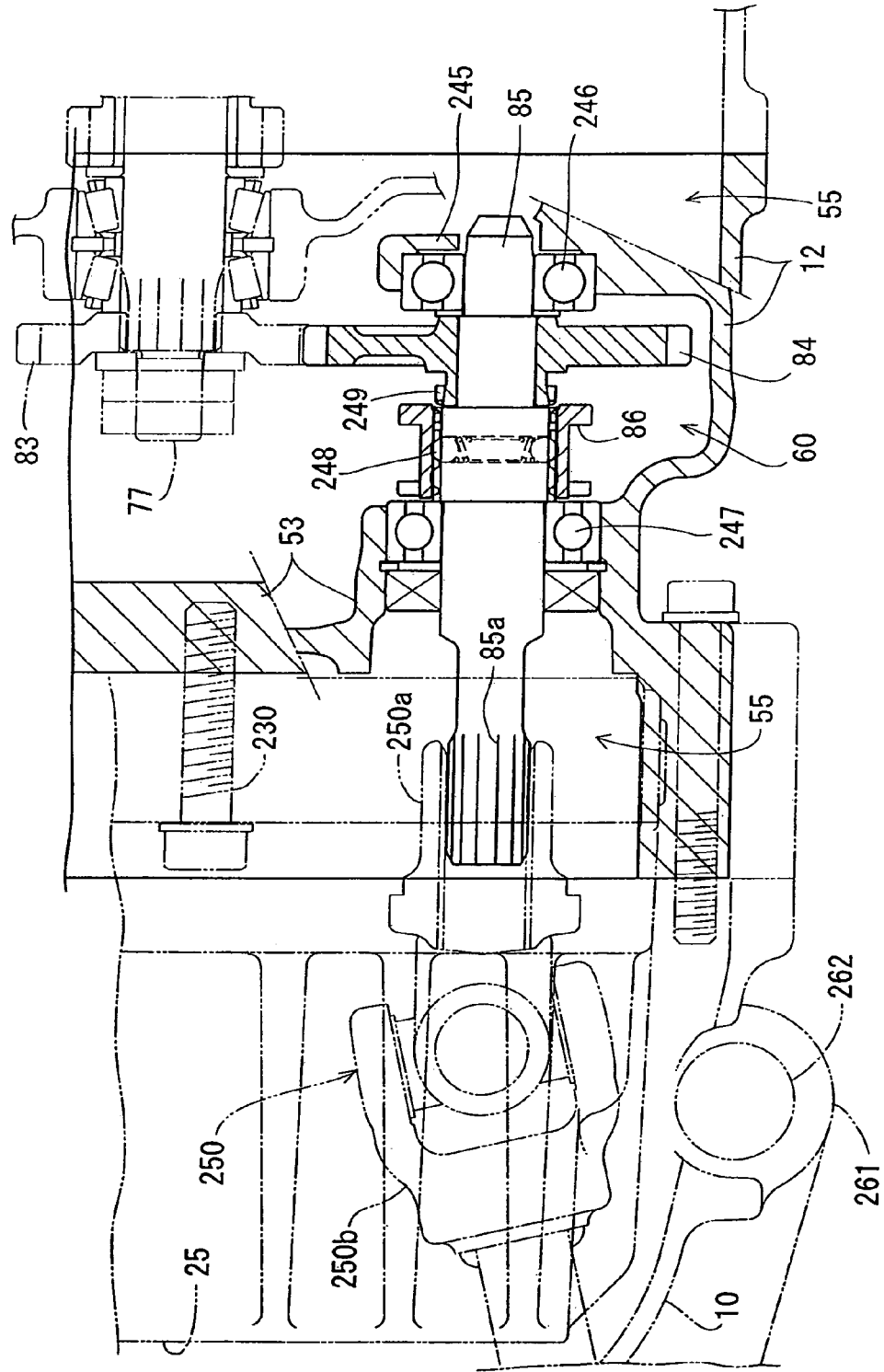
FIG. 29 is an illustration of the side of the drive takeoff shaft for front wheels.

As shown in FIG. 26 and FIG. 27, one coupling part 250a of the first universal coupling 250 is removably fitted, via a spline 85a, on the front end portion of the drive takeoff shaft 85 for the front wheels 3 in the front case front chamber 54. The coupling part 250a is coupled to the drive takeoff shaft 85 for the front wheels 3 in such a way as to be moved in the axial direction by the guide of the spline 85a. The other coupling part 250b of the first universal coupling 250 is fixed, by welding, to one end side (rear end side) of the transmission shaft 88 for the front wheels 3. Further, one coupling part 251b of a second universal coupling 251 is fixed, by welding, to the other end side (front end side) of the transmission shaft 88 for the front wheels 3. The other coupling part 251a of the second universal coupling 251 is removably fitted, via a spline 252a, on one end side (rear end side) of the front wheel drive shaft 252. Here, the coupling part 251a is fixed to the front wheel drive shaft 252 via a bolt 259.

The front wheel drive shaft 252 is rotatably disposed in an input shaft case 7a forming a portion of the above-mentioned front axle case 7. The left and right front wheels 3 are connected to the front drive shaft 252 via the front wheel differential gear mechanism 252 in the front axle case 7. Hence, power rotating the front wheels 3 is transmitted to the transmission shaft 88 for the front wheels 3 from the drive takeoff shaft 85 for the front wheels 3 and is transmitted to the front wheel drive shaft 252 from the transmission shaft 88 for the front wheels 3 and is transmitted to the left and right front wheels 3 from the front wheel drive shaft 252 via the front wheel differential gear mechanism 253, whereby the left and right front wheels 3 are driven.

In this regard, the front axle case 7 is connected to the engine frame 8 via a front axle center pin 254 passed through the front axle case 7 in the direction of travel. Hence, when a difference is caused between contact pressures with the ground of the left and right front wheels 3, the front axle case 7 is turned around the front axle center pin 254 to move up and down the left and right front wheels 3, whereby the contact pressures with the ground of the left and right front wheels 3 are held nearly equal to each other.

As shown in FIG. 26 to FIG. 28, and FIG. 30, the shaft cover 89 is made of synthetic resin and is constructed of a bellows insertion part 89a and a cylindrical part 89b. The bellows insertion part 89a, which is molded of synthetic resin and can be flexibly extended and contracted, is connected integrally with one end side of the cylindrical part 89b. Further, the inside diameter of the cylindrical part 89b is formed in a size larger than the outside diameter of the first universal coupling 250 and the outside diameter of the second universal coupling 251. The transmission shaft 88 for the front wheels 3 having the first universal coupling 250 and the second universal coupling 251 is inserted into the hollow portion of the cylindrical part 89b, and the transmission shaft 88 for the front wheels 3 is passed through the shaft cover 89, and the transmission shaft 88 for the front wheels 3 has the shaft cover 89 fitted thereon.

As shown in FIG. 27, one end portion of a synthetic rubber boot 255 in a nearly cylindrical shape is fitted on the other end portion of the cylindrical part 89b, which is opposite to the side where the bellows insertion part 89a is formed. The one end portion of the synthetic rubber boot 255 or resin molding cover boot 225 is removably fixed to the cylindrical part 89b with a fastening band 256. Further, the other end portion of the synthetic rubber boot 255 is fitted on the rear end portion of the input shaft case 7a. The other end portion of the synthetic rubber boot 255 is removably fixed to the input shaft case 7a with a fastening band 257. The second universal coupling 251 is disposed in the hollow portion of the synthetic rubber boot 255.

Hence, when the front axle case 7 is rolled, the first universal coupling 250 and the second universal coupling 251 are bent, and when the second universal coupling 251 is bent, the synthetic rubber boot 255 is deformed and the coupling part 250a is moved in the axial direction of the drive takeoff shaft 85 for the front wheels 3. In other words, when a difference is caused between the contact pressures with ground of the left and right front wheels 3 to roll the front axle case 7, the transmission shaft 88 for the front wheels 3 is swung around a pivot of the first universal coupling 250 to move the front wheel drive shaft 252 with respect to the drive takeoff shaft 85 for the front wheels 3, but the drive takeoff shaft 85 for the front wheels 3 is held connected with the front wheel drive shaft 252 via the transmission shaft 88 for the front wheels 3 and the contact pressures with the ground of the left and right front wheels 3 are held equal to each other.

The axis of the drive takeoff shaft 85 for the front wheels 3 and the axis of the front wheel drive shaft 252 are nearly parallel to the center line of the running vehicle body 2 in the direction of travel (back-and-forth direction). Height from the ground of the drive takeoff shaft 85 for the front wheels 3 is larger than height from the ground of the front wheel drive shaft 252. Further, the drive takeoff shaft 85 for the front wheels 3 is arranged to the right side from the center of the running vehicle body 2 in the direction of travel, and the front wheel drive shaft 252 is arranged to the left side from the center of the running vehicle body 2 in the direction of travel. In other words, the transmission shaft 88 for the front wheels 3 that connects the drive takeoff shaft 85 for the front wheels 3 to the front wheel drive shaft 252 is disposed on the slant in the back-and-forth direction and in the right-and-left direction on the bottom side of the running vehicle body 2.

On the other hand, a cover insertion hole 258 for removably retaining the bellows insertion part 89a is formed in the bottom portion of the clutch housing 10 of a casting. The cover insertion hole 258 is formed when the clutch housing 10 is cast (see FIG. 14). The inside diameter of the cover insertion hole 258 is smaller than the outside diameter of the crest portions of the bellows insertion part 89a in a normal state. Further, the inside diameter of the cover insertion hole 258 is larger than the outside diameter of the bottom portions of the bellows insertion part 89a in a normal state. In other words, the inside diameter of the cover insertion hole 258 is formed in an intermediate size between the outside diameter of the crest portions and the outside diameter of the bottom portions of the bellows insertion part 89a in the normal state.

Hence, when the bellows insertion part 89a is inserted into the cover insertion hole 258, the bellows insertion part 89a in a state where the bellows insertion part 89a is extended in the axial direction to reduce its outside diameter is inserted into the cover insertion hole 258. Further, after the bellows insertion part 89a is inserted into the cover insertion hole 258, the bellows insertion part 89a is contracted in the axial direction by its flexibility to return its outside diameter to an original size, whereby the crest portions of the bellows insertion part 89a are caught on the edge of the cover insertion hole 258 to prevent the bellows insertion part 89a from being extracted from the cover insertion hole 258.

As is clear from FIG. 6, FIG. 25, FIG. 26, and FIG. 29, in the power transmission device in the working vehicle provided with: the engine 5 mounted on the running vehicle body 2 having the front wheels 3 and the rear wheels 4; the hydrostatic continuously variable transmission 25 for variably transmitting power from the engine 5; and the transmission case 11 for transmitting the transmission output from the hydrostatic continuously variable transmission 25, the drive takeoff shaft 85 for the front wheels 3 that transmits a driving force to the front wheels 3 and the hydrostatic continuously variable transmission 25 are arranged in the transmission front case 12 as the center plate disposed on the front side of the transmission case 11. Thus, in a state where the hydrostatic continuously variable transmission 25 and the drive takeoff shaft 85 for the front wheels 3 are combined with the transmission front case 12, the transmission front case 12 can be mounted on the transmission case 11 and hence the hydrostatic continuously variable transmission 25 and the drive takeoff shaft 85 for the front wheels 3 can be easily mounted on or dismounted from the transmission case 11. Hence, the workability of assembling and maintaining the transmission case 11 and the drive takeoff shaft 85 for the front wheels 3 can be improved. Further, the bearings for journaling the drive takeoff shaft 85 for the front wheels 3 can be easily formed by the use of the transmission front case 12. Hence, the cost of manufacturing the transmission case 11 and the like can be easily reduced.

As is clear from FIG. 7 and FIG. 26, the drive takeoff shaft 85 for the front wheels 3 is arranged on one side of the hydrostatic continuously variable transmission 25. Hence, as compared with a structure in which the drive takeoff shaft 85 for the front wheels 3 is arranged below the hydrostatic continuously variable transmission 25, the size in the up-and-down direction of the transmission front case 12 can be reduced by a size required to arrange the drive takeoff shaft 85 for the front wheels 3. Hence, the transmission case 11 can be formed in a compact size in the up-and-down direction.

In other words, as shown in an illustration of the front of the transmission front case 12 in FIG. 7, the hydrostatic continuously variable transmission 25 is fixed to the transmission front case 12 on the slant to the right side of the running vehicle body 2 when viewed from the front. Hence, the trunnion arm 35 arranged on the right side of the hydrostatic continuously variable transmission 25 can be arranged opposite and close to the transmission link mechanism 35*a* arranged on the right side of the running vehicle body 2 in the direction of travel, and a space for disposing the drive takeoff shaft 85 for the front wheels 3 can be easily secured in the transmission front case 12 between the right side of the hydrostatic continuously variable transmission 25 and the transmission link mechanism 35*a*. In addition, the main transmission output shaft 67 is arranged near the bottom portion of the transmission case 11, and the counter shaft 69 and the auxiliary transmission output shaft 77 are arranged at higher positions than the main transmission output shaft 67, whereby the group of gears fitted on the counter shaft 69 and the auxiliary transmission output shaft 77 can be compactly disposed in the transmission case 11 by the effective use of the interior of the transmission case 11. Hence, a wasted space formed in the transmission case 11 can be reduced and hence the transmission case 11 can be formed in a compact outside shape.

Figure 25:
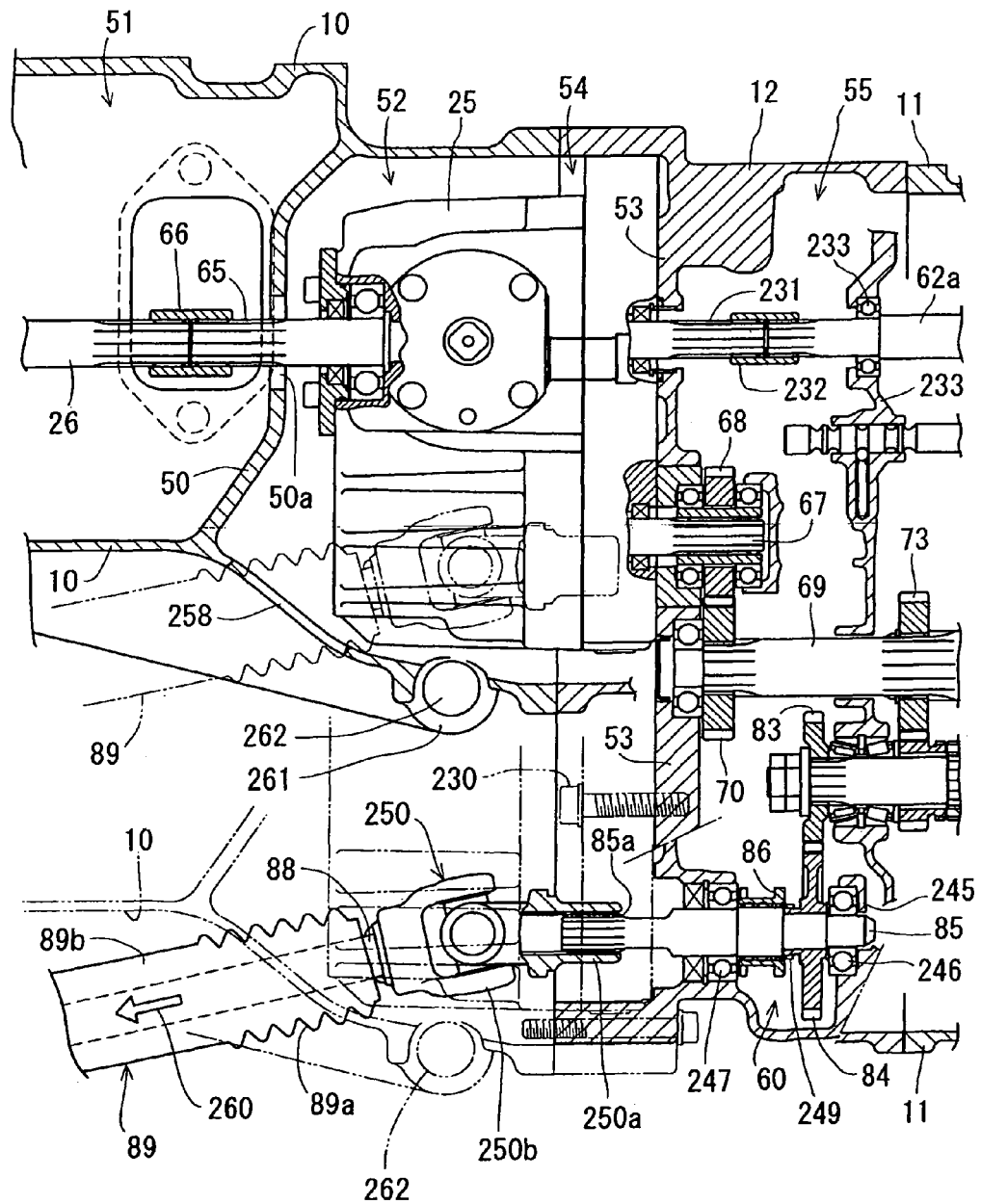
FIG. 25 is a sectional side view showing the structure of mounting a drive takeoff shaft for front wheels.

As is clear from FIG. 25 and FIG. 26, the nearly cylindrical shaft cover 89 is fitted on the transmission shaft 88 for the front wheels 3 that is to be connected to the drive takeoff shaft 85 for the front wheels 3, and the one end portion of the shaft cover 89 is retained by the cover insertion hole 258 formed in the bottom of the clutch housing 10 on the front side of the transmission case 12. Hence, the transmission shaft 88 for the front wheels 3 can be easily connected to the front axle case 7 that can be rolled, for example, without exposing the transmission shaft 88 for the front wheels 3 to the outside. In other words, when the front axle case 7 is rolled to hold the contact pressures with the ground of the left and right front wheels 3 nearly equal to each other, the shaft cover 89 follows the rolling operation of the front axle case 7 and moves around the pivot of a portion where the shaft cover 89 is retained by the cover insertion hole 258. Hence, the front axle case 7 can be smoothly rolled by the extension and contraction of the synthetic rubber boot 255.

Figure 30:
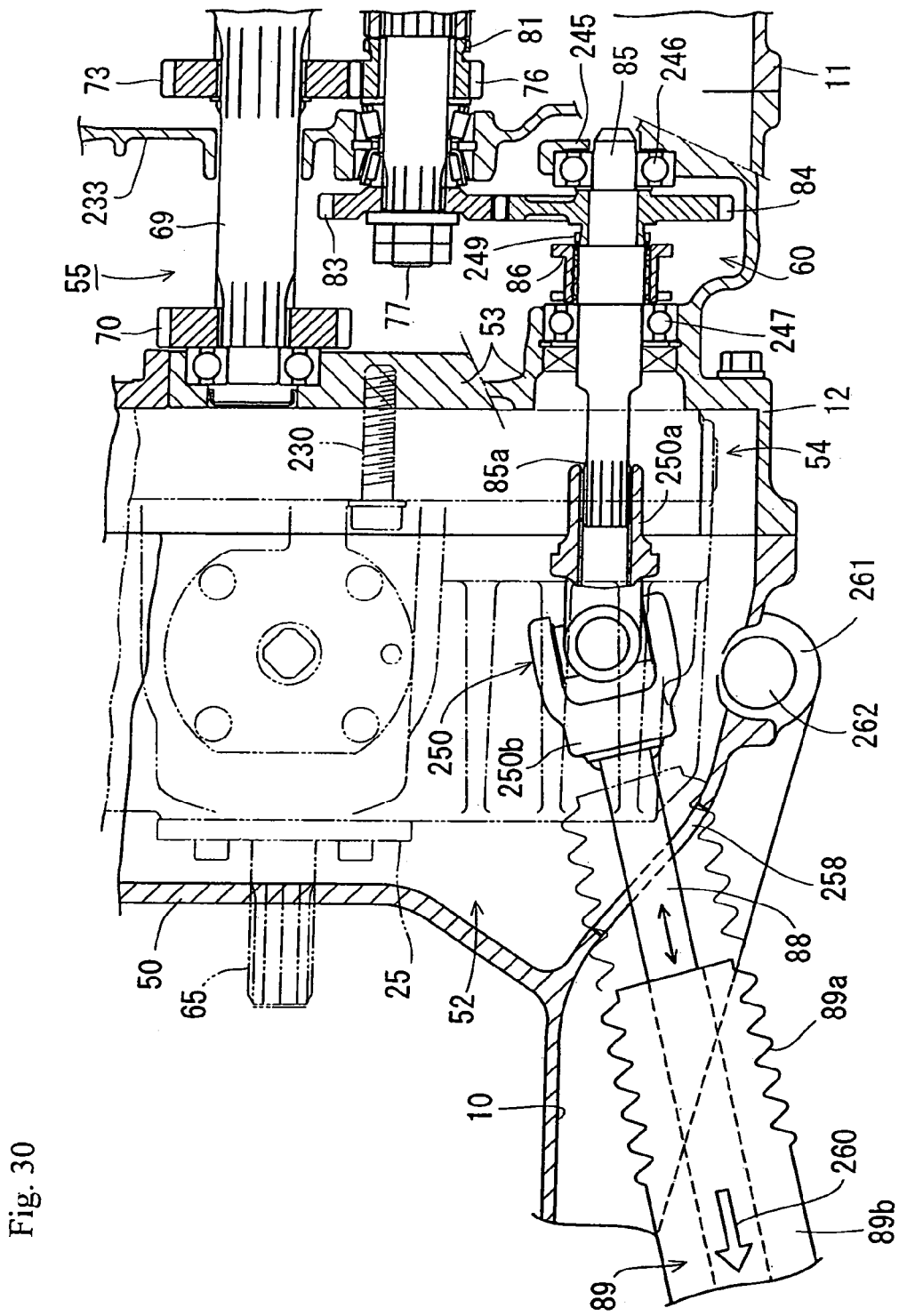
FIG. 30 is an illustration of the operation of mounting and dismounting the shaft cover.

As is clear from FIG. 26 and FIG. 30, the first universal coupling 250 for connecting the drive takeoff shaft 85 for the front wheels 3 to the transmission shaft 88 for the front wheels 3 is arranged in the clutch housing 10. Hence, it is possible to easily prevent straw and the like from winding around the first universal coupling 250.

As is shown in FIG. 30, an extracting direction mark 260 shaped like an arrow for indicating the direction of the operation of extracting the shaft cover 89 from the clutch housing 10 is formed on the outer peripheral surface of one end portion of the cylindrical part 89*b* to which the bellows insertion part 89*a* is connected. In other words, when the shaft cover 89 is removed from the clutch housing 10 in the maintenance operation or the like, the operator can check the extracting direction mark 260 visually and can extract the shaft cover 89 from the clutch housing 10. This can prevent the operating error of, for example, inserting the bellows insertion part 89*a* into the cover insertion hole 258 to cause damage to the bellows insertion part 89*a*.

As is clear from FIG. 26 and FIG. 30, in the working vehicle including; the engine 5 mounted on the running vehicle body 2 having the front wheels 3 and the rear wheels 4; and the clutch housing 10 and the transmission case 11 that transmit power from the engine 5 to the front wheels 3 and the rear wheels 4, the drive takeoff shaft 85 for the front wheels 3 that transmits driving force to the front wheels 3 is protruded into the clutch housing 10 from the front side of the transmission case 11, and the other end portion of the transmission shaft 88 for the front wheels 3 the one end portion of which is connected to the drive takeoff shaft 85 for the front wheels 3 is passed through the clutch housing 10 from inside to outside, and one end portion of the shaft cover 89 fitted on the transmission shaft 88 for the front wheels 3 is inserted into the clutch housing 10 from outside the clutch housing 10. Hence, the shaft cover 89 can easily prevent straw from winding around the drive takeoff shaft 85 for the front wheels 3 or can easily prevent soil from attaching to drive takeoff shaft 85 for the front wheels 3. Further, the shaft cover 89 is inserted into and connected to the clutch housing 10, so that it is possible to eliminate the need for providing a constituent part such as a fastening jig for connecting the shaft cover 89 to the clutch housing 10. Thus, the workability of assembling the shaft cover 89 and the like can be improved, and the cost of manufacturing can be easily reduced.

As is clear from FIG. 26 and FIG. 30, the bellows insertion part 89*a* to be inserted into the clutch housing 10 is formed on the one end side of the shaft cover 89, so when the bellows insertion part 89*a* is extended in the axial direction, the bellows insertion part 89*a* can be easily inserted into or extracted from the clutch housing 10. For example, when the bellows insertion part 89*a* is extended in the axial direction, the outside diameter of the bellows insertion part 89*a* can be made smaller than the opening of the clutch housing 10 and hence the bellows insertion part 89*a* can be easily inserted into the opening of the clutch housing 10. Further, when the bellows insertion part 89*a* is contracted in the axial direction, the outside diameter of the bellows insertion part 89*a* can be made larger than the opening of the clutch housing 10 and hence the bellows insertion part 89*a* can be easily retained by the opening of the clutch housing 10. On the other hand, when the shaft cover 89 is pulled, the bellows insertion part 89*a* is extended in the axial direction and is reduced in its outside diameter. Thus, the shaft cover 89 can be easily extracted from the clutch housing 10.

As is clear from FIG. 26 and FIG. 30, the extracting direction mark 260 for indicating the direction of the operation of extracting the shaft cover 89 from the clutch housing 10 is formed on the outer peripheral surface of the shaft cover 89 protruded outside the clutch housing 10. Thus, the shaft cover 89 can be easily extracted from the clutch housing 10 according to the extracting direction mark 260.

As is clear from FIG. 27, the front wheel drive shaft 252 is protruded rearward from the front axle case 7 having the front wheels 3 disposed thereon, and the transmission shaft 88 for the front wheels 3 is connected to the front wheel drive shaft 252, and the other end of the shaft cover 89 is connected to the front axle case 7 via the synthetic rubber boot 255. Thus, the transmission shaft 88 for the front wheels 3 can be easily coupled to the front wheel drive shaft 252 via the universal coupling 251 and the like. For example, even in the structure in which the front axle case 7 is rolled so as to make contact pressures with the ground of the left and right front wheels 3 nearly equal to each other to thereby move up and down the left and right front wheels 3 in the directions opposite to each other, the synthetic rubber boot 255 is twisted and deformed and the shaft cover 89 is turned around the axis thereof by the rolling operation of the front axle case 7, so that the structure of connecting the synthetic rubber boot 255 to the shaft cover 89 and the like can be simply constructed.

As is clear from FIG. 26 and FIG. 30, the clutch housing 10 is molded of casting and the shaft cover 89 is molded of synthetic resin, so the bellows insertion part 89a can be easily formed on the shaft cover 89 and the workability of assembling the shaft cover 89 can be improved. For example, the bellows insertion part 89a can be formed integrally with the shaft cover 89 by molding the synthetic resin, and the shaft cover 89 can be easily combined with the clutch housing 10 of high rigidity by the use of the flexible deformation of the bellows insertion part 89a. Here, the shaft cover 89 and the bellows insertion part 89a may be formed separately from each other, and the shaft cover 89 and the bellows insertion part 89a may be integrally connected to each other by bonding or welding.

On the other hand, as shown in FIG. 26 and FIG. 30, the first universal coupling 250 is arranged in the closed space (in the clutch housing 10) formed by the housing rear chamber 52 and the front case front chamber 54. The brake operating shaft bearing portion 261 is integrally formed by casting outside the bottom of the clutch housing 10 below the first universal coupling 250. The brake operating shaft 262 is turnably journaled by the brake operating shaft bearing portion 261. The brake operating shaft 262 is arranged in the bottom portion of the clutch housing 10 which is lower than the bottom of the transmission case 11 and the bottom of the transmission front case 12. In other words, the drive takeoff shaft 85 for the front wheels 3 is arranged above the brake operating shaft 262 and on the side of the continuously variable transmission 25.

Hence, the bottom of the continuously variable transmission 25 can be brought close to the brake operating shaft 262. Hence, it suffices to form the clutch housing 10 in the vertical direction in a size to allow the continuously variable transmission 25 and the brake operating shaft 262 to be disposed within the size in the vertical direction of the clutch housing 10 in which the continuously variable transmission 25 is to be disposed. Here, left and right brake rods 32a are connected to the brake pedal 33 via the brake operating shaft 262. Further, the pedal arm base part of the clutch pedal 31 is turnably fitted on the brake operating shaft 262.

As is clear from FIG. 26 and FIG. 30, one brake pedal 33 is connected to the left and right brake mechanisms 32 for braking the left and right rear wheels 4, respectively, via the one brake operating shaft 262, and the brake operating shaft 262 is arranged in the bottom portion of the clutch housing 10 below the hydrostatic continuously variable transmission 25 and the first universal coupling 250. Thus, the brake operating shaft bearing part 261 of the brake operating shaft 262 can be easily formed by the use of the bottom portion of the clutch housing 10. On the other hand, the bottom portion of the clutch housing 10 can be formed in high rigidity by forming the brake operating shaft bearing part 261. Further, the first universal coupling 250 is arranged on the one side of the hydrostatic continuously variable transmission 25, so that the height of the brake operating shaft 262 from the ground can be increased as compared with the structure in which the first universal coupling 250 is arranged below the hydrostatic continuously variable transmission 25.

Figure 9:
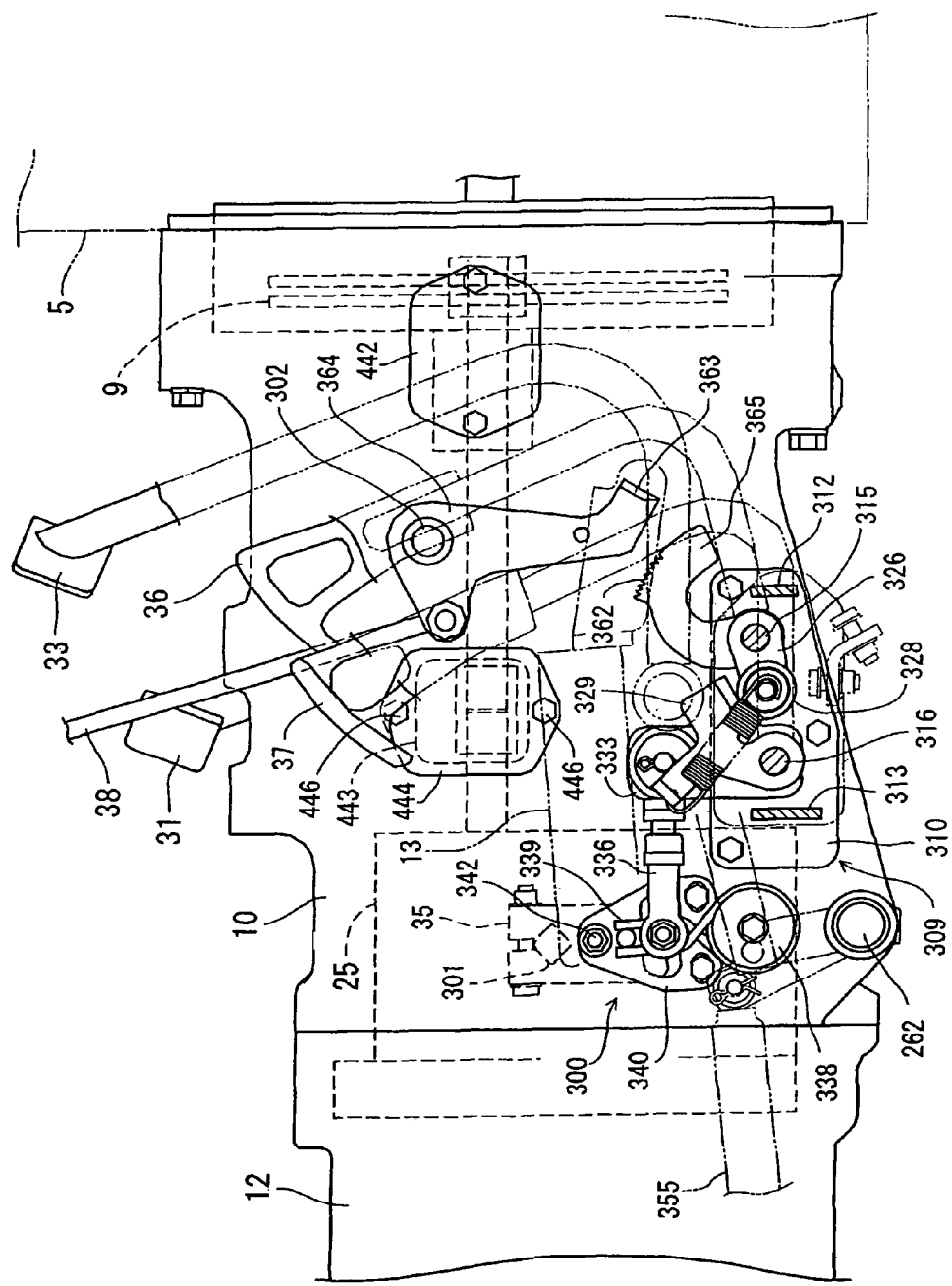

Next, the structure of mounting the forward pedal 36 and the rearward pedal 37 will be described with reference to FIG. 9 to FIG. 15. As is shown in FIG. 9 and FIG. 13, a base frame 310 is removably fastened with plural bolts 311 to the right side in the direction of travel of the clutch housing 10. A longitudinal side plate 314 is integrally fixed by welding to the base frame 310 via front and rear lateral side plates 312, 313. In other words, a pedal unit frame 309, which is used for mounting the forward pedal 36 and the rear pedal 37 and is formed in a square when viewed on the plan view, is formed of the base frame 310, the front and rear lateral side plates 312, 313, and the longitudinal side plate 314. Here, the pedal unit frame 309 is arranged on the right side of the clutch housing 10 below the step frame 13 on the right in the direction of travel (forward direction).

Figure 12:
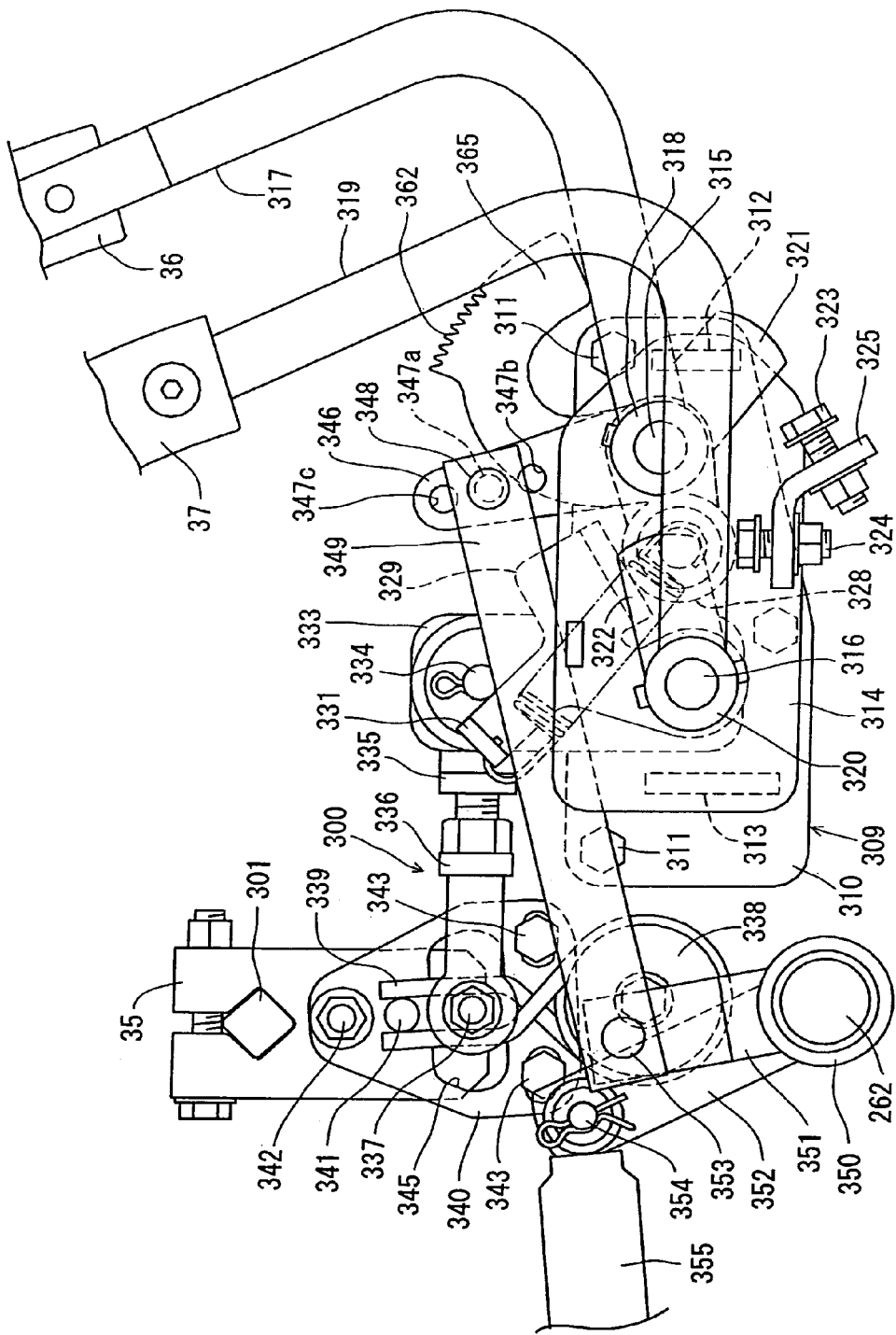
FIG. 12 is an illustration, on an enlarged scale, of the side of the forward pedal, the rearward pedal, and the like in FIG. 10.
Figure 13:
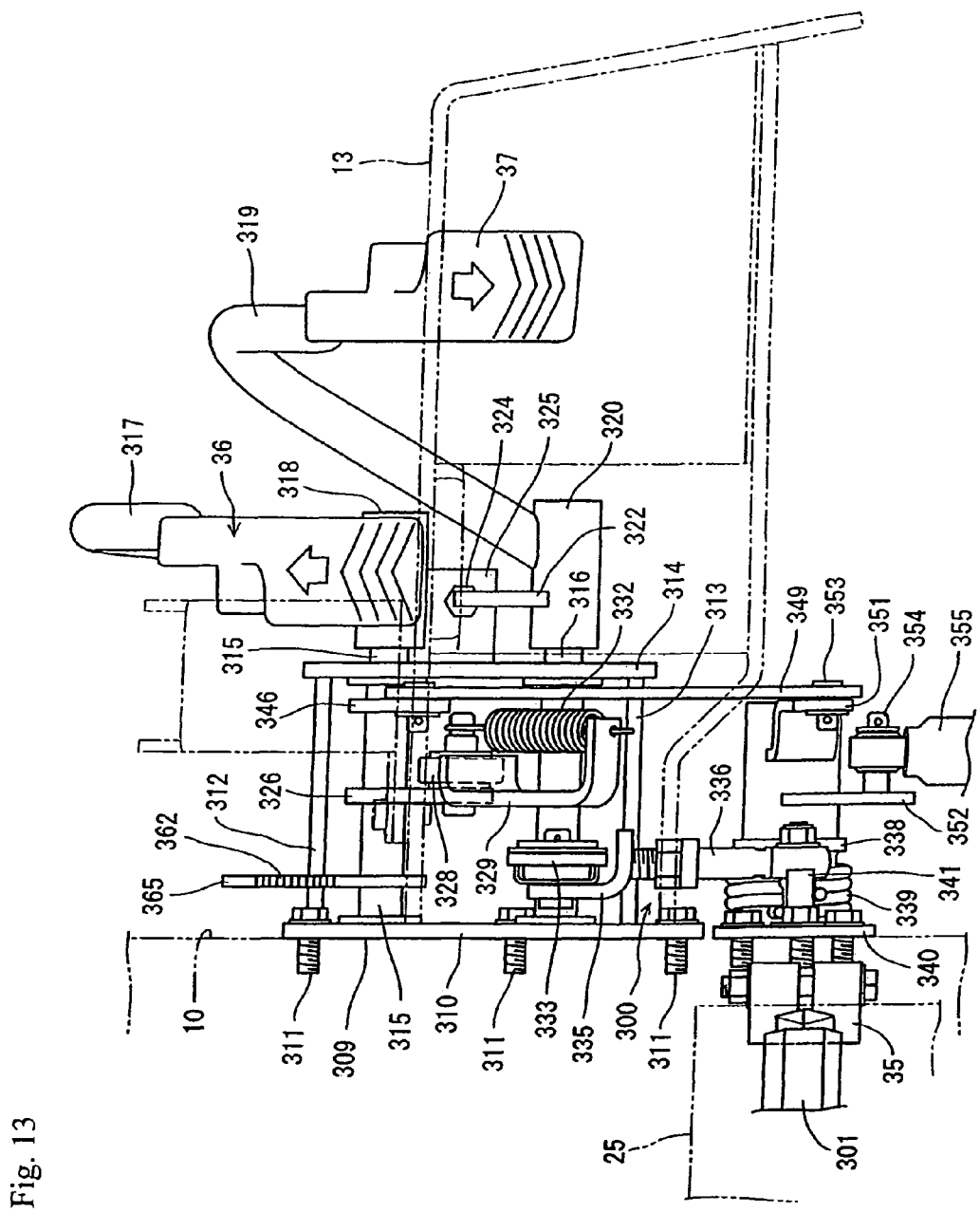

As shown in FIG. 12 and FIG. 13, the base frame 310 and the longitudinal side plate 314 are disposed so as to extend along the right side of the clutch housing 10 nearly parallel to the front-back direction (direction of travel) of the running vehicle body 2. A forward pedal shaft 315 and a rearward pedal shaft 316 are turnably journaled by the base frame 310 and the longitudinal side plate 314, and the forward pedal shaft 315 and the rearward pedal shaft 316 are interposed between the front and rear lateral side plates 312 and 313. One end portions of the forward pedal shaft 315 and the rearward pedal shaft 316 are protruded outside the longitudinal side plate 314. A boss part 318 on the base end side of the pedal arm 317 of the forward pedal 36 is fitted on the one end portion of the forward pedal shaft 315 outside the longitudinal side plate 314. Further, a boss part 320 on the base end side of the pedal arm 319 of the rearward pedal 37 is fitted on the one end portion of the rearward pedal shaft 316 outside the longitudinal side plate 314.

Thus, the forward pedal 36 and the rearward pedal 37 are disposed turnably around the axes of the forward pedal shaft 315 and the rearward pedal shaft 316. The pedal arm 317 of the forward pedal 36 and the pedal arm 319 of the rearward pedal 37 are disposed so as to protrude diagonally forward upward from the forward pedal shaft 315 and the rearward pedal shaft 316, respectively, and the rearward pedal 37 is disposed on the diagonally rear side of the forward pedal 36. Both of the forward pedal 36 and the rearward pedal 37 are depressed by the foot in the nearly same direction, diagonally forward downward. Here, the directions in which the clutch pedal 31, the brake pedal 33, the forward pedal 36, and the rearward pedal 37 are depressed by the foot are nearly equal to each other (that is, diagonally forward and downward direction).

Figure 14:
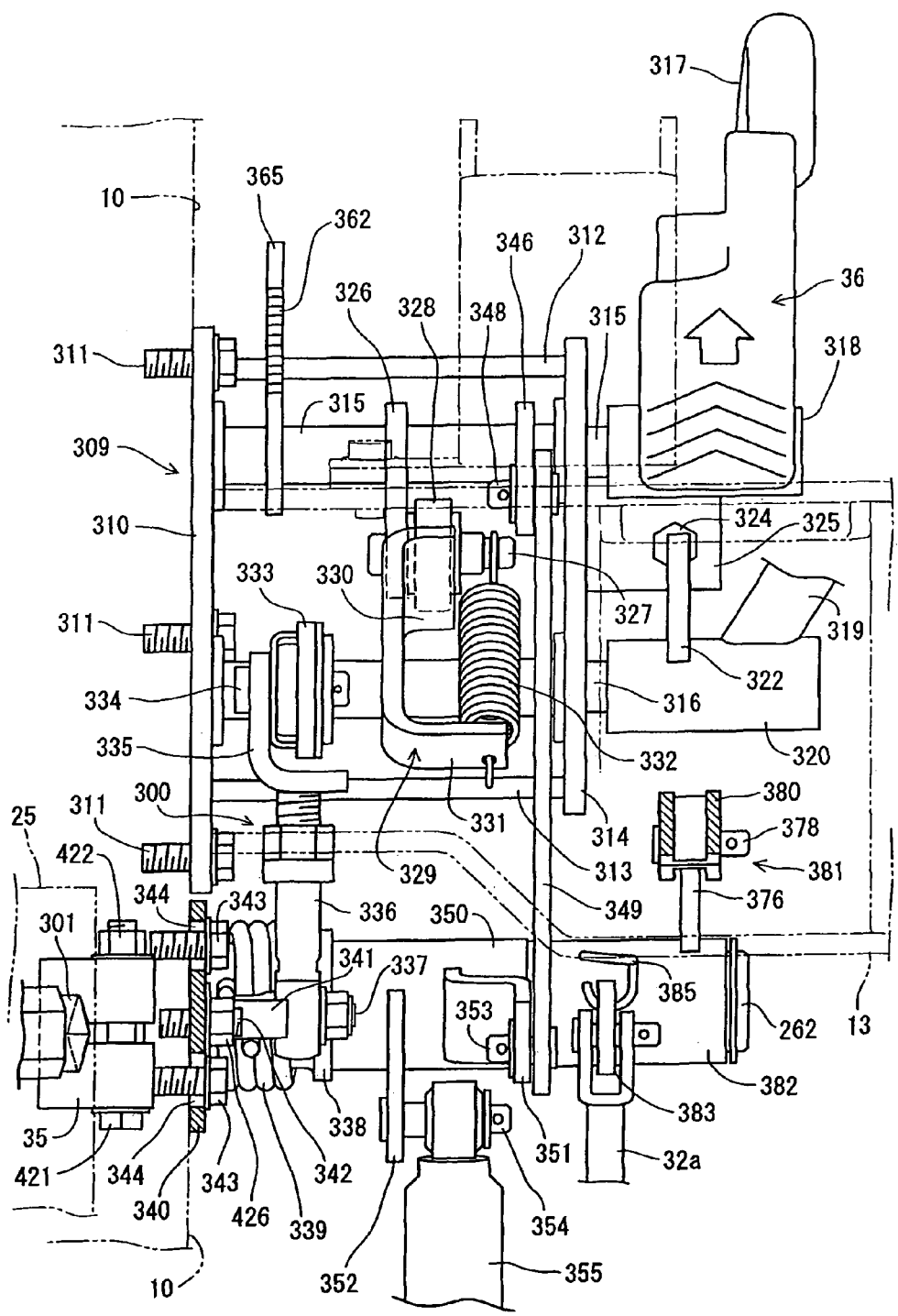
FIG. 14 is an illustration, on an enlarged scale, of the plan of the forward pedal, the rearward pedal, and the like in FIG. 13.

As shown in FIG. 12 and FIG. 14, stop arms 321 and 322 are fixed to the boss part 318 of the forward pedal shaft 315 and the boss part 320 of the rearward pedal shaft 316, respectively. A forward stopper 323 and a rearward stopper 324, which are formed in the shape of a bolt and on which the stop arms 321 and 322 abut, are disposed respectively on the outside surface of the longitudinal plate 314. The forward stopper 323 and the rearward stopper 324 are respectively screwed into a stopper support bracket 325 fixed by welding to the longitudinal side plate 314 in such a way that the quantities of protrusion of the forward stopper 323 and the rearward stopper 324 can be adjusted. Thus, the stop arms 321 and 322 abut on the forward stopper 323 and the rearward stopper 324 respectively, whereby the operation of depressing the forward pedal 36 and the rearward pedal 37 in the direction of increasing speed is restricted. In other words, a forward maximum speed and a rearward maximum speed are set by the forward stopper 323 and the rearward stopper 324, respectively.

Figure 11:
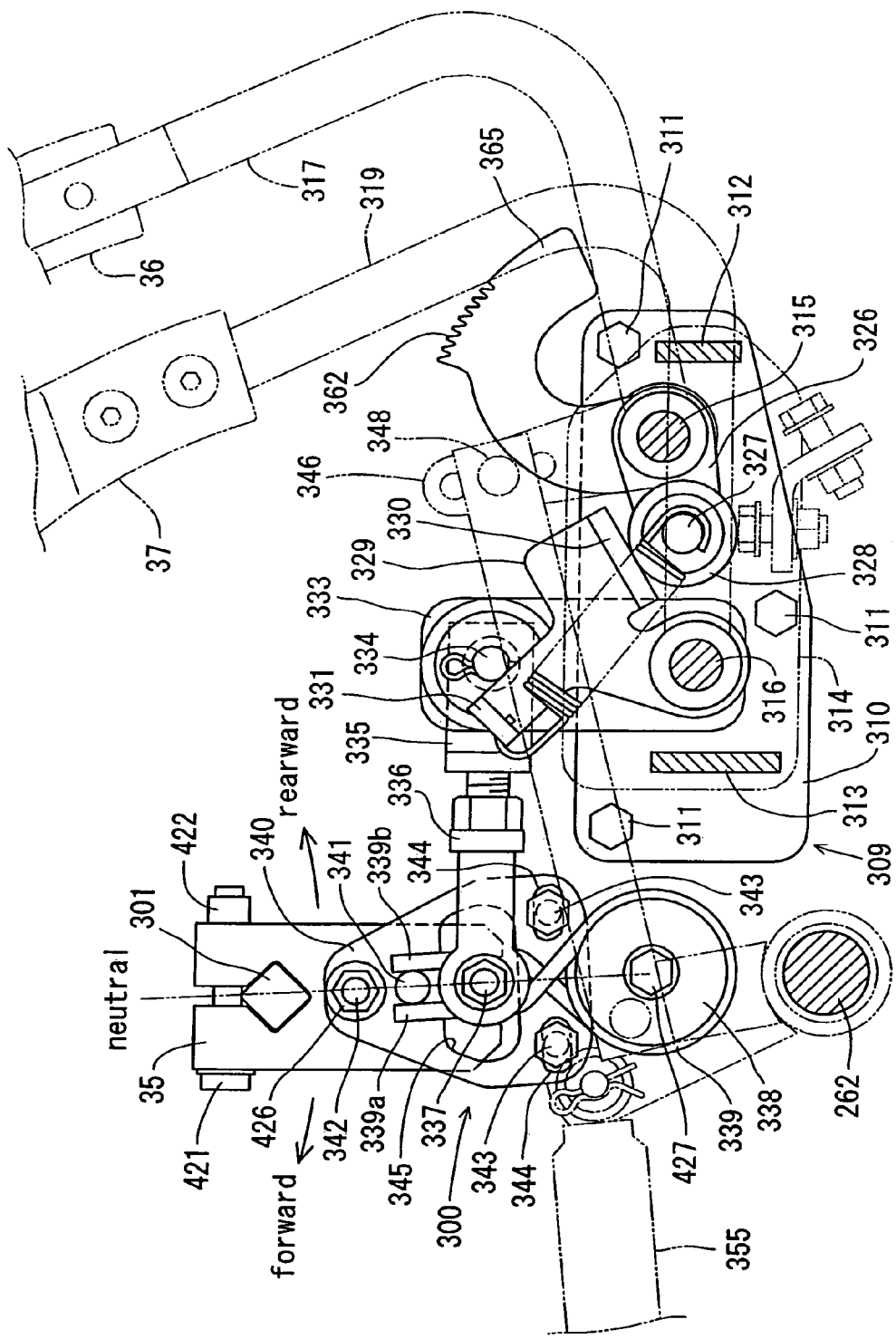
FIG. 11 is an illustration, on an enlarged scale, of the side of the transmission link mechanism and the like in FIG. 9.

As shown in FIG. 11 and FIG. 14, the base end portion of a pressing arm 326 is fixed to the forward pedal shaft 315, and an abutting roller 328 is rotatably journaled by the tip end portion of the pressing arm 326 via a roller shaft 327. Further, the base end portion of a swing arm 329 is fixed to the rearward pedal shaft 316. The swing arm 329 has a pressure receiving portion 330 and a retaining portion 331 integrally formed therewith. The pressure receiving portion 330 abuts on the abutting roller 328, and a tension spring 332 connects the roller shaft 327 and the retaining portion 331. Thus, the abutting roller 328 is always made to abut on the pressure receiving portion 330 by the spring force of the tension spring 332.

Further, as shown in FIG. 11 and FIG. 14, the base end portion of a transmission arm 333 is fixed to the rearward pedal shaft 316 and one end of a transmission rod 336, which is adjustably extended and contracted, is connected to the tip end of the transmission arm 333 via a joint pin 334 and a connecting bracket 335. The other end of the transmission rod 336 is connected to the trunnion arm 35 via a connecting shaft 337.

Further, the neutral adjusting part 340 is fixed to the outside surface of the clutch housing 10 with one neutral adjusting pivot bolt 342 and two neutral adjusting bolts 343. A retaining shaft 341 is fixed to the clutch housing 10 via the neutral adjusting part 340. Both ends of a neutral holding spring 339 are retained by the connecting shaft 337 and the retaining shaft 341. The neutral holding spring 339 of a pinch spring type is disposed on the clutch housing 10 via a spring holder 338. The neutral adjusting bolts 343 are passed respectively through neutral adjusting holes 344, each of which is formed in an elongated shape, of the neutral adjusting part 340. A transmission restriction hole 345 is formed in the neutral adjusting part 340, and the connecting shaft 337 is passed through the transmission restriction hole 345 formed in the shape of an elongated hole.

As shown in FIG. 11, the transmission restriction hole 345 is formed long in the circumferential direction of a circle having a center at the trunnion shaft 301. Thus, the trunnion arm 35 is turned forward or rearward around the trunnion shaft 301 within a continuously variable transmission range in which the connecting shaft 337 moves in the transmission restriction hole 345.

On the other hand, each of the neutral adjusting holes 344 of the neutral adjusting part 340 is formed long in the circumferential direction of a circle having the pivot bolt 342 at the center. Thus, when the neutral adjusting bolts 343 are loosened, the neutral adjusting part 340 can be turned around the pivot bolt 342. With this, the retaining shaft 341 is moved to adjust a neutral position (where output is brought to zero), and the transmission restriction hole 345 is moved to a forward transmission side or a rearward transmission side to adjust the transmission operating range of the trunnion arm 35 (connecting shaft 337). With this, the transmission operating range of the trunnion arm 35 of one side of the forward transmission side and the rearward transmission side is expanded, and the continuously variable transmission range of the other side is contracted.

As shown in FIG. 12 and FIG. 14, the base end portion of a resisting force adjusting link arm 346 is fixed to the forward pedal shaft 315. One end portion of a resisting force link frame 349 is connected to any one of first to third resisting force adjusting holes 347a, 347b, and 347c formed in the resisting force adjusting link arm 346 via a resisting force adjusting pin 348. Further, the base end portion of a connecting link arm 351 and the base end portion of a damper connecting arm 352 are fixed to a turnable cylindrical shaft part 350 on the brake operating shaft 262. The tip portion of the connecting link arm 351 is connected to the other end portion of the resisting force link frame 349 via a connecting pin 353. A depressing force damper 355 as a gas-type damping unit is connected to the tip portion of the damper connecting arm 352 via a support pin 354. Here, the depressing force damper 355 is provided with a damper cylinder filled with gas and is fixed to the outside surface of the transmission case 11 rearward of the clutch housing 10 via a damper mounting shaft 356 (see FIG. 5).

Next, a transmission operation of the continuously variable transmission 25 performed by the operation of the forward pedal 36 and the rearward pedal 37 will be described. First, when the operator seated in the steering seat 17 depresses the forward pedal 36 with his/her right foot, the pressing arm 326 is turned around the forward pedal shaft 315 to turn the swing arm 329 around the rearward pedal shaft 316 by the abutting roller 328. The transmission arm 333 on the rearward pedal shaft 316 is turned by the turn of the swing arm 329. With this, the transmission rod 336 is pressed by the turn of the transmission arm 333 to turn the trunnion arm 35 and the trunnion shaft 301 in the forward direction (clockwise in FIG. 11) against the force of the neutral holding spring 339. With this, the continuously variable transmission 25 is moved to the forward side to thereby drive the front wheels 3 and the rear wheels 4 to the forward side, thereby moving the running vehicle body 2 in the forward direction.

Thus, when the operator depresses the forward pedal 36, the operator can change the moving speed of the running vehicle body 2 in proportion to the quantity of depression of the forward pedal 36 and can depress the forward pedal 36 until the stop arm 321 abuts on the forward stopper 323 or until the connecting shaft 337 abuts on one end of the transmission restriction hole 345, thereby increasing speed to the forward side. Further, when the operator depresses the forward pedal 36 to turn the swing arm 329, the rearward pedal 37 is turned around the rearward pedal shaft 316 in a direction opposite to the direction in which the operator depresses the forward pedal 36.

On the other hand, when the operator seated in the steering seat 17 depresses the rearward pedal 37 with his/her right foot, the transmission arm 333 on the rearward pedal shaft 316 is turned via the swing arm 329. Then, the transmission rod 336 is pulled out by the transmission arm 333. With this, the trunnion arm 35 and the trunnion shaft 301 are turned in the rearward direction (counterclockwise in FIG. 11) against the force of the neutral holding spring 339 to move the continuously variable transmission 25 to a rearward side to drive the front wheels 3 and the rear wheels 4 to the rearward side, thereby moving the running vehicle body 2 in the rearward direction.

Thus, when the operator depresses the rearward pedal 37, the operator can change the moving speed of the running vehicle body 2 in proportion to the quantity of depression of the rearward pedal 37 and can depress the rearward pedal 37 until the stop arm 322 abuts against the rearward stopper 324 or until the connecting shaft 337 abuts against the other end of the transmission restriction hole 345, thereby increasing the moving speed to the rearward side. Further, when the operator depresses the rearward pedal 37, the pressing arm 326 is turned via the abutting roller 328 by the turn of the swing arm 329, whereby the forward pedal 36 is turned around the forward pedal shaft 315 in a direction opposite to the direction in which the operator depresses the rearward pedal 37.

As described above, when the forward pedal 36 or the rearward pedal 37 is depressed, the biasing force of the neutral holding spring 339 and the resisting force of the depressing force damper 355 act as a reactive force against the pedal depressing force on the forward pedal 36 or the rearward pedal 37. In other words, the biasing force of the neutral holding spring 339 and the resisting force of the depressing force damper 355 become a pressing load applied to the forward pedal 36 or the rearward pedal 37, and the operator depresses the forward pedal 36 or the rearward pedal 37 against the depressing load. On the other hand, when the operator separates his/her foot from the forward pedal 36 or the rearward pedal 37, the biasing force (pedal returning force) of the neutral holding spring 339 is mildly applied to the forward pedal 36 and the rearward pedal 37 by the depressing force damper 355 to mildly return the forward pedal 36 and the rearward pedal 37 to their initial positions (position where output is brought to zero), whereby the transmission output of the continuously variable transmission 25 is held nearly at zero.

Next, a vehicle speed holding mechanism (cruise control mechanism) 361 for holding the forward pedal 36 at a specified depressed position to hold the vehicle speed of the running vehicle body 2 at a constant speed with reference to FIG. 9, FIG. 11, FIG. 14, and FIG. 15. The vehicle speed holding mechanism 361 includes one engaging part 363 and plural engaged claws 362 which can be engaged with and disengaged from the each other. The engaging part 363 is arranged opposite to the engaged claws 362 so as to be put into contact with or separated from the engaged claws 362.

As shown in FIG. 9, one end portion of the clutch operating shaft 302 is protruded from the clutch housing 10 to the right side of the running vehicle body 2 in the direction of travel (in the forward direction). The middle portion of an engaging link 364 formed in the shape of a letter L, when viewed from the side, is turnably journaled by the protruded end portion of the clutch operating shaft 302. One end portion of the engaging link 364 is connected to a cruise lever 38 as a manual operating lever, and the engaging part 363 formed in a protruding shape is integrally formed on the other end portion of the engaging link 364.

As shown in FIG. 11, one end portion of an engaged arm 365 formed in the shape of a bow when viewed from the side is connected to the forward pedal shaft 315, and the plural engaged claws 362 are continuously formed on the outer peripheral edge of the engaged arm 365. The direction in which the engaging part 363 is engaged with or disengaged from the engaged claws 362 is made nearly perpendicular to a tangent to a circumferential path along which the engaged arm 365 is turned by the neutral holding spring 339. The plane on which the engaging part 363 is engaged with the engaged claws 362 is made nearly perpendicular to the tangent to the circumferential path along which the engaged arm 365 is turned. For this reason, when the operator depresses the forward pedal 36 further in the direction to increase the vehicle speed, the engaging part 363 is moved in an disengaging direction by the engaged claw 362 on the speed increasing side, which is adjacent to the engaged claw 362 engaged with the engaging part 363, whereby the engaging part 363 is disengaged from the engaged claws 362.

In other words, the shapes of the engaged claws 362 and the engaging part 363 are formed in such a way that the rotational moment produced by the engaging arm 365 turned by the neutral holding spring 339 acts as the force of engaging the engaging part 363 with the engaged claws 362. The force of turning the engaging arm 365 that engages the engaging part 363 with the engaged claws 362 (the force of the neutral holding spring 339) is made several times larger than the force of a disengagement holding spring 366 for holding the cruise lever 38 at the disengagement position of the steering column 15 (force for disengaging the engaging part 363 from the engaged claws 362) or several times larger than an operating force by which the operator moves the cruise lever 38 to the disengagement position from a vehicle speed holding position (engagement position). With this, the engaged arm 365 is returned to the initial position by the neutral holding spring 339.

Thus, the engaging part 363 is not disengaged from the engaged claws 362 by the force of the disengagement holding spring 366 to return the cruise lever 38 to the disengagement position. Further, the engaging part 363 is not disengaged from the engaged claws 362 by the pressing force by which the operator returns the cruise lever 38 to the disengagement position from the vehicle speed holding position (engagement position). The rotational moment produced by the engaging arm 365 turned by the neutral holding spring 339 is applied as an engaging force to the engaged claws 362 and the engaging part 363, and the engaging part 363 can be held engaged with the engaged claws 362 by the neutral holding spring 339 that acts as an initial position return spring for returning the forward pedal 36 to the initial position from the depressed position to bring the vehicle speed nearly to zero.

Figure 10:
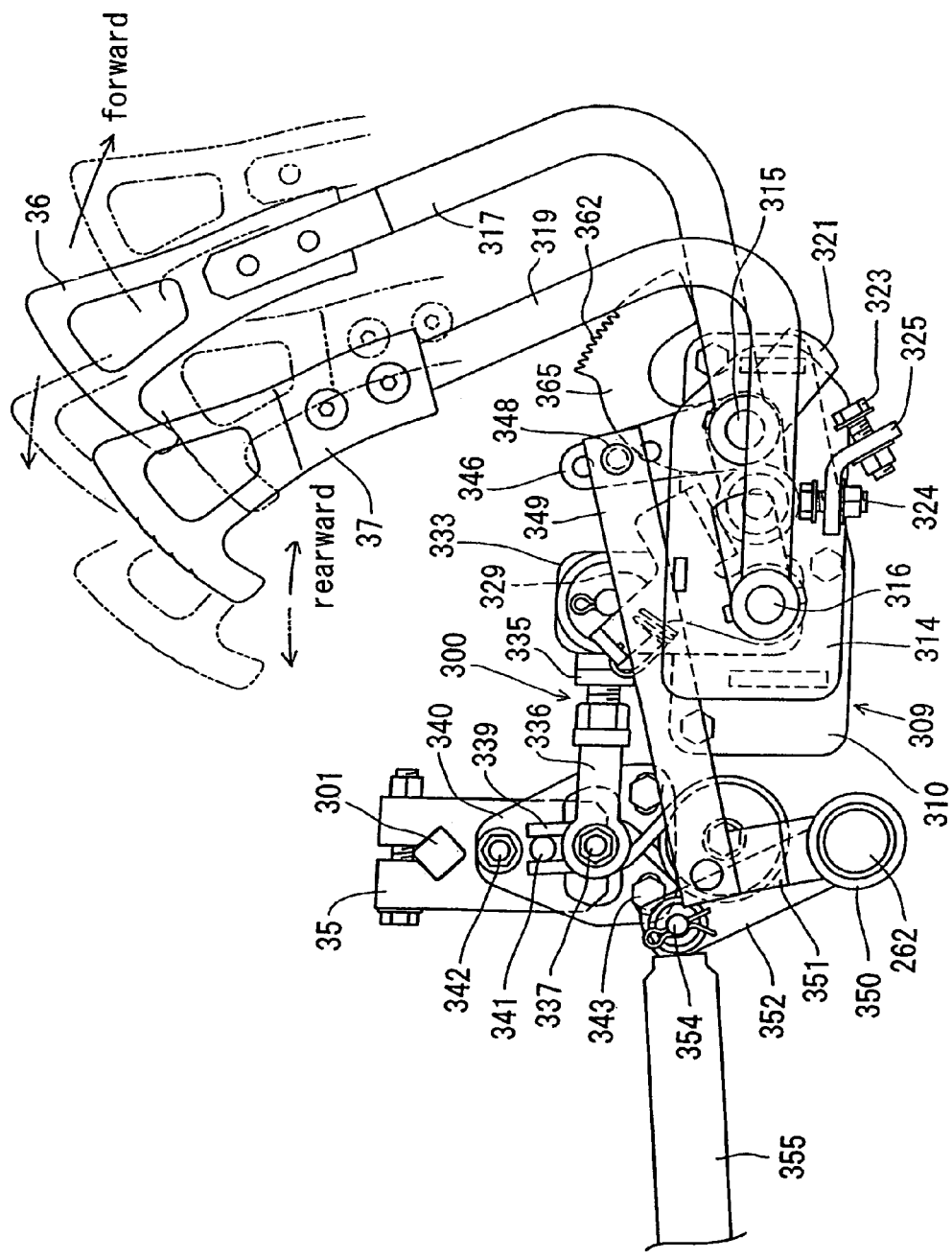
Figure 15:
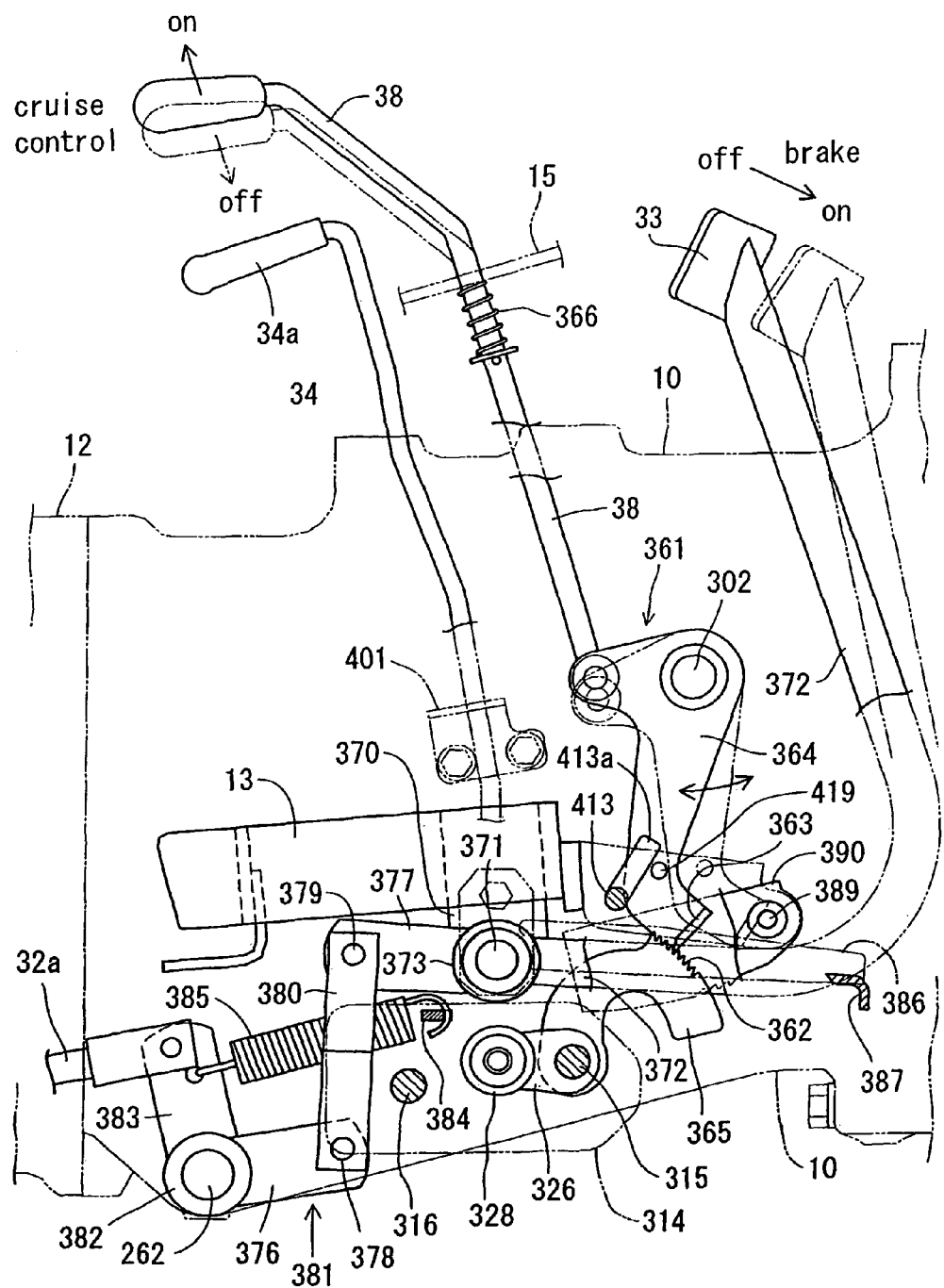

Next, the vehicle speed holding operation (cruise control operation) of the above-mentioned vehicle speed holding mechanism (cruise control mechanism) 361 will be described with reference to FIG. 10 and FIG. 15. When the cruise lever 38 is pulled up against the disengagement holding spring 366 by the operator in a state where the forward pedal 36 is depressed by the operator, as shown in FIG. 15, the engaging link 364 is turned around the clutch operating shaft 302 from an imaginary line position to a solid line position, whereby the engaging part 363 is engaged with the engaged claws 362. Thus, even if the operator separates the foot from the forward pedal 36, the forward pedal 36 is held at the depressed position and hence the front wheels 3 and the rear wheels 4 are driven nearly at a constant speed, so that the cultivating work is performed nearly at the constant speed. On the other hand, when the forward pedal 36 is depressed by the operator in a state where the engaging part 363 is engaged with the engaged claws 362, the engaging part 363 is disengaged from the engaged claws 362, and the cruise lever 38 and the engaging link 364 are returned from the solid line to the imaginary line position (initial position) by the disengagement holding spring 366, whereby the vehicle speed holding operation (cruise control operation) of moving the vehicle nearly at the constant speed is released.

As is clear from FIG. 9, FIG. 11, and FIG. 15, in the working vehicle provided with: the engine 5 mounted on the running vehicle body 2 having the front wheels 3 and the rear wheels 4 as running parts; the hydrostatic continuously variable transmission 25 for variably transmitting power from the engine 5; the transmission case 11 for transmitting a transmission output from the hydrostatic continuously variable transmission 25 to the front wheels 3 and the rear wheels 4 via the auxiliary transmission gear mechanism 59 as a transmission output gear; the forward pedal 36 and the rearward pedal 37 as the shift pedals connected to the trunnion arm 35 as the transmission operating part of the hydrostatic continuously variable transmission 25 via the transmission link mechanism 300 as the transmission link mechanism; and the vehicle speed holding mechanism 361 for holding the forward pedal 36 and the rearward pedal 37 at the depressed position, the vehicle speed holding mechanism 361 includes the engaging part 363, the engaged arm 365 having the plural engaged claws 362 to be engaged with and disengaged from the engaging part 363, connects the engaged arm 365 to the forward pedal 36, connects the engaging part 363 to the cruise lever 38 as the manual operating lever for holding a vehicle speed, and can hold the engaging part 363 engaged with the engaged claws 362 by the biasing force of the neutral holding spring 339 as the initial position return spring for returning the forward pedal 36 and the rearward pedal 37 to their initial positions from their depressed positions to bring the vehicle speed to zero. Thus, the engaging part 363 can be held engaged with the engaged claws 362 by the use of the force of returning the forward pedal 36 and the rearward pedal 37 to their initial positions from their depressed positions (the force of returning the transmission output of the hydrostatic continuously variable transmission 25 to zero). In other words, the operating force by which the operator presses (or pulls) the cruise lever 38 with the single hand is smaller than the depressing force by which the operator depresses the forward pedal 36 with the foot, so that the force of the neutral holding spring 339 can be set larger than the force of operating the cruise lever 38. Hence, the engaging part 363 is not easily disengaged from the engaged claws 362 by the operation of the cruise lever 38. For this reason, it is possible to easily prevent the engaging part 363 from being disengaged from the engaged claws 362 by the erroneous operation of the cruise lever 38 and hence to improve drivability and the like. Even if the force of the neutral holding spring 339 is made larger than the force of operating the cruise lever 38, the operator can easily depress the forward pedal 36 and the rearward pedal 37 with the foot and also can easily return the trunnion arm 35 of the hydrostatic continuously variable transmission 25 to the position where output is brought to zero.

As is clear from FIG. 15, the engaging link 364 is turnably disposed in the running vehicle body 2, and one end portion of the engaging link 364 is connected to the cruise lever 38 and the engaging part 363 is arranged on the other end side of the engaging link 364. Thus, as compared with the conventional structure in which plural engaged claws 362 are formed on the engaging link 364, the engaging part 363 can be formed integrally with the engaging link 364 and hence the engaging link 364 can be constructed in light weight and with ease. For this reason, the engaging part 363 can be held at a position separate from the engaged claws 362 by a spring force smaller than the force of the neutral holding spring 339, so that the force of operating the cruise lever 38 for engaging the engaging part 363 with the engaged claws 362 can be reduced.

As is clear from FIG. 14 and FIG. 15, one end portion of the engaged arm 365 is connected to the forward pedal 36, and the plural engaged claws 362 are formed on the other end portion of the engaged arm 365, and the engaging part 363 of the engaging link 364 is arranged opposite to the engaged claws 362 of the engaged arm 365, so that the strength of the plural engaged claws 362 of the engaged arm 365 can be easily improved. In other words, even if the engaged arm 365 is formed in high rigidity so as to improve the strength of the engaged claws 362, the engaged arm 365 can be formed in lighter weight than the forward pedal 36. Thus, as compared with the conventional structure in which the plural engaged claws 362 are formed on the engaging link 364, the engaged arm 365 and the engaged claws 362 that are of high rigidity can be easily formed without impairing the shift function of the forward pedal 36.

As is clear from FIG. 11 and FIG. 14, the shift pedal includes the forward pedal 36 and the rearward pedal 37, and by the force of one neutral holding spring 339, the forward pedal 36 and the rearward pedal 37 are returned to the initial positions from the depressed positions and the trunnion arm 35 of the hydrostatic continuously variable transmission 25 is returned to the position where the output of the trunnion arm 35 is brought to zero. Thus, the position where the output of the trunnion arm 35 of the hydrostatic continuously variable transmission 25 is brought to zero can be easily set. In other words, an output zero adjusting part for holding the trunnion arm 35 by the neutral holding spring 339 at the position where the output of the trunnion arm 35 is brought to zero and an initial position adjusting part for returning the forward pedal and the rearward pedal to the initial positions by the neutral holding spring 339 can be formed by sharing an adjusting part, so that the neutral holding part 340 as the output zero adjusting part and the initial position adjusting part can be easily constructed. Hence, the workability of assembling and maintaining the forward pedal 36 and the rearward pedal 37 can be improved.

As is clear from FIG. 12 and FIG. 14, the forward pedal 36 and the rearward pedal 37 are turnably journaled by the pedal unit frame 309 as the pedal frame of the running vehicle body 2 via the forward pedal shaft 315 and the rearward pedal shaft 316, respectively, and any one of the forward pedal 36 and the rearward pedal 37 is connected to the trunnion arm 35 of the hydrostatic continuously variable transmission 25, and the forward pedal 36 is connected to the rearward pedal 37 via the pressing arm 326 and the swing arm 329 that act as the mechanism of preventing the forward pedal 36 and the rearward pedal 37 from being depressed at the same time, and the directions in which the forward pedal 36 and the rearward pedal 37 are depressed respectively are made nearly equal to each other. Thus, the operator can depress the forward pedal 36 and the rearward pedal 37 individually with the front side of the foot. For example, the forward pedal 36 and the rearward pedal 37 can be disposed close to each other on the front side of the right foot of the operator seated in the steering seat 17 of the running vehicle body 2, and the operator can depress the forward pedal 36 and the rearward pedal 37 individually by moving the right foot to the left and right. Thus, as compared with the conventional structure in which the operator depresses the forward pedal 36 with the front side of the foot and depresses the rearward pedal 37 with the rear side of the foot, the operability of depressing the rearward pedal 37 can be improved without impairing the function of preventing the operation of depressing the forward pedal 36 and the rearward pedal 37 at the same time.

Figure 17:
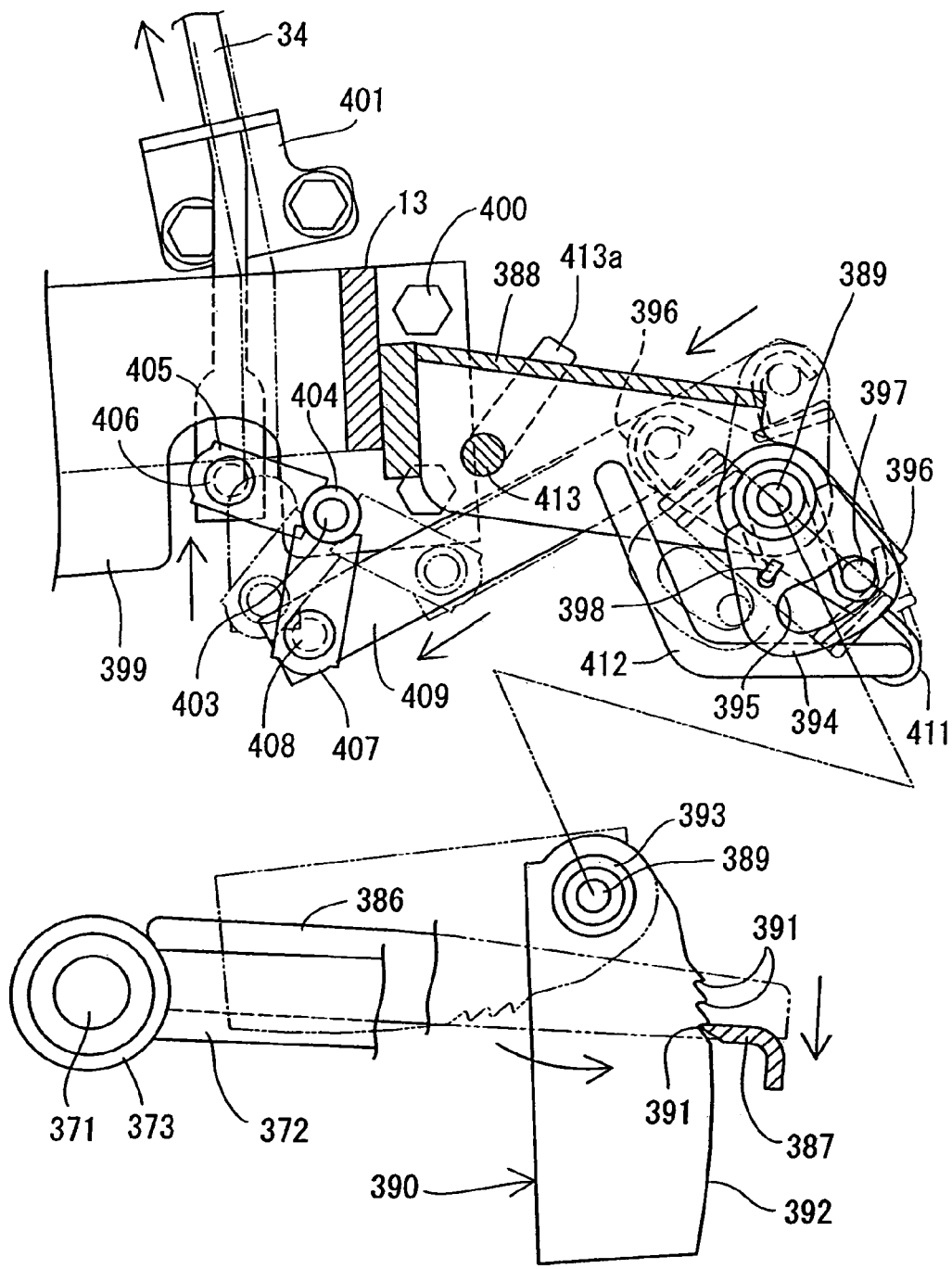
FIG. 17 is an enlarged view of a portion in FIG. 16.
Figure 18:
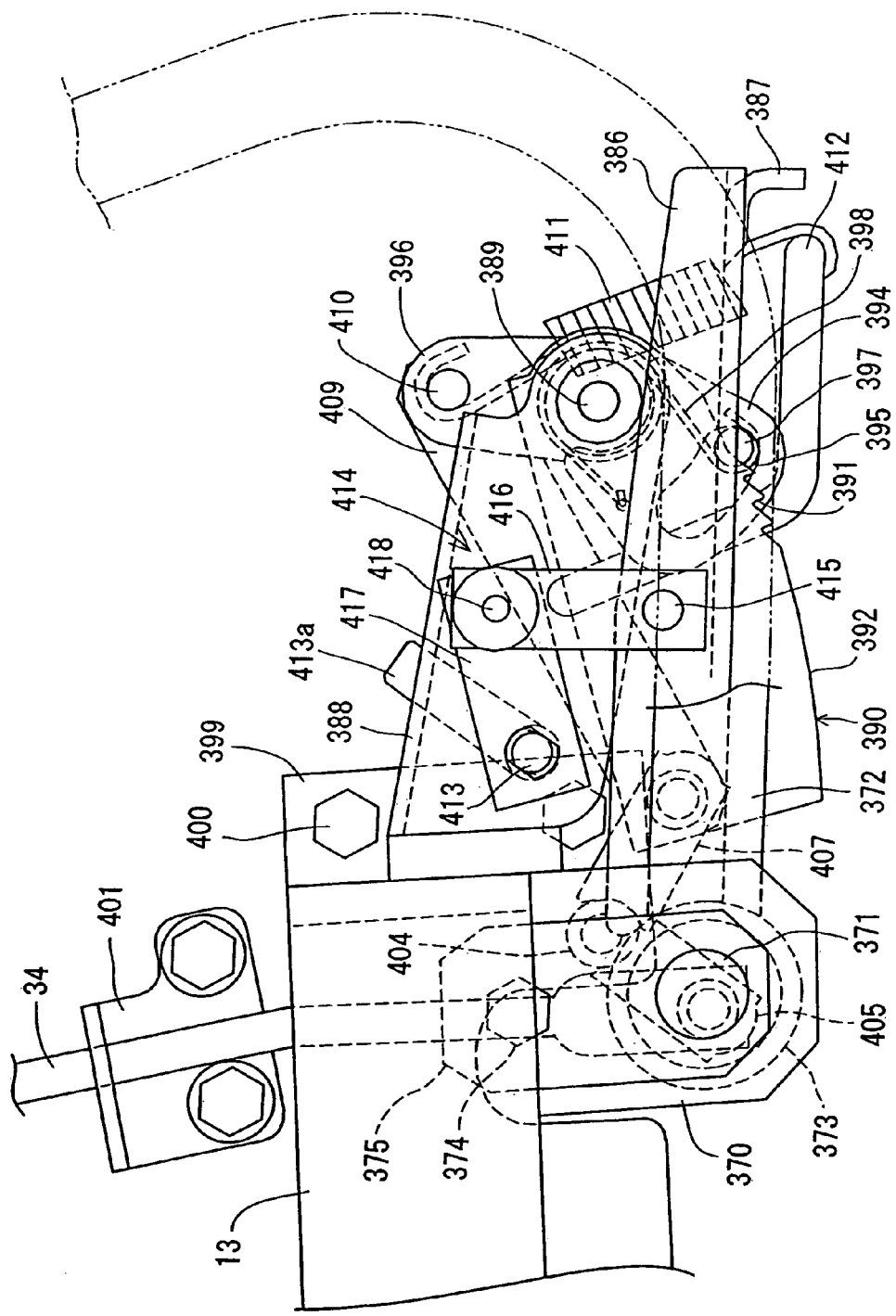
FIG. 18 is an illustration of the side of a portion in which the brake pedal is mounted.
Figure 19:
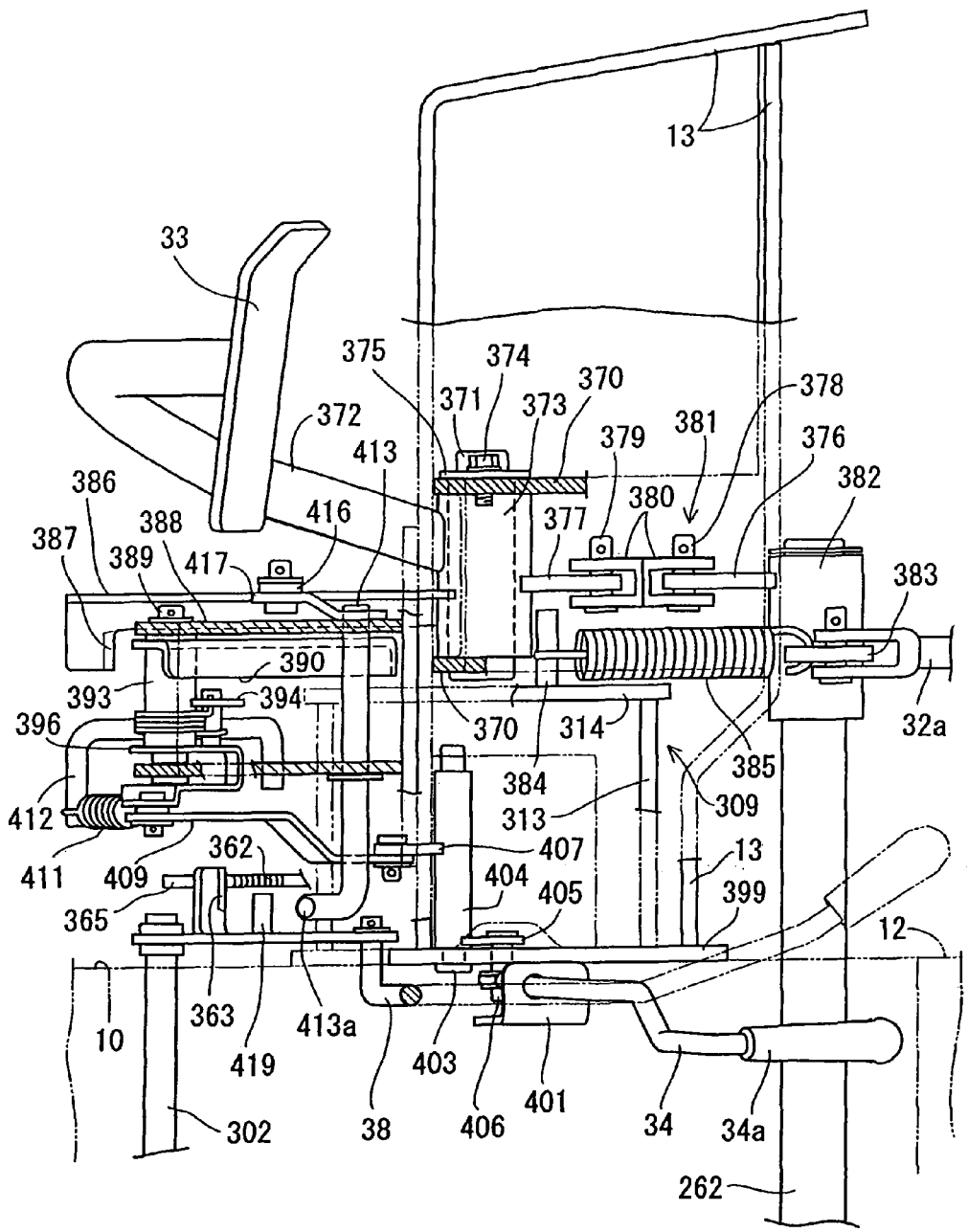

The structure of mounting the brake pedal 33 as the brake operating means will be described with reference to FIG. 5, FIG. 15 to FIG. 21. As shown in FIG. 5 and FIG. 19, a brake pedal shaft 371 is removably fixed to the left and right bearing brackets 370 of the step frame 13. The left and right bearing brackets 370 are extended nearly parallel to the front-rear direction of the running vehicle body 2. The boss part 373 on the base end side of the pedal arm 372 of the brake pedal 33 is fitted on the brake pedal shaft 371 between the left and right bearing brackets 370. A right end fastening plate 375 is fastened to the right bearing bracket 370 from outside the running vehicle body 2 with a bolt 374. When the bolt 374 is removed and the brake pedal shaft 371 is extracted to the outside of the bearing bracket 370, the brake pedal 33 can be removed from the step frame 13.

As shown in FIG. 5, FIG. 15, and FIG. 19, the boss part 373 of the pedal arm 372 is connected to the brake operating shaft 262 via a brake link mechanism 381. The brake link mechanism 381 includes: one brake arm 376 fixed to the brake operating shaft 262 via an arm boss part 382; the other brake arm 377 fixed to the boss part 373; and a brake link 380 connected to the respective brake arms 376, 377 via pins 378, 379. A brake rod 32a is connected to the arm boss part 382 via a rod arm 383. Further, a hook arm 384 of the longitudinal side plate 314 and the rod arm 383 are connected to each other by a brake releasing spring 385. The brake pedal 33 is held at the initial position by the brake releasing spring 385 and the braking operation of the brake mechanism 32 is held in a released state by the brake releasing spring 385.

A parking brake structure for holding the brake pedal 33 at the depressed position will be described with reference to FIG. 17, FIG. 20, and FIG. 21. As shown in FIG. 17, the base end portion of a lock arm 386 is fixed to the boss part 373 of the pedal arm 372, and an engaging protrusion 387 is integrally formed on the tip side of the parking arm 386. Further, the rear end portion of a pivot frame 388 is fixed to the front portion of the step frame 13, and an arm support shaft 389 is disposed on the front end portion of the pivot frame 388, and a boss part 393 on the base end side of a parking arm 390 is turnably journaled by the arm support shaft 389. On the parking arm 390 are formed plural engaged notches 391 with which the engaging protrusion 387 is detachably engaged and an engagement guide surface 392.

Figure 20:
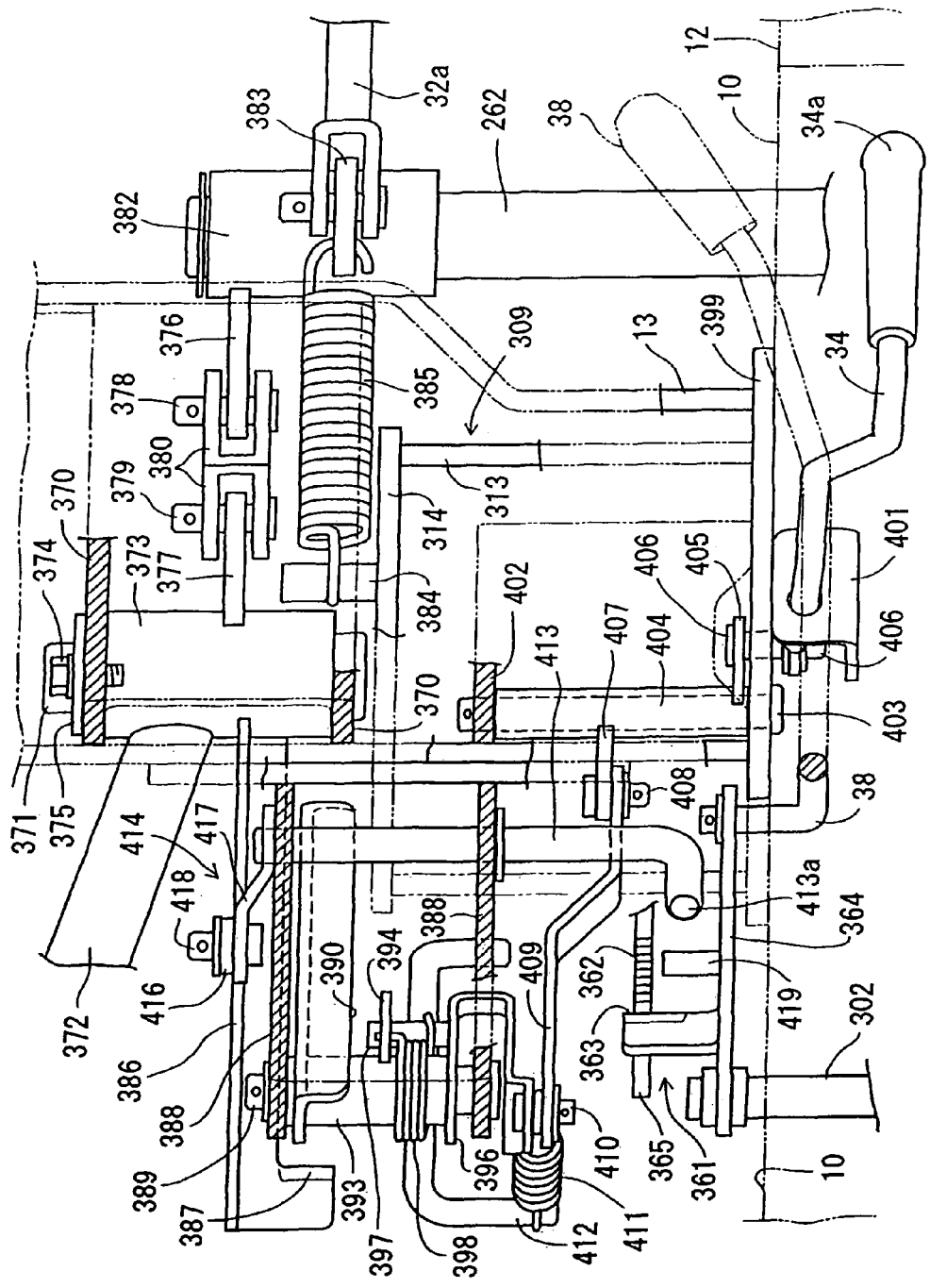
FIG. 20 is an enlarged view of a portion in FIG. 19.

As shown in FIG. 17 and FIG. 20, a pressure receiving arm 394 is fixed to the boss part 393 on the base end portion of the parking arm 390. A long hole 395 elongated in the circumferential direction of a circle having the arm support shaft 389 at a center is formed in the pressure receiving arm 394. Further, a pressure applying arm 396 is turnably journaled by the arm support shaft 389, and a pressure applying pin 397 is fixed to the pressure applying arm 396, and the pressure applying pin 397 is passed through the long hole 395. A pressure applying spring 398 is wound around the outer periphery of the boss part 393. One end side of the pressure applying spring 398 is retained by the pressure applying arm 394, and the other end side of the pressure applying spring 398 is retained by the pressure applying pin 397. The engaging protrusion 387 is elastically pressed onto the engaged notch 391 and the engagement guide surface 392 by the biasing force of the pressure applying spring 398.

On the other hand, a step base plate 399 of the step frame 13 is fastened to the side surface of the above-mentioned clutch housing 10 with bolts 400. The parking brake lever 34 is disposed on the side of the clutch housing 10 above the step base plate 399 via a lever guide frame 401 in such a way as to be able to move in the up-and-down direction in an erect position. A lever shaft 404 is turnably journaled by a pin shaft part 403 between the shaft bracket 402 and the step base plate 399 of the step frame 13. A first arm 405 of the lever shaft 404 is connected to the bottom end portion of the parking brake lever 34 via a pin 406. One end portion of a parking link 409 is connected to a second arm 407 of the lever shaft 404 via a pin 408.

On the other hand, the above-mentioned pressure applying arm 396 is connected to the other end portion of the parking link 409 via a pin 410. The pin 410 and the other end portion of a pivot crossing-over arm 412, one end portion of which is fixed to the pivot frame 388, are connected to each other by a pivot crossing-over spring 411. In other words, the parking brake lever 34 is held by the pivot crossing-over spring 411 at a parking brake applying position located on an raised-up side such that the parking brake lever 34 is raised up or at a parking brake releasing position which is located on a pressed-down side such that the packing brake lever 34 is pressed down.

Figure 16:
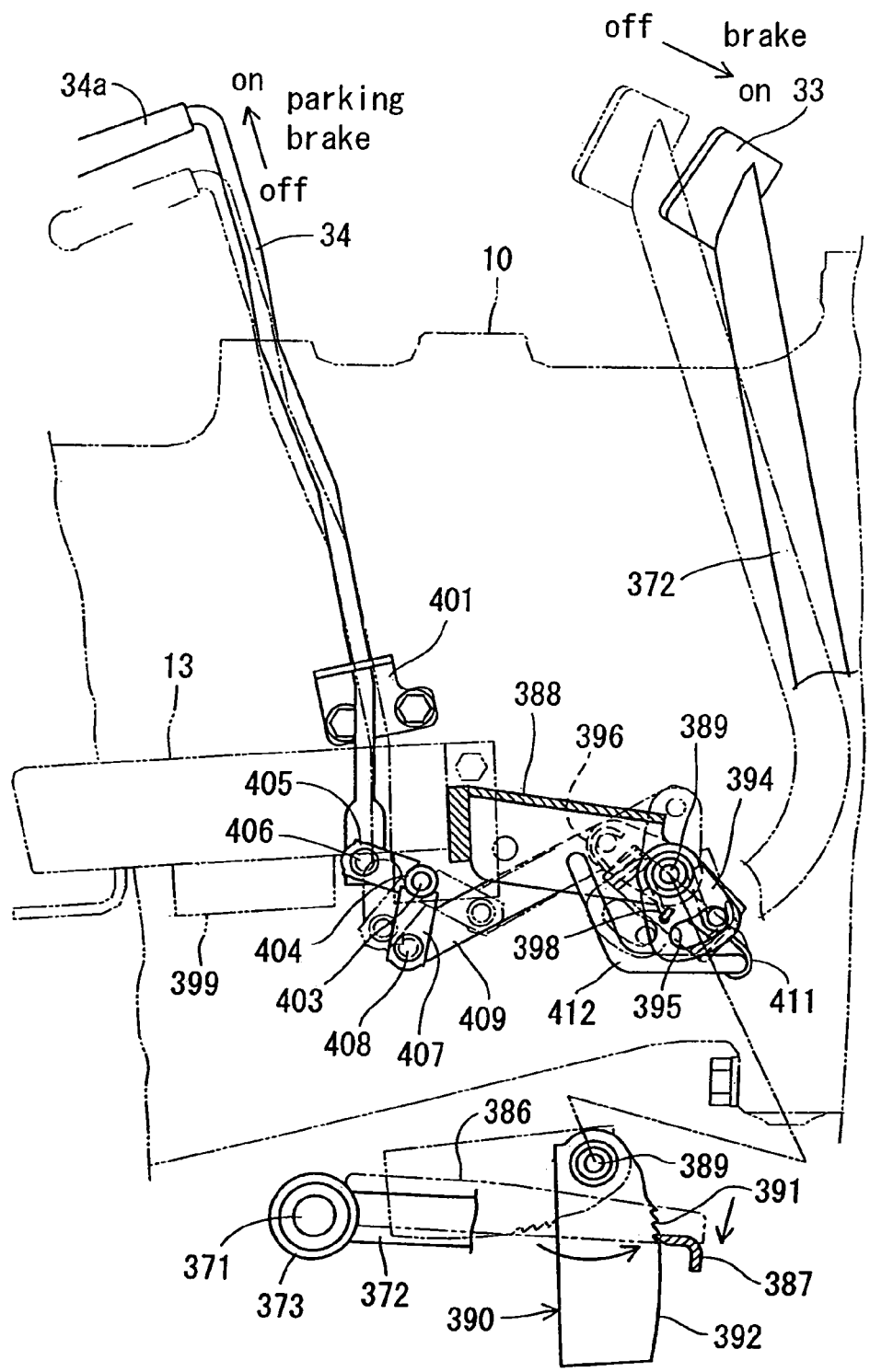

A parking brake operation for holding the brake pedal 33 at the depressed position by the operation of the parking brake lever 34 will be described with reference to FIG. 16 and FIG. 17. The operator seated in the steering seat 17 depresses the brake pedal 33 with the right foot to operate the brake mechanism 32 to brake the left and right rear wheels 4. When the operator depresses the brake pedal 33 in this manner, the lock arm 386 and the engaging protrusion 387 are turned around the brake pedal shaft 371 (turned clockwise, as shown by an arrow in FIG. 17), whereby the engaging protrusion 387 is moved to a position where the engaging protrusion 387 can be engaged with the engaged notch 391.

Further, when the operator grips the grip portion 34a of the parking brake lever 34 with the right hand and pulls up the parking brake lever 34 at the pressed-down position (parking brake releasing position) to the raised-up position (parking brake applying position) in a state where the rear wheels 4 are braked, the pressure applying arm 396 is turned against the pivot crossing-over spring 411, whereby the parking brake lever 34 is held at the raised-up position by the pivot crossing-over spring 411. The pressure applying pin 397 is turned around the arm support shaft 389 by the turn of the pressure applying arm 386, and the pressure receiving arm 394 and the parking arm 390 are turned in association with each other via the pressure applying pin 397, and hence the engagement guide surface 392 abuts on the engaging protrusion 387. For this reason, when the operator separates the right foot from the brake pedal 33, the engaging protrusion 387 is engaged with the engaged notch 391 by the guide of the engagement guide surface 392, whereby the brake pedal 33 is held at the depressed position. Thus, even if the operator separates the right foot from the brake pedal 33, the braking of the left and right rear wheels 4 are continued, that is, the parking brake mechanism 32 is held in the brake applying state and hence the left and right rear wheels 4 are held braked.

On the other hand, when the operator grips the grip portion 34a of the parking brake lever 34 with the right hand and pulls down the parking brake lever 34 at the raised-up position (parking brake applying position) to the pressed-down position (parking brake releasing position), the pressure applying arm 396 is turned against the pivot crossing-over spring 411 and the parking brake lever 34 is held at the pressed-down position by the pivot crossing-over spring 411. The pressure applying pin 397 is turned around the arm support shaft 389 by the turn of the pressure applying arm 386, and the pressure receiving arm 394 and the parking arm 390 are turned in association with each other via the pressure applying pin 397 by the biasing force of the pressure applying spring 398, whereby the engaged notch 391 is disengaged from the engaging protrusion 387 and the brake pedal 33 is returned to the initial position from the depressed position by the biasing force of the brake releasing spring 85. Thus, in a state where the operator separates the right foot from the brake pedal 33, the braking of the left and right rear wheels 4 is released and the parking brake mechanism 32 is held in the brake releasing state.

Next, a cruise control releasing structure of the brake system for releasing the vehicle speed holding operation of the vehicle speed holding mechanism 361 by the operation of depressing the brake pedal 33 (braking operation) will be described with reference to FIG. 15, FIG. 18, FIG. 20, and FIG. 21. As shown in FIG. 18 and FIG. 20, one end portion of a release arm 413, which acts as brake system releasing means and is formed in the shape of a round bar, is passed through the pivot frame 388. The one end portion of the release arm 413 passed through the pivot arm 388 is disposed nearly parallel to the brake pedal shaft 371 extended in the right-and-left direction of the running vehicle body 2. The protruded end portion of the release arm 413 protruded to the right side of the pivot arm 388 and the lock arm 386 are connected to each other via a release link mechanism 414. The release link mechanism 414 includes a first link 416, one end portion of which is turnably connected to the lock arm 386 via a pin 415, and a second link 417, one end portion of which is fixed to the protruded end portion of the release arm 413. The other end portion of the first link 416 and the other end portion of the second link 417 are turnably connected to each other via a pin 418. The release arm 413 is turned around the axis via the lock arm 386 and the release link mechanism 414 in association with the operation of turning the brake pedal 33 around the brake pedal shaft 371.

On the other hand, as shown in FIG. 20, one end portion of the release arm 413 is protruded to the right side of the pivot frame 388, and the other end portion of the release arm 413 is bent nearly in the shape of a letter L to integrally form a release operating portion 413a. Further, a release protrusion 419 formed in the shape of a round bar is fixed to the above-mentioned engaging link 364, and the release operating portion 413a and the release protrusion 419 are arranged on a straight line extending in the direction of travel of the vehicle body (in the front-and-rear direction).

The cruise control releasing operation of the brake system that releases the vehicle speed holding operation of the above-mentioned vehicle speed holding mechanism 361 will be described. When the cruise lever 38 is pulled up by the operator to a solid line position from an imaginary line position as shown in FIG. 15 in a state where the forward pedal 36 is depressed by the operator and hence the engaging link 364 is turned around the clutch operating shaft 302 to the solid line position from the imaginary line position and the engaging part 363 is engaged with the engaged claws 362 and the vehicle speed holding mechanism 361 is held in the cruise control (vehicle speed holding) state, if the release arm 413 is turned around the axis by the operation of depressing the brake pedal 33, the release operating portion 413a abuts on the release protrusion 419 to forcibly move the engaging link 364 at the solid line position in the direction shown by the imaginary line position.

Thus, the engaging part 363 is forcibly disengaged from the engaged claws 362, and the vehicle speed holding mechanism 361 is switched to a release state, and the forward pedal 36 is returned to the initial position from the depressed position, and hence the transmission output from the continuously variable transmission 25 is returned nearly to zero. Here, as shown in FIG. 15, in a state where the cruise lever 38 is pressed down to the cruise control releasing position (shown by the imaginary line), the engaging link 364 is moved to the imaginary line position forward of the vehicle body from the solid line position, and the engaging part 363 is held at a non-engaged position where the engaging part 363 is disengaged from the engaged claws 362. When the vehicle speed holding mechanism 361 is held in the release state in this manner, the release protrusion 419 is located outside the range of the turning path of the release operating portion 413a. Thus, even if the release arm 413 is turned around the axis by the operation of the brake pedal 33, the release operating portion 413a does not abut on the release protrusion 419. Hence, the brake pedal 33 can be operated in a state where the cruise lever 38 is surely held at the release position.

As is clear from FIG. 15, FIG. 17, FIG. 18, and FIG. 20, in the working vehicle provided with: the engine 5 mounted on the running vehicle body 2 having the front wheels 3 and the rear wheels 4 as running parts; the hydrostatic continuously variable transmission 25 for variably transmitting power from the engine 5; the transmission case 11 for transmitting the transmission output from the hydrostatic continuously variable transmission 25 to the front wheels 3 and the rear wheels 4 via the auxiliary transmission gear mechanism 59 as the transmission output gear; the forward pedal 36 and the rearward pedal 37 as the shift pedals connected to the trunnion arm 35 as the transmission operating part of the hydrostatic continuously variable transmission 25 via the transmission link mechanism 300 as the transmission link mechanism; the vehicle speed holding mechanism 361 for holding the forward pedal 36 at an arbitrary depressed position; and the brake pedal 33 as brake operating means for braking the front wheels 3 and the rear wheels 4, there is provided the release arm 413 as brake system releasing means for forcibly releasing the vehicle speed holding mechanism 361 by the operation of braking the brake pedal 33, and the drive system releasing operation of releasing the vehicle speed holding mechanism 361 by the forward pedal 36 and the brake system releasing operation of releasing the vehicle speed holding mechanism 361 by the release arm 413 can be performed independently of each other. Thus, the two release means of two systems of the drive system and the brake system can be formed independently of each other, and the vehicle speed holding mechanism 361 can be forcibly released by at least any one of the two release means of two systems of the drive system and the brake system which are independent of each other. For this reason, even if a malfunction occurs in any one of the two release means, the vehicle speed holding mechanism 361 can be released by the other of the two release means. Hence, the vehicle speed holding function and the reliability of the function of releasing the vehicle speed holding function can be improved.

As is clear from FIG. 15 and FIG. 18, the vehicle speed holding mechanism 361: includes the engaged arm 365 having the plural engaged claws 362 for holding the forward pedal 36 at the depressed position and the engaging part 363 to be engaged with the engaged claws 362 so as to be disengaged from them; connects the engaging link 364 to the cruise lever 38 as the manual operating lever for holding the vehicle speed; arranges the engaging part 363 on the engaging link 364; and connects the engaging link 364 to the brake pedal 33 as the brake operating means via the release arm 413 as the brake system releasing means for forcibly disengaging the engaging part 363 from the engaged claws 362. Thus, the brake system releasing means for forcibly disengaging the engaging part 363 from the engaged claws 362 can be easily formed of the release arm 413. Hence, the vehicle speed holding function and the reliability of the function of releasing the vehicle speed holding function can be improved.

Figure 21:
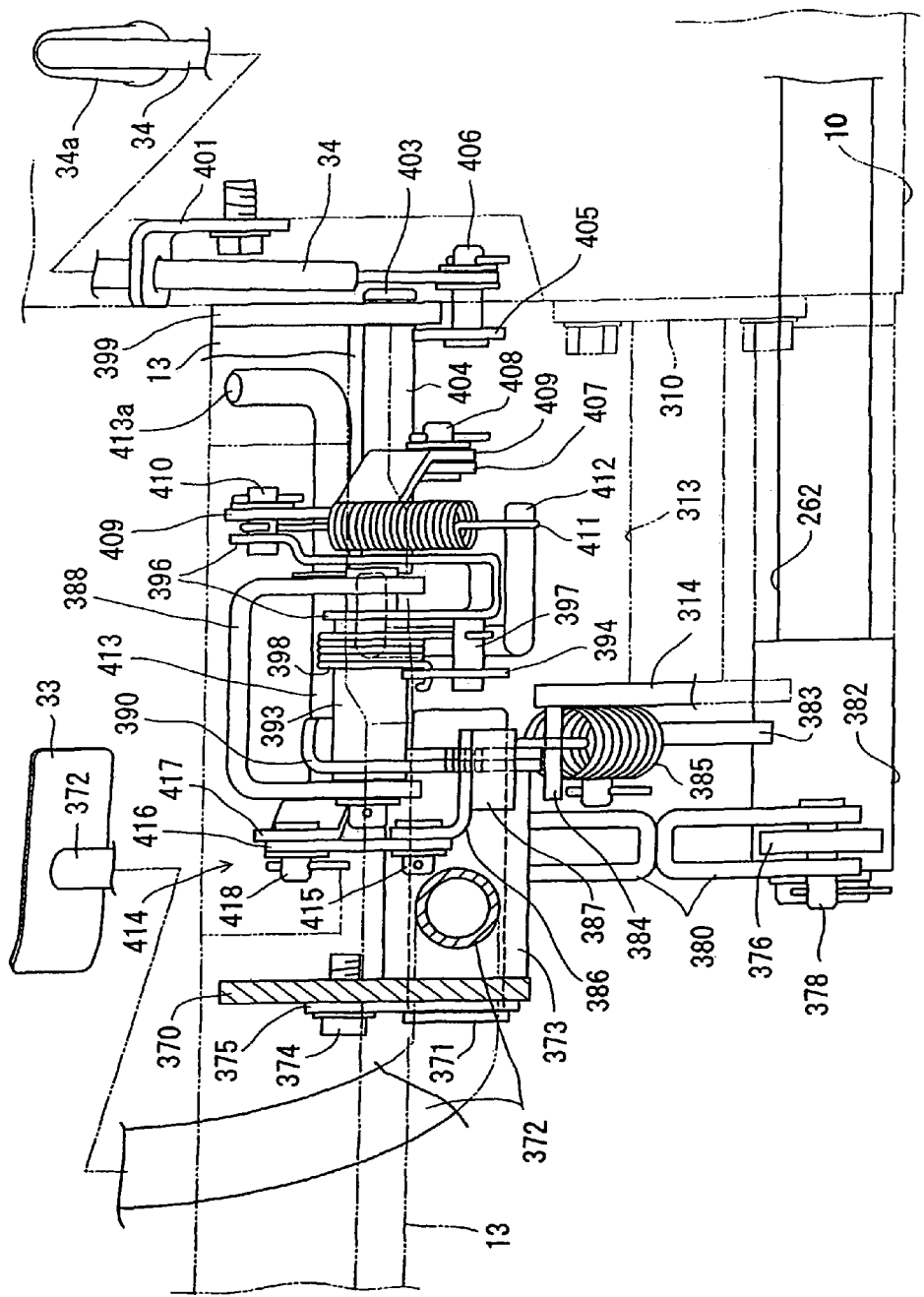

As is clear from FIG. 18, FIG. 20, and FIG. 21, the brake pedal 33 and the release arm 413 are arranged on the step frame 13 of the running vehicle body 2, and the brake pedal 33 and the release arm 413 are connected to each other by the release link mechanism 414. Thus, the brake pedal 33 and the release arm 413 can be supported in high rigidity by the step frame 13, and the brake pedal 33 and the release arm 413 can be connected to each other in a simple construction by the releasing link mechanism 414 of low cost.

As is clear from FIG. 15, the engaging link 364 is turnably arranged on the link support shaft 302 of the running vehicle body 2 and one end side of the engaging link 364 is connected to the cruise lever 38, and the engaging part 363 is arranged on the other end side of the engaging link 364, and the engaging link 364 can be moved by the release arm 413 in the direction in which the engaging part 363 is disengaged from the engaged claws 362. Thus, by a comparatively small operating force of the brake pedal 33, the release arm 413 can be activated to easily move the engaging link 364 to forcibly release the vehicle speed holding mechanism 361. Thus, the engaging part 363 can be surely held engaged with the engaged claws 362 by the use of the comparatively large biasing force of the neutral holding spring 339 for returning the forward pedal 36 and the rearward pedal 37 to the initial positions.

As is clear from FIG. 11 and FIG. 13, the shift pedals include the forward pedal 36 and the rearward pedal 37, and the pedal unit frame 309 as the pedal frame is removably disposed on the running vehicle body 2, and the forward pedal 36 and the rearward pedal 37 are turnably journaled by the pedal unit frame 309 via the forward pedal shaft 315 and the rearward pedal shaft 316. Thus, the operation of mounting and dismounting the forward pedal 36 and the rearward pedal 37 on and from the running vehicle body 2 via the pedal unit frame 309 can be performed separately from the operation of mounting and dismounting the brake pedal 33 on and from the step frame 13. Hence, the workability of mounting and dismounting the forward pedal 36, the rearward pedal 37, and the brake pedal 33 can be improved. Further, the forward pedal 36, the rearward pedal 37, and the brake pedal 33 can be arranged close to each other at positions where the operator can easily depress the pedals with the right foot. Hence, the operability of depressing the forward pedal 36, the rearward pedal 37, and the brake pedal 33 can be improved.

Next, the structure of restricting the transmission operation of the above-mentioned continuously variable transmission 25, the structure of adjusting the transmission neutral position of the continuously variable transmission 25, and the structure of holding the shift pedals (the forward pedal 36 and the rearward pedal 37) at the initial positions will be described with reference to FIG. 7, FIG. 11, FIG. 14, and FIG. 22. As shown in FIG. 7 and FIG. 11, the two-pronged base end portions of the trunnion arm 35 are fixed to the square column portion of the trunnion shaft 301 by fastening a bolt 421 and a nut 422. A nut part 423 is fixed by welding to the tip portion of the trunnion arm 35, and a threaded base end portion of the connecting shaft 337 formed in the shape of a hexagonal column is screwed into the nut part 423 in the clutch housing 10, whereby the connecting shaft 337 is removably fixed to the trunnion arm 35. A transmission operation hole 424 is formed in the right wall of the clutch housing 10, and the middle portion of the connecting shaft 337 is passed through the transmission operation hole 424. A threaded tip end portion of the connecting shaft 337 is protruded outside the clutch housing 10, and the transmission rod 336 is connected to the threaded tip end portion of the connecting shaft 337 via a connecting nut 425. Thus, the base end portion of the connecting shaft 337 is inserted into the transmission operation hole 424 from outside the clutch housing 10, and the connecting shaft 337 can be fastened to the trunnion arm 35 by the use of a tool for screwing the connecting shaft 337.

As shown in FIG. 7 and FIG. 11, the pivot bolt 342 is fixed to the clutch housing 10 by welding or the like, and the neutral adjusting part 340 is fitted on the pivot bolt 342 protruded outside the clutch housing 10, and the neutral adjusting part 340 is fastened to the pivot bolt 342 with a pivot nut 426. Thus, when the pivot nut 426 is loosened and the neutral adjusting bolt 343 is loosened, the neutral adjusting part 340 can be turned around the pivot bolt 342 within the range of the neutral adjusting hole 344, and hence the transmission restriction hole 345 can be moved in the circumferential direction of a circle having the trunnion shaft 301 at the center.

Figure 22:
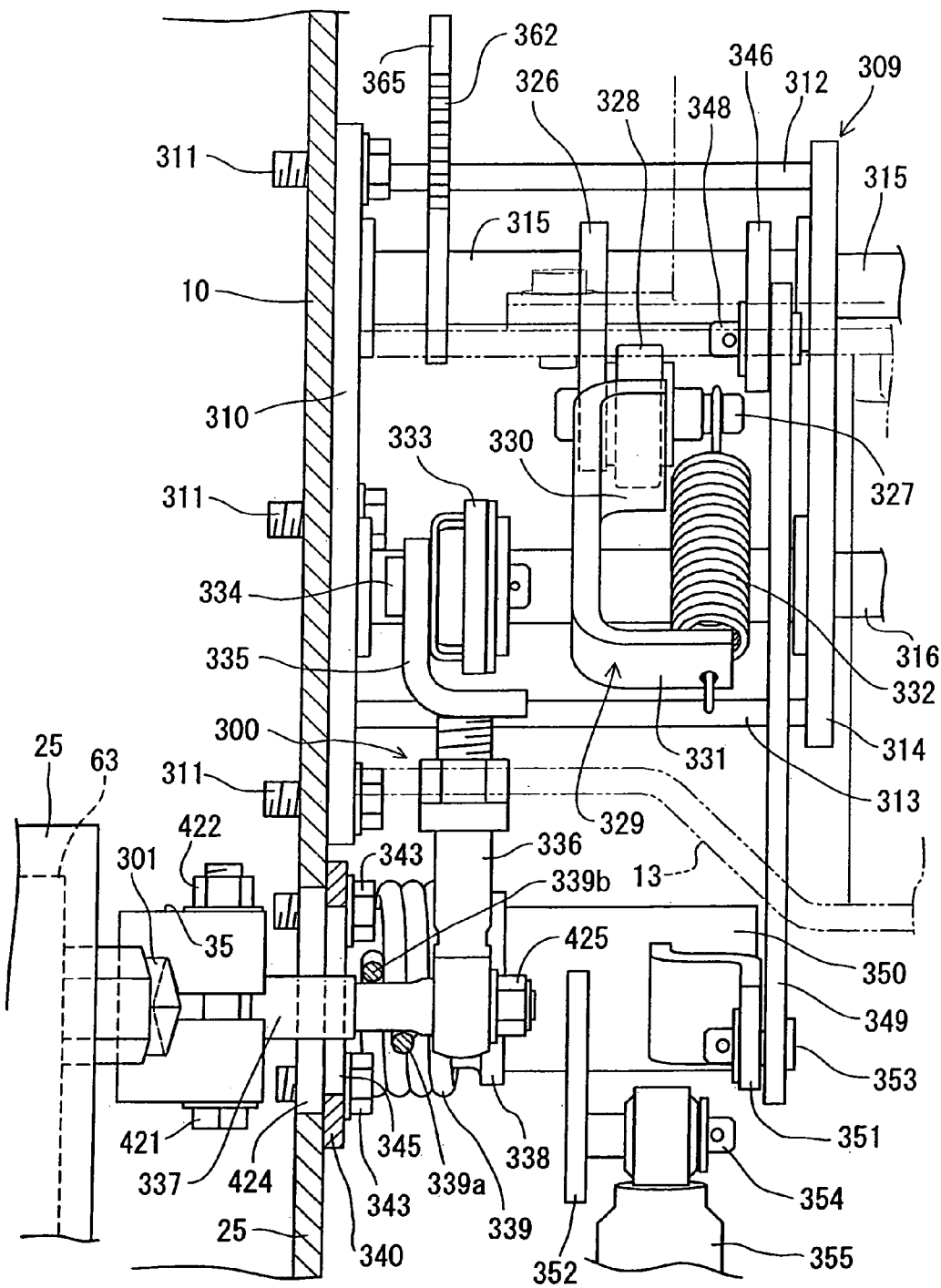
FIG. 22 is an enlarged view of a portion in FIG. 14.

As shown in FIG. 22, the length of the transmission operation hole 424 formed in the circumferential direction of a circle having the trunnion shaft 301 at the center is made longer than the length of the transmission restriction hole 345 formed in the circumferential direction of a circle having the trunnion shaft 301 at the center. The opening 424 is formed in a length larger than at least the length of the transmission restriction hole 345 and larger than the length of the neutral adjusting hole 344. The connecting shaft 337 abuts on the edge of the transmission restriction hole 345 before the connecting shaft 337 abuts on the edge of the opening 424 to restrict the transmission operation of the trunnion arm 35.

As shown in FIG. 7 and FIG. 11, a spring holder 338 is fixed to the outside surface of the clutch housing 10 with a holder bolt 427. The middle portion of a neutral holding spring 339 of a pinch spring type is wound around the outer periphery of the spring holder 338 formed in the shape of a circular column. As shown in FIG. 11 and FIG. 22, the connecting shaft 337 and the retaining shaft 341 are pinched by both end portions 339a, 339b of a pinch spring type of the neutral holding spring 339. The trunnion arm 35 is held at a transmission neutral position determined by the retaining shaft 341 via the connecting shaft 337.

Next, the operation of adjusting the range of restricting the transmission operation of the continuously variable transmission 25 and the transmission neutral position of the continuously variable transmission 25 will be described. When the operator depresses the forward pedal 36 or the rearward pedal 37 with the foot to turn the trunnion arm 35, one of the both end portions 339a, 339b of a pinch spring type of the neutral holding spring 339 is separated from the retaining shaft 341 and the separated one of the end portions 339a, 339b is elastically pressed onto the connecting shat 337. Thus, when the operator separates the foot from the forward pedal 36 or the rearward pedal 37, the forward pedal 36 or the rearward pedal 37 is returned to the initial position by the biasing force of the neutral holding spring 339, and the forward pedal 36 or the rearward pedal 37 is held at the initial position, and the trunnion arm 35 is returned to the neutral position (position where the transmission output is brought to zero) by the biasing force of the neutral holding spring 339, and the trunnion arm 35 is held at the neutral position.

The neutral adjusting bolts 343 and the pivot nut 426 are loosened in a state where the forward pedal 36 and the rearward pedal 37 are held at the initial positions and where the trunnion arm 35 is held at the neutral position. Further, in a state where the engine 5 is operated, the neutral adjusting part 340 is turned around the pivot bolt 342, and the trunnion arm 35 is turned via the retaining shaft 341, the neutral holding spring 339, and the connecting shaft 337. When the transmission output (revolution of the main transmission output shaft 67) of the continuously variable transmission 25 is brought nearly to zero, the neutral adjusting bolts 343 and the pivot nut 426 are fastened again to fasten the neutral adjusting part 340 to the clutch housing 10, whereby the adjusting of the neutral position of the trunnion arm 35 is completed. In this regard, whether or not the transmission output of the continuously variable transmission 25 is brought nearly to zero can be determined by whether or not the number of revolutions to be outputted to the rear wheels 4 is brought nearly to zero.

As described above, when the neutral adjusting part 340 is turned around the pivot bolt 342, the transmission restriction hole 345 as a stroke stopper for restricting the transmission operation of the trunnion arm 35 is moved around the pivot bolt 342, whereby the range of the transmission operation of the trunnion arm 35 is moved to the forward side or the rearward side. With this, the range of the transmission operation of the trunnion arm 35 is adjusted. For example, when the transmission restriction hole 345 is moved to the forward operation side of the trunnion arm 35, the range of the transmission operation on the forward side of the trunnion arm 35 is expanded and the range of the transmission operation on the rearward side of the trunnion arm 35 is contracted. In contrast to this, when the transmission restriction hole 345 is moved to the rearward operation side of the trunnion arm 35, the range of the transmission operation on the forward side of the trunnion arm 35 is contracted and the range of the transmission operation on the rearward side of the trunnion arm 35 is expanded.

In other words, the connecting shaft 337 abuts on the edge of the transmission restriction hole 345 to restrict the movement of the connecting shaft 337. Hence, the movement on the speed increasing side of the trunnion arm 35 is also restricted and the maximum speed increasing position of the trunnion arm 35 is adjusted. In this regard, the maximum quantities of depression of the forward pedal 36 and the rearward pedal 37 (the operating range of the maximum transmission output of the continuously variable transmission 25) are adjusted by adjusting the positions of the forward stopper 323 and the rearward stopper 324, and the forward pedal 36 and the rearward pedal 37 are depressed by the operator within the range where the connecting shaft 337 does not abut on the edge of the transmission restriction hole 345.

As is clear from FIG. 7 and FIG. 11, in the working vehicle provided with: the engine 5 mounted on the running vehicle body 2 having the front wheels 3 and the rear wheels 4 as running parts; the hydrostatic continuously variable transmission 25 for variably transmitting power from the engine 5; the transmission case 11 for transmitting a transmission output from the hydrostatic continuously variable transmission 25 to the front wheels 3 and the rear wheels 4 via the auxiliary transmission gear mechanism 59 as a transmission output gear; the forward pedal 36 and the rearward pedal 37 as the shift pedals connected to the trunnion arm 35 for the transmission operation of the hydrostatic continuously variable transmission 25 via the transmission link mechanism 300, the hydrostatic continuously variable transmission 25 and the trunnion arm 35 are disposed in the clutch housing 10 as the main housing of the running vehicle body 2, and one end portion of the connecting shaft 337 as a transmission operating part is removably fixed to the trunnion arm 35, and the other end portion of the connecting shaft 337 is protruded outside from the transmission operation hole 424 of the clutch housing 10, and the transmission link mechanism 300 is connected to the other end portion of the connecting shaft 337. Thus, the operation of mounting or dismounting of the connecting shaft 337, the transmission link mechanism 300, and the like can be easily performed in a state where the hydrostatic continuously variable transmission 25 and the trunnion arm 35 are disposed in the clutch housing 10. Hence, the workability of mounting or dismounting of the clutch housing 10 and the transmission link mechanism 300 can be improved.

As is clear from FIG. 11, the neutral adjusting part 340 for adjusting the neutral position of the trunnion arm 35 is disposed, and the neutral adjusting part 340 is arranged on the outside surface of the clutch housing 10. Thus, the neutral adjusting part 340 can be operated outside the clutch housing 10 to adjust the neutral position of the trunnion arm 35 with ease. Hence, the workability of mounting the connecting shaft 337, the transmission link mechanism 300, and the like and the workability of adjusting the neutral position of the trunnion arm 35 can be improved.

As is clear from FIG. 7, FIG. 11, and FIG. 22, there is provided the neutral holding spring 339 which acts as spring means of a pinch type for holding the trunnion arm 35 at the neutral position, and the neutral holding spring 339 is arranged on the outside surface of the clutch housing 10, and the connecting shaft 337 is pinched by both end portions 339a, 339b of a pinch spring type of the neutral holding spring 339, and both end portions 339a, 339b of a pinch spring type of the neutral holding spring 339 separatably abut on the retaining shaft 341 as the retaining part of the neutral adjusting part 340. Thus, the neutral holding spring 339 can be disposed compactly close to the neutral adjusting part 340. Further, the trunnion arm 35 can be returned to the neutral position by the biasing force of the neutral holding spring 339, and the forward pedal 36 and the rearward pedal 37 can be returned to and held at the initial position.

As is clear from FIG. 7 and FIG. 11, the transmission restriction hole 345 as a cutout hole is formed in the neutral adjusting part 340, and the connecting shaft 337 is passed through the transmission restriction hole 345, and the neutral adjusting part 340 is fastened to the outside surface of the clutch housing 10 via the pivot bolt 342 and the neutral adjusting bolts 343. Thus, the neutral adjusting bolts 343 can be loosened outside the clutch housing 10, and the neutral adjusting part 340 can be turned around the pivot bolt 342. In other words, the neutral position (position where the transmission output is brought nearly to zero) of the trunnion arm 35 can be easily adjusted outside the clutch housing 10. Further, the transmission restriction hole 345 can be formed in such a way that the connecting shaft 337 can abut on the edge of the transmission restriction hole 345 and hence the neutral adjusting part 340 can be used as the stroke stopper for restricting the transmission operation of the trunnion arm 35.

As is clear from FIG. 7, one end portion of the trunnion arm 35 is fixed to the trunnion shaft 301 of the hydrostatic continuously variable transmission 25, and the nut part 423 is fixed to the other end portion of the trunnion arm 35, and the connecting shaft 337 is formed of base material shaped like a polygonal column, and one end portion of the connecting shaft 337 can be screwed into the nut part 423 from outside the clutch housing 10. Thus, in a state where the operation of mounting the clutch housing 10, the hydrostatic continuously variable transmission 25, and the like is completed and where the operation of mounting the forward pedal 36, the rearward pedal 37, and the like is completed, the accessories (such as the connecting shaft 337, the transmission link mechanism 300, and the neutral adjusting part 340) of the transmission operation system of the hydrostatic continuously variable transmission 25 for connecting the forward pedal 36 and the rearward pedal 37 to the trunnion arm 35 can be mounted. Hence, the workability of maintenance such as the workability of adjusting the transmission operation system of the hydrostatic continuously variable transmission 25 can be improved, and the workability of mounting and dismounting the clutch housing 10, the forward pedal 36, the rearward pedal 37, and the like can be improved.

As is clear from FIG. 11 and FIG. 22, in the working vehicle provided with: the engine 5 mounted on the running vehicle body 2 having the front wheels 3 and the rear wheels 4 as running parts; the hydrostatic continuously variable transmission 25 for variably transmitting power from the engine 5; the transmission case 11 for transmitting a transmission output from the hydrostatic continuously variable transmission 25 to the front wheels 3 and the rear wheels 4 via the auxiliary transmission gear mechanism 59 as a transmission output gear; and the forward pedal 36 and the rearward pedal 37 as the shift pedals connected to the trunnion arm 35 as the transmission operating part of the hydrostatic continuously variable transmission 25 via the transmission link mechanism 300, the neutral holding function of holding the trunnion arm 35 at the neutral position where the transmission output of the hydrostatic continuously variable transmission 25 is brought nearly to zero and the initial position return function of holding the forward pedal 36 and the rearward pedal 37 at the initial positions where the transmission output of the hydrostatic continuously variable transmission 25 is brought nearly to zero are given to the neutral holding spring 339 as single spring means, and the trunnion arm 35 is returned to the neutral position from the transmission output position by the neutral holding spring 339, and the forward pedal 36 and the rearward pedal 37 are returned to their initial positions from their depressed positions by the neutral holding spring 339. Thus, the structure of holding the trunnion arm 35 at the neutral position and the structure of holding the forward pedal 36 and the rearward pedal 37 at their initial positions can be easily constructed by the use of the neutral holding spring 339 and hence the workability of mounting and maintaining them can be improved.

As is clear from FIG. 11 and FIG. 22, there is provided the neutral adjusting part 340 as the stroke stopping means for restricting the transmission operation of the trunnion arm 35, and the range of restricting the transmission operation of the neutral adjusting part 340 can be adjusted in association with the adjusting operation of holding the neutral position by the neutral holding spring 339 for holding the trunnion arm 35 at the neutral position. Thus, the range of restricting the transmission operation of the trunnion arm 35 can be adjusted only by the adjusting operation of holding the trunnion arm 35 at the neutral position, so that the workability of maintenance and the like can be improved.

As is clear from FIG. 7, FIG. 11, and FIG. 22, the transmission operating part is formed of the trunnion arm 35 for changing the output of a hydraulic pump 63 of the hydrostatic continuously variable transmission 25, and one end portion of the connecting shaft 337 as the neutral adjusting pin is connected to the trunnion arm 35, and the transmission link mechanism 300 is connected to the other end portion of the connecting shaft 337, and both end portions 339a, 339b of a pinch spring type of the neutral holding spring 339 are connected to the middle portion of the connecting shaft 337 and the neutral adjusting part 340. Thus, the neutral adjusting part 340 and the neutral holding spring 339 can be easily mounted in a compact installation space. Here, the connecting shaft 337 can be formed by cutting base material shaped like a hexagonal column. Thus, the base end portion of the connecting shaft 337 can be inserted into the transmission operation hole 424 from outside the clutch housing 10, and the base end portion of the connecting shaft 337 can be screwed into the trunnion arm 35 in the clutch housing 10, and the other end portion of the connecting shaft 337 can be protruded outside the clutch housing 10. In other words, heavy parts such as the clutch housing 10 and the hydrostatic continuously variable transmission 25 (main parts of the running vehicle body 2) are mounted and then the transmission operating mechanism such as the transmission link mechanism 300 and the connecting shaft 337 (accessories lighter than the main parts) can be mounted later.

As is clear from FIG. 11 and FIG. 22, the transmission restriction hole 345 as the cutout hole is formed in the neutral adjusting part 340, and the connecting shaft 337 is passed through the transmission restriction hole 345. Thus, the movement of the connecting shaft 337 can be restricted by the transmission restriction hole 345, and a stroke stopping mechanism for restricting the transmission operation of the trunnion arm 35 can be easily constructed by the neutral adjusting part 340, so that the workability of assembly and the like can be improved. The neutral adjusting part 340 can be formed in high rigidity at low cost by cutting a flat steel plate nearly shaped like a triangle.

As is clear from FIG. 11 and FIG. 22, the neutral adjusting part 340 is fastened to the running vehicle body 2 with the pivot bolt 342 and the neutral adjusting bolts 343, and the neutral adjusting bolts 343 are passed through the elongated neutral adjusting holes 344 of the neutral adjusting part 340. The neutral position of the trunnion arm 35 can be adjusted by the operation of loosening the neutral adjusting bolts 343 and then turning the neutral adjusting part 340 around the pivot bolt 342. Thus, while the hydrostatic continuously variable transmission 25 is driven by the output of the engine 5, the neutral adjusting bolts 343 are loosened and then the neutral adjusting part 340 is turned around the pivot bolt 342. Then, at the position of the neutral adjusting part 340 when the number of revolutions of output of the continuously variable transmission 25 is brought nearly to zero, the neutral adjusting bolts 343 are fastened to fasten the neutral adjusting part 340 to the clutch housing 10 of the running vehicle body 2. With this, the adjusting operation of holding the trunnion arm 35 at the transmission neutral position and the adjusting operation of changing the range of restricting the transmission operation of the neutral adjusting part 340 can be easily performed outside the clutch housing 10. Hence, the workability of assembly, maintenance, and the like can be improved.

The structure and the operation of adjusting a damping pressure to be applied to the forward pedal 36 and the rearward pedal 37 of the embodiment of the present invention will be described with reference to FIG. 12, FIG. 14, and FIG. 19. The damping pressure (resisting force against the pedal depressing force) of the depressing force damper 355 as the damping unit is always held nearly at a constant value. As described above, in the resisting force adjusting link arm 346 are formed: a first resisting force adjusting hole 347a for applying an average standard resisting force (optimal design value) to the forward pedal 36 and the rearward pedal 37; a second resisting force adjusting hole 347b for applying a resisting force, which is smaller than the standard resisting force by about 10 to 30 percent, to the forward pedal 36 and the rearward pedal 37; and a third resisting force adjusting hole 347c for applying a resisting force, which is larger than the standard resisting force by about 10 to 30 percent, to the forward pedal 36 and the rearward pedal 37. The second resisting force adjusting hole 347b is arranged at a position where a link ratio is smaller than the first resisting force adjusting hole 347a by about 20 percent, and the third resisting force adjusting hole 347c is arranged at a position where a link ratio is larger than the first resisting force adjusting hole 347a by about 20 percent.

In other words, when the resisting force adjusting pin 348 is inserted into any one of the first resisting force adjusting hole 347a, the second resisting force adjusting hole 347b, and the third resisting force adjusting hole 347c of the resisting force adjusting link arm 346 to change the position where the resisting force link frame 349 is fitted to the resisting force adjusting link arm 346 via the resisting force adjusting pin 348, the resisting force of the depressing force damper 355 is changed stepwise in three steps with respect to the operating force of depressing the forward pedal 36 and the rearward pedal 37. Thus, the operator can change the operating feeling (operating force) of depressing the forward pedal 36 and the rearward pedal 37 in three steps according to use (kind or content of work).

As is clear from FIG. 12, FIG. 14, and FIG. 19, in the working vehicle provided with: the engine 5 mounted on the running vehicle body 2 having the front wheels 3 and the rear wheels 4 as running parts; the hydrostatic continuously variable transmission 25 for variably transmitting power from the engine 5; the transmission case 11 for transmitting a transmission output from the hydrostatic continuously variable transmission 25 to the front wheels 3 and the rear wheels 4 via the auxiliary transmission gear mechanism 59 as a transmission output gear; the forward pedal 36 and the rearward pedal 37 as the shift pedals connected to the trunnion arm 35 for the transmission operation of the hydrostatic continuously variable transmission 25 via the transmission link mechanism 300; and the depressing force damper 355 connected to the forward pedal 36 and the rearward pedal 37, there are provided the resisting force adjusting link arm 346 and the resisting force link frame 349 that connect the depressing force damper 355 to the forward pedal 36 and the rearward pedal 37, and the resisting force adjusting link arm 346 has plural resisting force adjusting holes 347a, 347b, and 347c for connecting the resisting force link frame 349 formed therein. Thus, when the resisting force link frame 349 is selectively connected to any one of the plural resisting force adjusting holes 347a, 347b, and 347c, the link ratio of the resisting force link frame 349, connected to the depressing force damper 355, and the resisting force adjusting link arm 346 can be changed. For this reason, the nearly constant resisting force of the depressing force damper 355 can be stepwise changed by changing the link ratio of the resisting force adjusting link arm 346 and the resisting force of the depressing damper 355 to the operating force of depressing the forward pedal 36 and the rearward pedal 37 can be stepwise changed. Hence, the operator can easily change the feeling of the operation of depressing the forward pedal 36 and the rearward pedal 37 according to use or the like. Further, as compared with the above-mentioned conventional hydraulic damper structure, a resisting force adjusting mechanism for adjusting a resisting force to the operating force of depressing the forward pedal 36 and the rearward pedal 37 can be more easily constructed of the resisting force adjusting link arm 346 and the resisting force link frame 349, and the work of mounting or maintaining the resisting force adjusting mechanism can be easily performed.

As is clear from FIG. 12, in the resisting force adjusting link arm 346 are formed: the first resisting force adjusting hole 347a for applying an average standard resisting force to the forward pedal 36 and the rearward pedal 37; the second resisting force adjusting hole 347b for applying a resisting force, which is smaller than the standard resisting force by about 10 to 30 percent, to the forward pedal 36 and the rearward pedal 37; and the third resisting force adjusting hole 347c for applying a resisting force, which is larger than the standard resisting force by about 10 to 30 percent, to the forward pedal 36 and the rearward pedal 37. Thus, the resisting force of the depressing force damper 355 to the operating force of depressing the forward pedal 36 and the rearward pedal 37 can be determined by selecting any one of the standard resisting force, the resisting force smaller than the standard resisting force, and the resisting force larger than the standard resisting force (selecting one from three resisting forces). For this reason, the operator can easily select the resisting force of the depressing force damper 355 to the operating force of depressing the forward pedal 36 and the rearward pedal 37 and can also easily return the resisting force of the depressing force damper 355 to the operating force of depressing the forward pedal 36 and the rearward pedal 37 to the standard resisting force.

As is clear from FIG. 12, FIG. 14, and FIG. 19, the transmission link mechanism 300 is disposed on one outside of the clutch housing 10 of the running vehicle body 2, and the resisting force link frame 349 is disposed so as to extend nearly parallel to the direction in which the transmission link mechanism 300 activated by the operation of depressing the forward pedal 36 and the rearward pedal 37 is activated, and the transmission link mechanism 300 is interposed between the outer surface of the clutch housing 10 and the resisting force link frame 349. Thus, the transmission link mechanism 300 and the resisting force link frame 349 can be compactly disposed along the outer surface of the clutch housing 10, and the depressing force damper 355 can be connected to the resisting force link frame 349 in the direction in which the resisting force link frame 349 is extended. Hence, the work of mounting or maintaining the transmission link mechanism 300 and the depressing force damper 355 can be easily performed.

As is clear from FIG. 12 and FIG. 14, the shift pedals include the forward pedal 36 and the rearward pedal 37 and have the forward pedal shaft 315 and the rearward pedal shaft 316 for disposing the forward pedal 36 and the rearward pedal 37 in such a way that the forward pedal 36 and the rearward pedal 37 can turn. The resisting force link frame 349 is connected to the forward pedal shaft 315 via the resisting force adjusting link arm 346, and the pressure applying arm 326 and the swing arm 329, which act as a braking mechanism for connecting the forward pedal shaft 315 and the rearward pedal shaft 316, are interposed between the transmission link mechanism 300 and the resisting force link frame 349. Thus, the forward pedal shaft 315 and the rearward pedal shaft 316 can be disposed separately from each other in the direction of travel of the running vehicle body 2, and the resisting force link frame 349 can be connected to the forward pedal shaft 315 arranged forward in the direction of travel, and the transmission link mechanism 300 can be connected to the rearward pedal shaft 316 arranged rearward in the direction of travel. The pressure applying arm 326 and the swing arm 329 can be connected between the forward pedal shaft 315 and the rearward pedal shaft 316. The pressure applying arm 326 and the swing arm 329 can be arranged separately from each other with respect to the resisting force link frame 349 and the transmission link mechanism 300 in the right-and-left or width direction of the running vehicle body 2. In this manner, the resisting force link frame 349, the transmission link mechanism 300, the pressure applying arm 326, and the swing arm 329 can be arranged in parallel to each other when viewed in a plan view. Hence, the work of mounting or maintaining these parts can be easily performed.

As is clear from FIG. 12, FIG. 14, and FIG. 19, the brake pedal 33 is arranged on the step frame 13 of the running vehicle body 2 via the brake pedal shaft 371, and the brake pedal shaft 371 is connected to the brake operating shaft 262 for braking the rear wheels 4 via the brake link mechanism 381, and a turnable cylindrical shaft body 350 is fitted on the brake operating shaft 262, and the resisting force link frame 349 is connected to the depressing force damper 355 via the cylindrical shaft body 350. Thus, the depressing force damper 355 can be easily connected to the resisting force link frame 349 by the use of the brake operating shaft 262 disposed in the middle for connecting the brake pedal 33 to the brake mechanism 32 of the rear wheels 4, and the brake pedal 33 can be easily arranged near the forward pedal 36 and the rearward pedal 37, and the depressing force damper 355 can be easily arranged at a position separate from the position where the brake pedal 33 is arranged. Hence, the work of mounting or maintaining the depressing force damper 355 can be easily performed.

Figure 23:
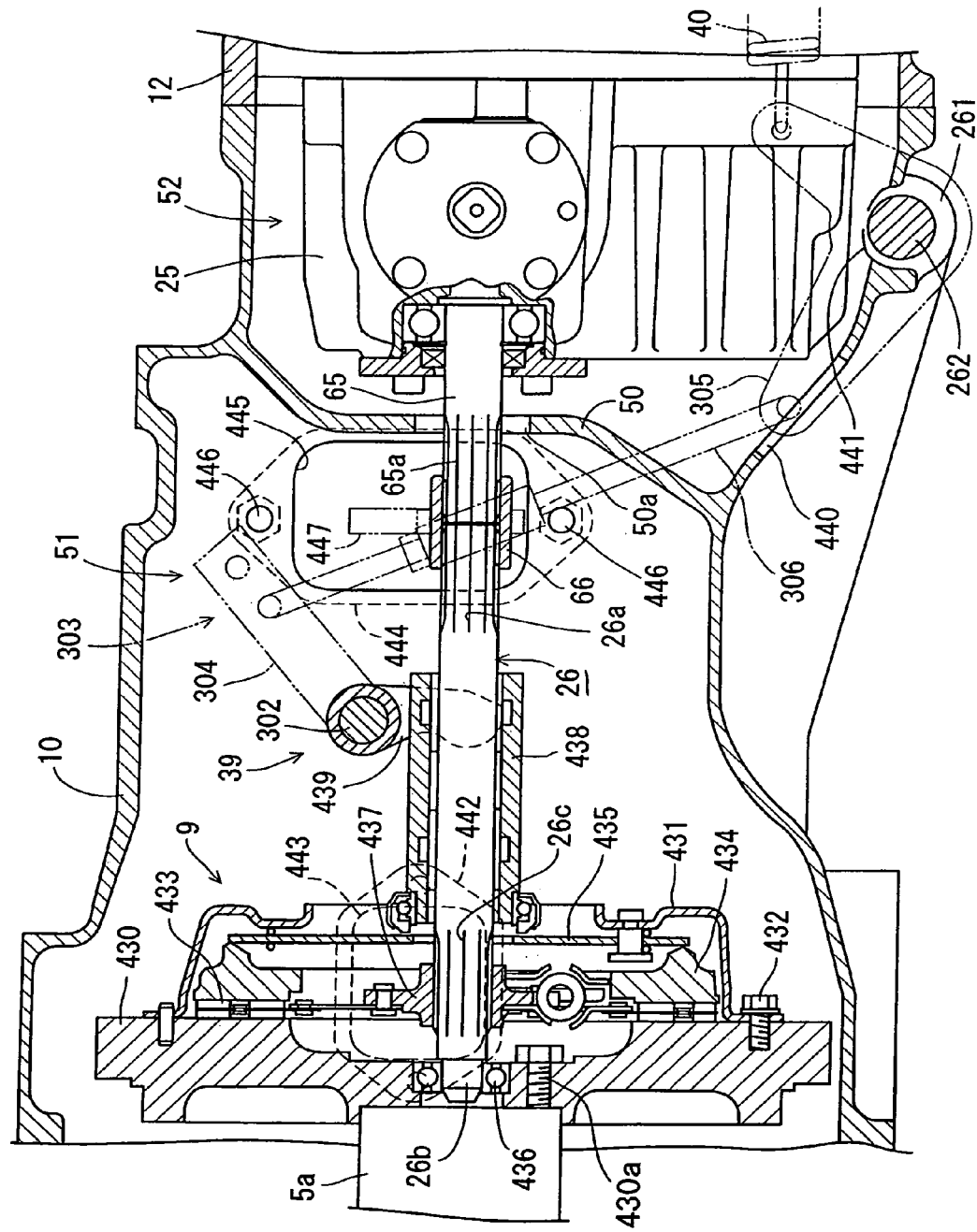
FIG. 23 is a sectional side view of a clutch case.

The structure of the above-mentioned main clutch 9 and the main drive shaft 26 will be described with reference to FIG. 5, FIG. 6, FIG. 9, FIG. 23, and FIG. 24. As shown in FIG. 23, a flywheel 430 is fastened to one end portion (rear end portion) of the crankshaft 5a of the engine 5 with bolts 430a. A clutch case 431 of a main clutch 9 of a dry single plate type is fastened to the rear surface of the flywheel 430 with bolts 432. A clutch disk 433, a pressing plate 434, and a diaphragm spring 435 of a cone disk type are disposed in the clutch case 431 (between the flywheel 430 and the clutch case 341). The clutch disk 433 and the like are mounted on the flywheel 430, and the clutch disk 433 is pressed onto the flywheel 340 via the pressing plate 434 by the biasing force of the diaphragm spring 435.

As is shown in FIG. 23, a coupling 66 is fitted on the rear end portion of the main drive shaft 26 and the front end portion of the transmission input shaft 65 via splines 26a, 56a. A pointed head portion 26b at the front end of the main drive shaft 26 is turnably journaled by the flywheel 340 via a ball bearing 436. A boss part 437 of the clutch disk 433 is fitted on the front end portion of the main drive shaft 26 via a spline 26c. A release hub 438 abutting on the diaphragm spring 435 is fitted on the middle portion of the main drive shaft 26 in such a way as to be able to turn and move in the axial direction. A release fork 439 of the above-mentioned clutch disengaging mechanism 39 is engaged with the release hub 438.

Thus, in a state where the main clutch 9 is engaged, that is, in a state where the clutch disk 433 is pressed onto the flywheel 340, the main drive shaft 26 is connected to the crankshaft 5a and hence the power of the engine 5 is transmitted to the continuously variable transmission 25. On the other hand, when the clutch pedal 31 is depressed, the release fork 439 is turned around the clutch operating shaft 302 via the clutch operating link mechanism 303. The turn of the release fork 439 presses the release hub 438 onto the diaphragm spring 435 to release the pressing operation of the pressing plate 434 to bring the force of pressing the clutch disk 433 onto the flywheel 340 nearly to zero to thereby switch the main clutch 9 to a disengaged state, whereby the output of the engine 5 is interrupted.

On the other hand, a through hole 50a through which the transmission input shaft 65 is inserted is formed in a housing inside wall 50 that partitions the housing front chamber 51 and the housing rear chamber 52. Further, in the clutch housing 10 are formed: the transmission operation hole 424 for connecting the transmission link mechanism 300 to the trunnion arm 35 in the housing rear chamber 52; the transmission shaft insertion hole 258 through which the transmission shaft 88 for the front wheels 3 and the shaft cover 89 are inserted in the housing rear chamber 52; and an inside-outside connection hole 441 arranged nearly directly above the brake operating shaft 262.

In other words, the inside-outside connection hole 441 is formed in the bottom portion of the housing rear chamber 52, and the brake operating shaft 262 is arranged outside the inside-outside connection hole 441. Thus, the brake operating shaft 262 can prevent soil, straw, or rain water from entering the housing rear chamber 52 through the inside-outside connection hole 441. Further, rain water entering the housing rear chamber 52 through the transmission operation hole 424 or the transmission shaft insertion hole 258 can be discharged through the inside-outside connection hole 441. Hence, even if rain water enters the housing rear chamber 52, the rain water is prevented from entering the housing front chamber 51 through the through hole 50a.

Figure 24:
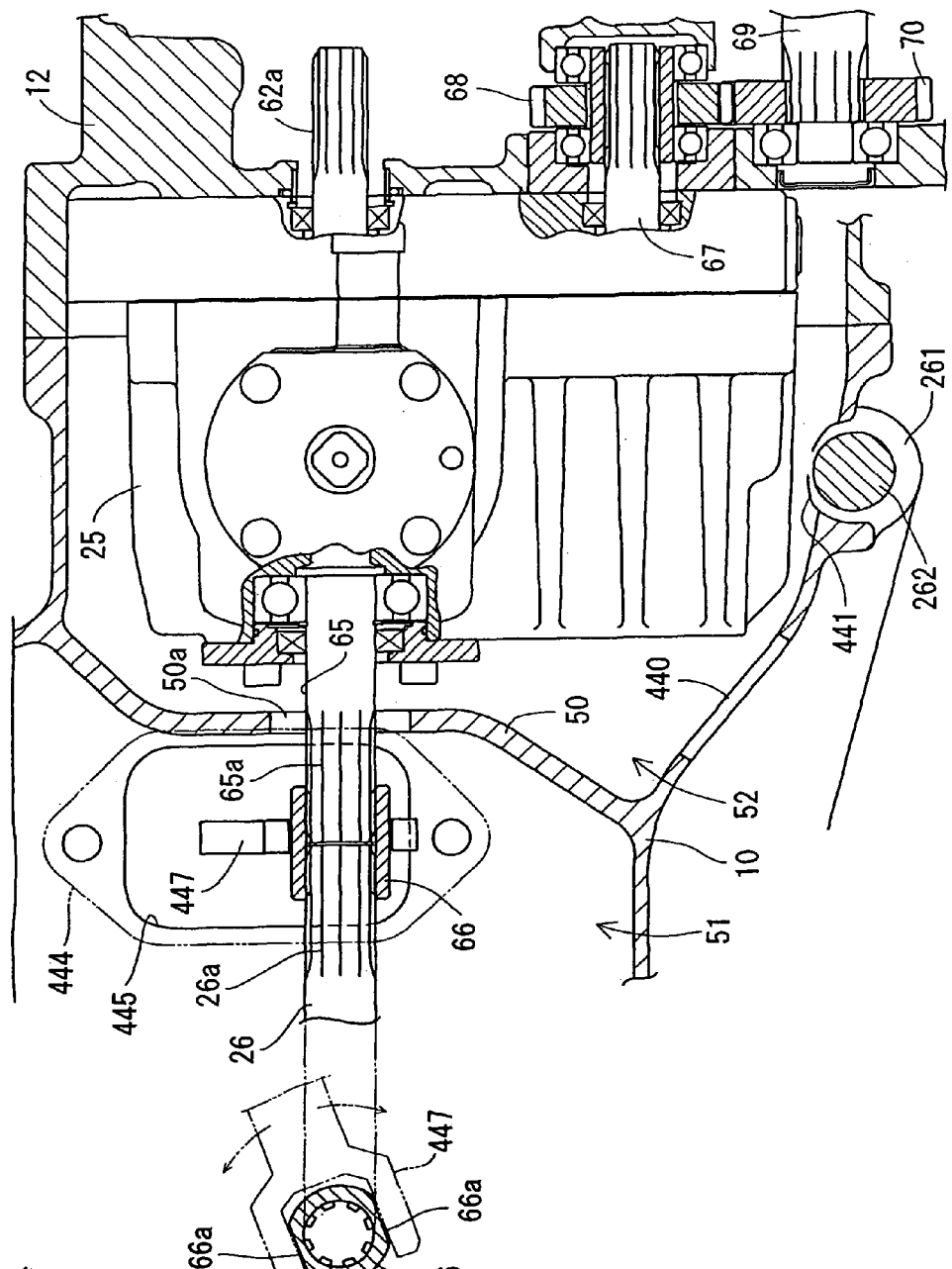
FIG. 24 is an illustration, on an enlarged scale, of a portion in FIG. 23.

On the other hand, as shown in FIG. 9, FIG. 23, and FIG. 24, a maintenance hole 443 closed by a maintenance cover 442 that can be opened or closed and a assembling operation hole 445 closed by an assembling operation cover 444 that can be opened or closed are formed in the side wall of the housing front chamber 51 (side wall on the right side of the clutch housing 10 in the direction of travel). The assembling operation cover 444 is fastened to the clutch housing 10 with bolts 446. Here, when the maintenance cover 442 is removed to open the maintenance hole 443, the number of revolutions of the engine 5 can be measured by the use of the flywheel 340 and the clutch disk 433 attached to the flywheel 340 by chemical reaction can be removed from the flywheel 340.

Next, the work of mounting the engine 5, the clutch housing 10, and the like in the running vehicle body 2 will be described. When the clutch housing 10 is connected to the engine 5 to assemble the running vehicle body 2, first, as shown in FIG. 6, the gears and shafts of the auxiliary gear transmission gear mechanism 59 and the like are combined in the transmission case 11 and the transmission front case 12, and the front side of the transmission case 11 is fastened to the rear side of the transmission front case 12 with plural bolts. The continuously variable transmission 25 is fixed to the front side of the transmission front case 12, and the rear side of the clutch housing 10 is fastened to the front side of the transmission front case 12 with plural bolts. The transmission case 11 is connected in series to the clutch housing 10 via the transmission front case 12.

Further, the rear end side of the main drive shaft 26 is connected via the coupling 66 to the front end side of the transmission input shaft 65 protruded into the housing front chamber 51, and the release hub 438 is combined with the main drive shaft 26. On one hand, the clutch operating shaft 302 is passed through the clutch housing 10, and the release fork 439 is combined with the clutch operating shaft 302. On the other hand, the clutch case 431 of the main clutch 9 is fixed to the flywheel 340, and the clutch disk 433 and the like are combined with the flywheel 340.

The front surface of the clutch housing 10 having the transmission case 11 connected thereto is joined to the rear surface of the engine 5 mounted with the main clutch 9, and the main drive shaft 26 is passed through the boss part 437 of the clutch disk 433, and the front surface of the clutch housing 10 is fastened to the rear surface of the engine 5 with plural bolts to connect the clutch housing 10 to the engine 5. With this, the work of assembling the running vehicle body 2 is finished.

When the front surface of the clutch housing 10 is joined to the rear surface of the engine 5, if the main drive shaft 26 is not fitted in the boss part 437 of the clutch disk 433 because of a displacement of the spline 26c, a tool 447 such as a spanner wrench is inserted into the assembly operating hole 445 and two-pronged tip end portions of the tool 447 are engaged with two chamfered engaged portions 66a formed on the coupling 66. Then, the tool 447 is operated to turn the coupling 66 and the main drive shaft 26 around the axis to correct the displacement of the spline 26c to thereby fit the main drive shaft 26 in the boss part 437 of the clutch disk 433. Here, the engaged portions 66a are formed on the coupling 66, but in place of the coupling 66, the engaged portions 66a, with which the tool 447 can be detachably engaged, may be formed on the main drive shaft 26 or the transmission input shaft 65.

As is clear from FIG. 23 and FIG. 24, in the working vehicle that includes: the engine 5 mounted on the running vehicle body 2 having the front wheels 3 and the rear wheels 4 as running parts; the main clutch 9 for transmitting power from the engine 5 or intercepting the transmission of power from the engine 5; the clutch housing 10 for housing the main clutch 9; and the transmission case 11 for transmitting the driving force from the main clutch 9 to the front wheels 3 and the rear wheels 4 via the main drive shaft 26 and the auxiliary transmission gear mechanism 59 as a transmission output gear, and has the clutch disk 433 of the main clutch 9 fitted on the main drive shaft 26 via the spline 26c, the assembly operation hole 445, through which the main drive shaft 26 can be seen visually from outside the clutch housing 10, is formed in the side wall of the clutch housing 10, and the assembly operation hole 445 is formed in the clutch housing 10 in a size large enough to allow the tool 447 for turning the main drive shaft 26 to be inserted. Thus, even if the main drive shaft 26 is not fitted in the shaft hole formed in the boss part 437 of the clutch disk 433 because of a displacement of the spline 26*c*, the main drive shaft 26 can be turned by the tool 447 inserted through the assembly operation hole 445, and the main drive shaft 26 can be easily fitted in the shaft hole formed in the boss part 437 of the clutch disk 433 via the spline 26*c*, so that the clutch housing 10 can be smoothly connected to the engine 5. Hence, the work of assembling the running vehicle body 2 can be easily performed.

As is clear from FIG. 23, the flywheel 430 is fixed to the crankshaft 5*a* as the output shaft of the engine 5, and the clutch case 431 is fixed to the flywheel 430, and the clutch parts such as the clutch disk 433 and the diaphragm spring 435 for constructing the main clutch 9 are arranged in the clutch case 431, and the release hub 438 for disengaging the clutch is fitted on the main drive shaft 26. Thus, in a state where the clutch parts such as the clutch disk 433 and the diaphragm spring 435 are mounted on the engine 5 via the clutch case 431 and where the clutch disengaging mechanism such as the release hub 438 is mounted in the clutch housing 10, a displacement of the spline 26*c* can be easily corrected by the operation of turning the main drive shaft 26, and hence the clutch housing 10 can be smoothly joined to the engine 5. Hence, the workability of assembling and disassembling the clutch housing 10 and the main clutch 9 can be improved.

As is clear from FIG. 6 and FIG. 24, the continuously variable transmission 25 is disposed in the transmission case 11, and the transmission input shaft 65 of the continuously variable transmission 25 is connected to the main drive shaft 26 via the coupling 66, and the engaged portions 66*a* with which the tool 447 can be detachably engaged is formed on any one of the coupling 66, the main drive shaft 26, and the transmission input shaft 65. Thus, the tool 447 is engaged with the engaged portions 66*a* formed on the coupling 66, the main drive shaft 26, or the transmission input shaft 65, and the operation of positioning the spline 26*c* can be performed by simply turning the main drive shaft 26. Here, when the engaged portions 66*a* are formed on the coupling 66, the cost of manufacturing the engaged portions 66*a* can be reduced as compared with the case where the engaged portions 66*a* are formed on the main drive shaft 26 or the transmission input shaft 65.

As is clear from FIG. 6 and FIG. 23, the interior of the clutch housing 10 is partitioned by the housing inside wall 50 to form the housing front chamber 51 and the housing rear chamber 52, and the main clutch 9 is disposed in the housing front chamber 51, and the continuously variable transmission 25 is disposed in the housing rear chamber 52, and the transmission input shaft 65 is protruded into the housing front chamber 51 from the continuously variable transmission 25 through the through hole 50*a* of the housing inside wall 50. Thus, the clutch disk 433 in the housing front chamber 51 can be separated from the continuously variable transmission 25 by the housing inside wall 50, and, for example, even if rain water enters the housing rear chamber 52, the rain water can be prevented by the housing inside wall 50 from moving into the housing front chamber 51, so that the performance of the clutch disk 433 can be held. For this reason, even if the continuously variable transmission 25 and the transmission link mechanism 300 for transmission operation are disposed inside and outside the housing rear chamber 52, means for preventing rain water is not required to be arranged in the opening for connecting the inside and the outside of the housing rear chamber 52. Hence, the continuously variable transmission 25 and the transmission link mechanism 300 can be easily connected to each other.

As is clear from FIG. 23 and FIG. 24, there is provided the brake operating shaft 262 to be connected to the brake mechanism 32 of the rear wheels 4, and the inside-outside connection hole 441 is formed in the bottom portion of the housing rear chamber 52, and the brake operating shaft 262 is arranged outside the inside-outside connection hole 441. Thus, for example, even if rain water enters the housing rear chamber 52 through the opening (transmission operation hole 424) for connecting the trunnion shaft 301 of the continuously variable transmission 25 to the transmission link mechanism 300 outside the clutch housing 10 or through the opening (transmission shaft insertion hole 440) for connecting the transmission shaft 88 to the front wheels 3, the rain water in the housing rear chamber 52 can be quickly discharged through the inside-outside connection hole 441. Further, the brake operating shaft 262 can prevent a foreign matter from entering the housing rear chamber 52 through the inside-outside connection hole 441.

The invention claimed is:

1. A working vehicle comprising: an engine mounted on a running vehicle body having front wheels and rear wheels; a hydrostatic continuously variable transmission for variably transmitting power from an engine; a transmission case for transmitting a transmission output from the hydrostatic continuously variable transmission; a drive takeoff shaft for the front wheels, which transmits a driving force to the front wheels, and the hydrostatic continuously variable transmission is arranged on a center plate disposed on a front side of the transmission case; a nearly cylindrical shaft cover fitted on a transmission shaft for the front wheels that is connected to the drive takeoff shaft for the front wheels, one end side of the shaft cover being retained by a cover insertion hole formed in a bottom portion of a clutch housing disposed on a front side of the center plate; a universal coupling for connecting the drive takeoff shaft for the front wheels to the transmission shaft for the front wheels is arranged in the clutch housing; and one brake pedal connected to right and left brakes for braking the right and left rear wheels respectively via one brake operating shaft, the brake operating shaft being arranged in said bottom portion, which is located below the hydrostatic continuously variable transmission and the universal coupling of the clutch housing.

2. The working vehicle as claimed in claim 1, comprising a shift pedal connected to a variable transmission operating part of the hydrostatic continuously variable transmission via a transmission mechanism; a vehicle speed holding mechanism for holding the shift pedal at a depressed position, the vehicle speed holding mechanism being provided with: an engaging part connected to a manual operating lever for holding to vehicle speed; and an engaged arm connected to the shift pedal and having a plurality of engaged claws to be engaged with or disengaged from the engaging part, and is constructed in such a way that the engaging part is held engaged with the engaged claws by a biasing force of an initial position return spring for returning the shift pedal to an initial position from the depressed position to thereby bring a vehicle speed nearly to zero.

3. The working vehicle as claimed in claim 2, comprising brake operating means for braking the rear wheels; brake system releasing means for forcibly releasing position holding of the shift pedal by the vehicle speed holding mechanism by a braking operation of the brake operating means, a drive system releasing operation of releasing the position holding of the shift pedal by the vehicle speed holding mechanism by the shift pedal and a braking system releasing operation of releasing the position holding of the shift pedal by the vehicle speed holding mechanism by the brake system releasing means which can be performed independently of each other.

4. The working vehicle as claimed in claim 3, wherein the vehicle speed holding mechanism has the engaging part arranged via an engaging link on the manual operating lever for holding the vehicle speed, the engaging link being connected to a brake pedal as the brake operating means via a release arm as the brake system releasing means for forcibly releasing the engaging part from the engaged claws.

5. The working vehicle as claimed in claim 2, wherein the transmission operating part is returned to a neutral position from a transmission output position by a biasing force of the initial position return spring for returning the shift pedal to the initial position from the depressed position to thereby bring the vehicle speed nearly to zero.

6. The working vehicle as claimed in claim 5, comprising stroke stopping means for restricting transmission operation of the transmission operating part, a range of the transmission operation of the transmission operating part, restricted by the stroke stopping means, can be adjusted in association with an adjusting operation of holding a neutral position of the initial position return spring.

* * * * *